US009697464B2

(12) United States Patent
Reneses Asenjo

(10) Patent No.: US 9,697,464 B2
(45) Date of Patent: Jul. 4, 2017

(54) METHOD FOR SOLVING OPTIMIZATION PROBLEMS IN STRUCTURED COMBINATORIAL OBJECTS

(76) Inventor: Ignacio Reneses Asenjo, Madrid (ES)

( * ) Notice: Subject to any disclaimer, the term of this patent is extended or adjusted under 35 U.S.C. 154(b) by 355 days.

(21) Appl. No.: 13/570,898

(22) Filed: Aug. 9, 2012

(65) Prior Publication Data
US 2012/0303574 A1 Nov. 29, 2012

Related U.S. Application Data

(63) Continuation of application No. 12/213,303, filed on Jun. 18, 2008, now Pat. No. 8,266,089.

(51) Int. Cl.
*G06Q 10/06* (2012.01)
*G06K 9/46* (2006.01)
*G06N 5/02* (2006.01)
*G06K 9/68* (2006.01)

(52) U.S. Cl.
CPC ........ *G06N 5/02* (2013.01); *G06K 9/469* (2013.01); *G06Q 10/063* (2013.01); *G06K 9/6892* (2013.01)

(58) Field of Classification Search
USPC .................................... 706/50, 20
See application file for complete search history.

(56) References Cited

U.S. PATENT DOCUMENTS

| 2,632,058 A | 3/1953 | Gray |
| 6,438,734 B1 | 8/2002 | Lu |
| 6,636,840 B1 | 10/2003 | Goray et al. |
| 6,674,757 B1 | 1/2004 | Zolfaghari |
| 7,298,704 B2 | 11/2007 | Kodialam et al. |

OTHER PUBLICATIONS

Juvan et al., "2-restricted extensions of partial embeddings of graphs", [online], 2005 [retrieved on Jul. 29, 2011], pp. 1-39. Retrieved from the Internet:< URL: http://www.fmf.uni-lj.si/mohar/Papers/2restr.pdf>.
Angelini et al., "Testing Planarity of Partially embedded graphs", [online] [retrieved on Jul. 29, 2011], Retrieved from the Internet:< URL:http://portal.acm.org/citation.cfm?id=1873620>, pp. 202-221 (date for Juvan).
Xiao et al., "Structural Properties of Cayley Digraphs with Applications to Mesh and Pruned Torus Interconnection Networks", Journal of Computer and System Sciences, 2007, pp. 1-12, Elseiver Inc., USA.

(Continued)

*Primary Examiner* — Paulinho E Smith
(74) *Attorney, Agent, or Firm* — Oliff PLC

(57) ABSTRACT

The present invention is a method of solving the decision, for example, testing if, given a finite number of transformations which can be applied to a finite number of elements, the corresponding n-generated discrete object has a hamiltonian cycle and/or path, searching, for example, obtaining the explicit construction of one several or all the hamiltonian cycles and or paths of the given input, counting, for example, obtaining an upper bound of the number of Hamiltonian cycles and/or paths of the given input and optimization, for example, selecting one of several hamiltonian cycles and/or paths solutions according to an specified criterion, versions of the hamiltonian traversal (cycle and/or path) problem in class of combinatorial discrete objects.

60 Claims, 9 Drawing Sheets

(56) References Cited

OTHER PUBLICATIONS

Xiao et al., "Some Mathematical Properties of Cayley Digraphs with Applications to Interconnection Network Design", International Journal of Computer Mathematics, 2005, pp. 521-528, vol. 82, No. 5, Taylor & Francis Ltd. UK.

Yang et al., "Hamiltonian Cycles in Circulant Digraphs with Two Stripes", Discrete Mathematics, 1995, pp. 1-3, Univ. of Graz, Austria.

Ramyaa, "Finding Hamilton Cycles in Cubic Digraphs and Restricted Cayley Digraphs", MS Thesis, 2004, pp. 1-29, Univ. of Georgia, USA.

Ruskey et al., On the Hamiltonicity . . . Cayley Graphs (Or: A Tale of Backtracking), 2001, pp. 1-12, Dept. of Computer Science, Univ. of Victoria, Canada.

Effler et al., "Enumeration, Isomorphism and Hamiltonicity of Cayley Graphs: 2-Generated and Cubic", MS Thesis, 2002, pp. 1-90, Dept. of Computer Science, Univ. of Victoria, Canada (with 2 attachments of exp. results).

Plesník, "The NP-Completeness of the Hamiltonian Cycle Problem in Planar Digraphs with Degree Bound Two", Information Processing Letters, 1979, pp. 199-201, vol. 8, No. 4.

Curran, "Hamilton Paths in Cayley Digraphs of Metacyclic Groups", Discrete Mathematics, 1993, pp. 133-139, v. 115, Elsevier B.V., Netherlands.

Curran et al., "Hamiltonian Cycles and Paths in Cayley Graphs and Digraphs—A Survey", Discrete Mathematics, 1996, pp. 1-8, vol. 156, Elsevier B.V., Netherlands.

Gallian, "Contemporary Abstract Algebra ($6^{th}$ Edition)", Chapter 30: Cayley Digraphs of Groups, 2004, pp. 501-519, Cengage Learning, USA.

Pak et al., "Hamiltonian Paths in Cayley Graphs", 2004, pp. 1-19, Dept. of Mathematics, Massachusetts Institute of Technology, Cambridge, MA, USA.

FIGURE 3.

| |
|---|
| 23456789 |
| 56243897 |
| 56428973 |
| 28546739 |
| 28457396 |
| 57248963 |
| 57429638 |
| 29547386 |
| 29453867 |
| 53249678 |
| 53426789 |
| 26543897 |
| 26458973 |
| 58246739 |
| 58427396 |
| 27548963 |
| 27459638 |
| 59247386 |

METHOD FOR SOLVING OPTIMIZATION PROBLEMS IN STRUCTURED COMBINATORIAL OBJECTS

This is a Continuation of application Ser. No. 12/213,303 filed Jun. 18, 2008. The disclosure of the prior application is hereby incorporated by reference herein in its entirety.

FIELD OF THE INVENTION

The present invention relates generally to the field of computer sciences and engineering and specifically to the field of solving a class of combinatorial problems defined in a class of discrete objects.

BACKGROUND OF THE INVENTION

Many problems arising in the sciences and engineering fields can be reduced to the study of the properties of certain combinatorial objects. For instance natural or artificial networks are usually modelled as labelled (vertices and/or arcs) graphs or digraphs. Many patents have been granted for methods of solving problems on graphs or digraphs. As a non exhaustive sample: U.S. Pat. No. 6,438,734; U.S. Pat. No. 6,674,757; U.S. Pat. No. 7,298,704.

Within all digraph problems the well-known problem of finding a hamiltonian traversal (from now on HT, referring both to a hamiltonian cycle or a hamiltonian path) is of interest for theoretical and practical purposes. A hamiltonian path is a path in the digraph which passes trough all the vertices only once. A hamiltonian cycle is a hamiltonian path where the ending vertex is adjacent to the starting vertex. For many applications the possibility of solving efficiently the decision, searching (of one, several or all), optimization and counting versions of the hamiltonian traversals of a given digraph (this is the hamiltonian problem or from now on HP) is a highly desirable property. But this problem even when restricted to the decision version being one of the classical NP-complete problems (for general digraphs and graphs) we should not expect to find a worst-case efficient solution to it. U.S. Pat. No. 6,636,840 has been granted for a computer system designed specifically to solve the optimization hamiltonian cycle problem in a weighted digraph.

Although it is known that in the average-case and random settings the decision HT problem is feasible, it is interesting for specific classes of structured digraphs which appears in practical applications to develop more efficient methods of solving it than those available for the general random or average-case. Within all digraphs, an efficient solution to the HP in vertex-transitive digraphs is of interest in some engineering areas such as the field of interconnection networks design (for details see two papers form Wenjun Xiao and Behrooz Parhami, "Some mathematical properties of Cayley digraphs with applications to interconnection network design 2005 and 2007" in the International Journal of Computer Mathematics, Vol 182, no 5, May 2005, p521-528 and "Structural properties of Cayley digraphs with applications to mesh and pruned torus interconnection networks", Journal of Computer and System Sciences 73, (2007), p1232-1239; and J. Duato, Ni Lionel and Yalamanchili Sudhakar book "Interconnection Networks: an engineering approach, Morgan Kauffman, 2003). Most vertex-transitive digraphs in applications are Cayley digraphs. Up to now it has neither been proved that the HP for Cayley digraphs is NP-Complete nor it is known a deterministic polynomial time general procedure which solves it, so the computational complexity of this problem remains unknown (for details see Ramyaa Master of Science thesis "Finding hamilton cycles in cubic digraphs and restricted Cayley digraphs" University of Georgia, 2004). An US patent related with hamiltonian cycles in structured graphs (hypercubes) is U.S. Pat. No. 2,632,058 issued in 1953.

Since when designing a network for practical applications low vertex degree is a desirable property, considerable effort from skilled artisans has been devoted to the most restricted class of the 2-generated Cayley digraphs, but the best known general method valid for this restricted cases uses backtracking, which is exponential in time in the worst case (for details see S. Effler Master of Science thesis "Enumeration, Isomorphism and hamiltonicity of Cayley digraphs: cubic and 2-generated, University of Victoria, Canada, 2002) and therefore is able to solve HT problem only small Cayley networks (for example, a solution for many networks of size 720 are still unknown, Effler, 2002 op. cit.). For some special cases of this restricted class though, deterministic polynomial time decision, searching and counting procedures are known (for details see Qi Fan Yang, R. E Burkard, E. Cela and G. J. Woeginger, "Hamiltonian cycles in circulant digraphs in two stripes", Discrete Mathematics 176, (1997), p 233-254) and for some other cases a polynomial time decision procedure is known (for details see S. J. Curran and J. A. Gallian "Hamiltonian cycles in Cayley graphs and digraphs: a survey", Discrete Mathematics 156, (1996), p 1-18). Most of this polynomial time decision and/or searching procedures relates to Cayley digraphs of commutative groups or structurally close to commutative such as metacyclic groups. The decision problem restricted to all 2-generated Cayley digraphs of the symmetric group or alternating groups (which are widely used in practical applications such as interconnection networks), or even when restricted to a very specific infinite family is considered as a hard problems (for details see I.Pak and R.Radoicic, "Hamilton cycles in Cayley graphs", Preprint available at the www, (2004) and D. Knuth "The Art of computer programming", Vol 4, 7.1.2., Draft). In fact the hamiltonian decision problem for general (unstructured) 2 in-2 out digraphs is NP-complete as proved by Plesnik (unpublished result available at www) in the late seventies.

The best obvious algorithm for searching an HT in the general case of 2-generated Cayley digraphs has a worst case time complexity of $O(2^{(|G|/order(-xy))})$.

Some variations of this general exponential best algorithm, introducing some changes has been presented for cases where at least one of the generators is an involution (for details see Ramyaa, op. cit. 2004), obtaining as a result a heuristic procedure which might yield or not a correct result. In other non-commutative cases improved backtracking procedures has been implemented; but this method needs previous ad-hoc hand analysis by the designer for each case (for details see a note form F. Ruskey, Ming Tian and A. Weston, "The hamiltonicity of directed cayley digraphs and graphs or a tale of backtracking", in Discrete Applied Mathematics 57, (1995), p75-83). In all this cases, like with other structured objects or the skilled artisan is able to take advantage of its structure or widely used methods (deterministic with time or iteration limits, greedy, random, heuristic) will fail (Ramyaa, op.cit. 2004).

In the field of computer architecture the interconnection network is now considered as one of the key elements of a computer together with the memory, processor or input/output components (for details see Behrooz Parhami book "Computer Architecture: from microprocessors to supercomputers, Oxford University Press, 2005); when the number of components of these key elements increases (number of processors, number of memory positions, number of input or output elements), the best option to connect them is through an interconnection network; many interconnection networks are modelled as Cayley digraphs and hamiltonicity (together with a fixed low degree, low diameter and large bisection width) is one of its desired properties; the need of higher computational power requests more and more components in computer systems and therefore interconnection networks will have more and more nodes.

There exist then a need of a procedure which identifies which structural aspects of the digraphs are relevant for hamiltonicity and exploits this knowledge for improving the present general or specific methods for solving the decision, searching, counting and optimization versions of the hamiltonian traversal problem for Cayley digraphs and other vertex transitive networks. As any skilled artisan knows all the versions of the problem are requested for practical purposes.

SUMMARY OF THE INVENTION

According to its major aspects and broadly explained the present invention is a method for solving efficiently the decision, searching, counting and optimization versions of the hamiltonian traversal (cycle and or path) problem for a wide class of finite and discrete objects, which can be represented as Cayley digraphs and which can be used to represent natural or artificial networks. The method is composed by two main procedures: the decision procedure and the searching procedures. Then the search procedure can be modified in order to solve counting optimization version of the problem.

The decision procedure takes as input two generators (i.e. two permutations of any and same degree) and test several structural properties relevant for hamiltonicity. As a result of this test a set of possible ending vertices is selected and the input is classified in two classes: easy cases and potentially hard cases. In order to show the wide range of inputs to which the method can be applied it is shown that asymptotically almost all cases will belong to the easy cases class.

Once a pair of possible starting-ending vertex has been selected and the input classified the search procedure starts. It consists on an iteration of arc-marking-choices and a propagation which includes two subroutines (arc-forcing and path-cycle check) until a solution is found. Depending on the class the input belongs and the chosen ending vertex the procedure and its performance may vary from polynomial time complexity in the easy cases to sub exponential in hard cases. The searching procedure can be modified in order to adapt it to solve optimization versions of the problem.

The counting procedure needs two runs of the searching procedure in order to count the number of arc-marking-choices when the choice is forced to be by one generator (first run) or the other generator (second run). The number of choices obtained in each run will be used as parameters in a procedure which must be repeated for all possible starting- and ending vertices. As a result an upper bound of the number of hamiltonian traversals of a given digraph is obtained. For easy cases (i.e. for almost all cases) this upper bound can be considered as a good approximation of the actual number. In a similar way the searching procedure can be modified in order to adapt it to solve optimization version of the problem.

BRIEF DESCRIPTION OF THE DRAWINGS

FIG. 3 shows the IAS corresponding to generators 12436785 and 35412867 in table or list form.

DETAILED DESCRIPTION OF THE INVENTION

General Definitions, Terminology and Notation

Figure 1A:
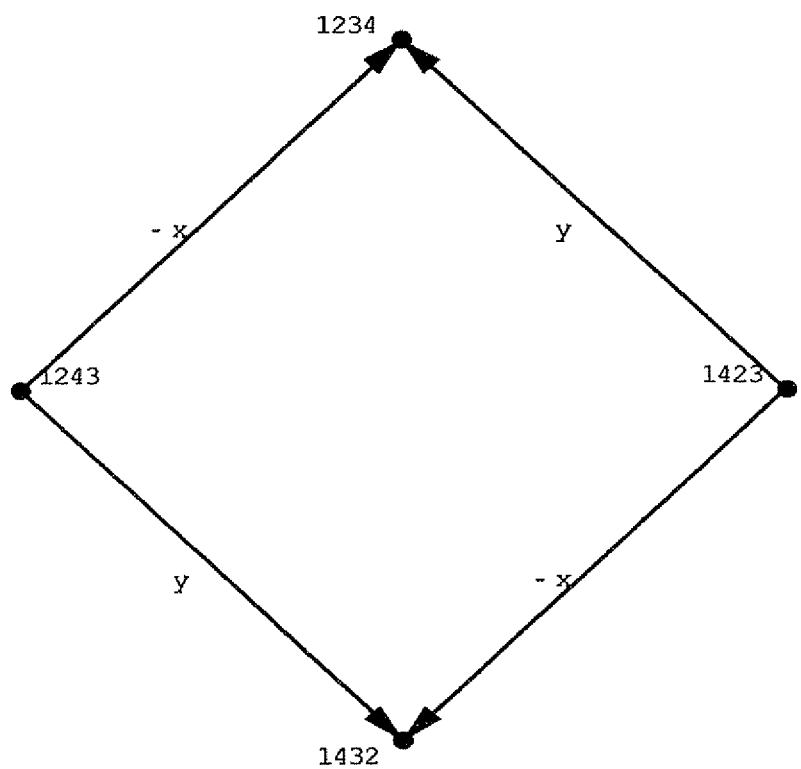
FIG. 1A shows the IAS for generators (1243,1342), of EVN=2.
Figure 1B:
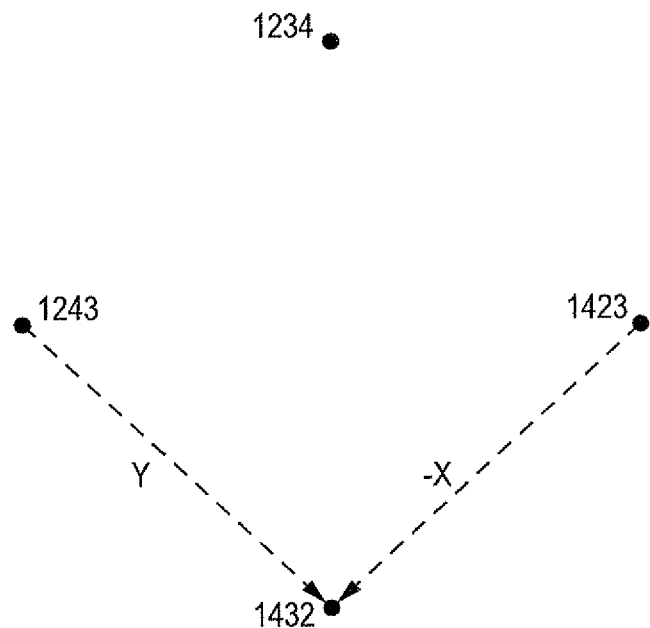
FIG. 1B shows the same IAS as in FIG. 1A after having effected the marking (in dashed style) and deletion of edges according to the step 2 of the method.

Before the description of the invention the standard definition and notation of the objects of general knowledge that will be used during the explanation of the method (lists, sets, digraphs, permutations) are introduced first; secondly some concepts more specific to permutations and Cayley digraphs also of general use by any skilled artisan (order and degree of a permutation, generator, sequences of generators, relations, alternative ways of representing groups and digraphs of groups) which will be used during the explanation of the invention; finally are introduced some definitions of the concepts more specific to the invention related with the structural properties of Cayley digraphs and with the hamiltonian property (IAS, DAS, SEV, symmetry breaking, obstruction, obstacle, easy cases). Other relevant definitions will be introduced when appropriate (EVN, smooth and twisted identity neighbourhood, entanglement, cycle-entanglement). Some words used to name some new concepts used in the invention has been selected because they seem to be the more appropriate to describe the concepts even if they are also used in other fields of knowledge. For all of them the appropriate operational definitions used for the description of the invention are given.

To understand the description of the invention these are the definitions to take into account and not the definitions of the same names used in other fields of knowledge.

A finite list is a finite number of objects or symbols where repetitions are allowed and the order of objects in the list does not count (two lists with the same elements in a different order are considered as equivalent). A finite ordered list is a finite number of objects or symbols with repetitions allowed and where the order counts.

A finite set is a finite list where repetitions are not allowed and where the order does not count. A finite ordered set is a set where order counts.

A multidigraph with loops, as an abstract data structure is a pair D(V,A) where V is a finite set (the set of vertices) and A is a finite list of ordered pairs of elements of V (the set of arcs). A digraph with loops is a set of ordered pairs. A digraph excludes pairs (x,x) for all x. A graph is a set of unordered pairs.

A digraph can be implemented for being manipulated by a computer system with different data structures: adjacency lists and adjacency matrices are the most used. A digraph can also embedded in the plane (vertices being represented by points and arcs being represented by lines within points as can be seen in FIG. 1 or FIG. 2) or any other geometrical superficies or shapes. Both the vertices and arcs can be labelled and/or weighted by different kinds of symbols. Colours can be considered as a special type of symbol. For simplicity adjacency matrices are used for the description of the present invention. However it will be apparent for those skilled in the art that the method of the invention is invariant under changes of data structure, embedding and other characteristics of the digraph such as labels, weights, colours, symbols . . .

A permutation, in its most general definition is any reordering of a finite ordered list, though in general and in the description of the invention only reordering of ordered sets will be considered. A permutation can be obtained from another permutation by applying a permutation transformation (also called substitution). There are n! Permutations of an n ordered set and there are n! permutation transformations. Thereafter permutations will be characterized as finite sequences of symbols such as 123 or 1234, or 2341 or in general 123, . . . , n. For the description of the invention ordinal numbers will be the objects to be permuted and the identity element will be the lexicographically ordered list 123 . . . , n and when a more simplified description is needed as the number "1". However it will be apparent for those skilled in the art that the method of the invention is invariant under changes of the objects or symbols to be permuted and of the identity definition.

Permutation transformations will be represented as pairs of permutations with the first element being the identity as follows: (1234,2341) or more succinctly as any permutation different from the identity, for instance 2341 or when appropriate with the letters "x", "y", "w" . . . . We will not use in this document other well known notations for permutation transformations as the cyclic notation or matrix notation. However it will be apparent for those skilled in the art that the method of the invention is invariant under changes of the way the permutation transformations are represented.

All the natural or artificial objects (networks) for which the method of the invention solves the decision, searching, optimization and counting versions of the hamiltonian problem can be described with two parameters: elements and elements transformations. By the well known by any skilled in the art Cayley theorem for finite groups the most general way (though not the unique) to represent these elements are by finite permutations and the element transformations by permutation transformations also called generators. However it will be apparent for those skilled in the art that the method of the invention is invariant under changes of the way the elements and elements transformations are represented. The most general and succinct way for describing the inputs of the method of the invention are for instance: {1,x,y} or {1234; 2341; 1243}, both describing an input of 2 generators, the first symbol being always the identity. For simplicity the identity will be omitted in order to get succinct descriptions of the input such as {x,y,z} or {1243; 2143; 3412}, both descriptions of inputs of 3 generators.

The degree of a permutation, deg(p), is the cardinality of the set of objects to be permuted. For instance the deg(123)=3; deg(1234) is 4.

The order of a generator, |x| is the number of different permutations it generates in a cycle. A cycle is constructed just by starting with the identity and applying iteratively the generator until the identity appears again. The identity must be counted only once. For instance the order of generator 132 (or x) is 2. The order of generator 1342 is 3 since it generates 3 different permutations including the identity.

Given an identity 1 and a generator x, the inverse transformation of a generator x is −x and denotes a permutation transformation such that when applied to the identity the last permutation of the cycle of the generator is obtained.

According to this we distinguish between the direct generator x and the inverse generator −x.

For instance if generator x is 1342, the inverse generator −x is 1423.

Given an identity and a set of generators (for instance x and y), sequences of generators can be obtained. The method will use forward sequences which includes only direct generators (i.e. xxxx or xyxxy), backward sequences which includes only inverse generators (i.e. −y−y−y or −y−x−y−x) or mixed sequences (i.e. xxx−y−x, or −xy−xy−xy). Sequences are also descriptions of paths in the network and when appropriate the following simplified descriptions will be used when a subsequence of generators is repeated (for instance xyxyxy can be written as 3*(xy), the number of times the subsequence is repeated being the exponent of the sequence).

By the application of sequences of generators to the identity ordered lists of permutations can be obtained. Two sequences are considered as equivalent when if applied to the identity they generate at the end the same permutation. Then a relation is a declaration of equivalence of two sequences. For instance if generator x is 1342, the inverse generator −x is 1423 then the relation 1(xx)=1(−x) holds.

Given the identity and applying iteratively a given set of generators until no new element is obtained the set of all elements generated by the generators can be obtained. Some generators will generate all possible elements (for instance the n! possible permutations); some will not. The representation of the generated set of elements as vertices and the generators as edges is a Labelled Cayley digraphs or Cayley digraphs. The cardinality of the set elements is the order of the digraph, |V|. Cayley digraphs are commutative or abelian when starting from the identity the generators commute; otherwise they are non-commutative. Cayley digraphs are involutory when one of the generators is an involution; otherwise they are non-involutory. Commutatively and involutory are two important structural properties.

It is well known by any skilled in the art that Labelled Cayley digraphs or Cayley digraphs admit several variations: its vertices and arcs can be labelled (with permutations or other objects, symbols or colours, representing the elements and the generators) or not, the digraph can be converted into a graph or not, the digraph can have a finite number of elements or an infinite number. For instance besides the permutation representations finite cases admit matrix representations (i.e. the identity is the identity n×n matrix and the generators are represented as n×n matrices over finite fields); commutative cases admit arithmetic representations (i.e. n-cyclic cases can be described as circulant digraphs of n-jumps where the identity is the 0 number and the jumps are represented by "a" and "b", a and b natural numbers (see Qi Fan et all, op cit (1997); for direct products some of the standard representations can be seen in Gallian, "Contemporary abstract algebra" Houghton Mifflin 6° Edition-2006.

For the simplicity of explanation of the method of present invention the Cayley digraph permutation representation of inputs restricted to 2-generated inputs will be used. However it will be apparent to those skilled in the art that the method of the invention is also applicable in any context involving elements and transformation elements with similar structural properties. For instance, other representations than permutations might be used, such as those described in previous paragraph. Also inputs of any number of generators might be used: in this case the method can be applied either to find a HT of a 2-generated Cayley sub digraph (sub input) of an n-generated Cayley digraph either to find a HT for the whole n-generated Cayley digraph; in the later case the input must be decomposed in pairs of generators (sub inputs) and the method must be applied first to solve partially the HP for all or some sub digraphs of pairs of generators and then glue the partial solutions.

Definitions, terminology and notation more specific to the method of the invention. From now on "input", "case" or "digraph" refer to the same combinatorial object: the identity and the generators (a pair of permutations, of same degree as the identity). A SEV is a pair of starting and ending vertex of an HT.

Two generator sequences are widely used in the method of the invention:

The Inverse Alternating Subset or sub digraph (IAS) is the mixed sequences and its corresponding permutation sets generated by 1n*(-xy) and 1n*(-yx), with n a natural number expressing the number of times the subsequence repeats until a permutation (which can be the identity or not) which has been generated previously by the sequence appears again. The Direct Alternating Subset or sub digraph (DAS) is the set generated by the mixed sequences 1n*(x-y) or 1n*(y-x).

The method of the present invention starts with a given input and effects a sequence of transformations on the input based on free decisions (or choices) and constrained decisions (or propagations) until a desired output is obtained. All the transformations effected by our method are: Starting and ending vertices-marking-choice (SEV-choice); arc-marking-choice (as belonging to the HT) and arc-pruning (as not belonging to the HT).

Propagations are the result of extracting the known necessary consequences of previous choices and can be complete or incomplete. Propagation is complete when the necessary consequences extracted are also sufficient for the greedy choice to provide a correct solution without backtracking. In inputs with several solutions free choices can not be avoided. The degree of freedom of a particular instance with complete propagation is the number of choices made until a solution is found. When the greedy choice might yield incorrect result and needs deep backtracking to obtain a correct result then the propagation is incomplete. We say that symmetry breaks just at the stage of the computation when the greedy choice can made mistakes.

Obstructions are pairs of SUVs for which no HT exist. To detect obstructions is a complex task since they come in several layers, has different causes on each layer and its detection needs different procedures: some depend only on structure of the IAS; some depend only on the parity of the IAS set and the parity of the order of the digraph; other are generator dependent (intrinsic obstructions): a so compact structure is generated that IAS are connected each other in such a way that its dependencies under propagation makes impossible an HT for any possible SEV-choices. Finally other obstructions depend not only on a particular set of generators but also are relative on the choice of a particular SEV (relative obstructions).

Obstacles are pairs of SEVs for which there is no obstruction but the symmetry breaks at firsts iterations of the arc-marking-choice/propagation step and in all subsequent iterations; cases where the symmetry does not break or can only break at last iterations and only a superficial backtracking is needed for computing a solution are not considered as obstacles. The same structural properties which can cause intrinsic and relative obstructions (IAS dependencies) can cause asymmetries during the computation causing obstacles to appear.

Some obstructions and all obstacles depend only on the way the IAS are connected to each other. The method of present invention introduces several efficient tests which can detect when such connections have not been generated in a particular input and therefore it will be easy to find a solution. An input is easy when an HT exist for every possible pairs of SEV and the searching procedure will found them at worst with a superficial backtracking.

The method of the invention. Decision procedure.

Input: The identity permutation and two generators (permutations) of any and same degree. By convention the identity will be the permutation lexicographically ordered. If the input or digraph is n-generated a preprocessing step must be done in order to decompose the n-generated digraph or input in 2-generated inputs to which the following steps must be applied.

Step 1 of the method of the invention: this step aims to test the first structural property relevant for the HP. We apply the IAS generator (1n*(-xy)) to the identity. It can be shown that only three relations are possible:

Relation one. 1n*(-xy)=x=(-y). The inputs for which this relation holds can be considered trivial for the HP so it will not be considered anymore.

Relation two. 1n*(-xy)=(-x) and then 1(n-1)*(-yx)=y. All the permutations which generates this relation are commutative (i.e. the relation xy=yx holds) but not all the commutative (abelian) pairs of permutations are included in this class. This is the class of irregular inputs. Since effective and efficient methods are available for this class it will not be considered anymore.

Relation three. 1n*(-xy)=1 (or equivalently 1n*(-yx)=1). When this relation (1n*(-xy)=1) holds the permutations generated by this sequence (interpreted as an unordered set) is exactly the same set as the one generated by the sequence 1n*(-yx). This class includes all the non-commutative pairs of permutations and some commutative pairs (direct products Zn*Zm such that n divides m, i.e. m/n=integer, and those circulants Cn(a,b) such that the arithmetic difference of jumps divides the number of vertices of the digraph (i.e. n/|a-b|=integer). This class is the regular class and this first structural test is the IAS regularity test. All the remaining steps are valid only for inputs in the regular class.

The fact that when applying the IAS sequence only three possible outcomes are possible, as described in step 1 of the decision procedure has been discovered by the inventor and provides a way to detect inputs with regular IAS. The IAS regularity is key for all next steps.

Step 2 of the method of the invention. It provides efficient procedures which solves two intermediate problems. The first intermediate problem answers the following question: starting in the identity, in how many vertices can the HT end ? This problem can be solved just by comparing the two generators and seeing the order of the permutation they describe. For instance if 1342 and 2413 are the generators we compare them:

1342
2413 which is a permutation of order 4. So, starting from the identity the maximum number of ending vertices with this pair of generators is 4. This number is a key parameter for the characterisation of the input and will be widely used in next procedures so for simplicity we name it "ending vertices number" or EVN. Given permutation generators of degree g, the following useful inequality holds: the maximum EVN is equal or less than the maximum order (of a permutation) of degree g (MaxEVN (g)=<MaxOrder(g)). For regular IAS circulants Cn(a,b), EVN=n/|a-b|. For Direct products Zn*Zm such that m>n, EVN=m. As it is well known by any skilled artisan the maximum order parameter is bounded by Landau function, so MaxEVN(n)<Landau function(n).

Figure 1C:
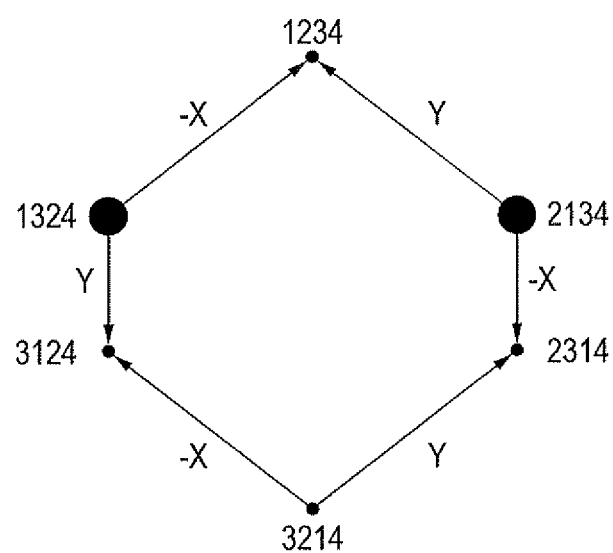
FIGS. 1C to 1F shows how the step 2 of the method works for an odd IAS of EVN=3.
Figure 1D:
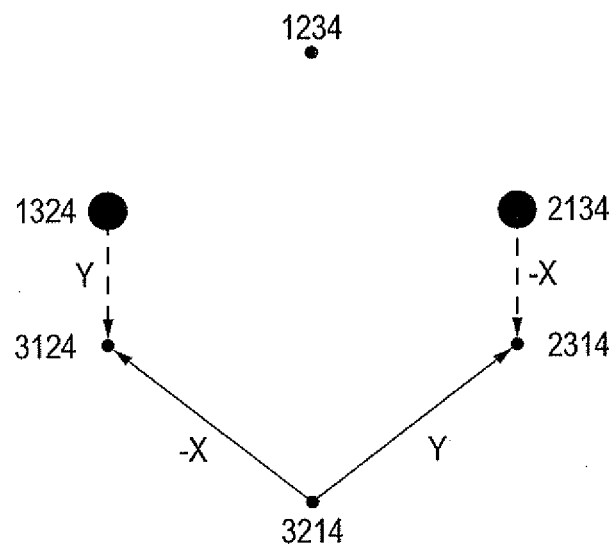
Figure 1E:
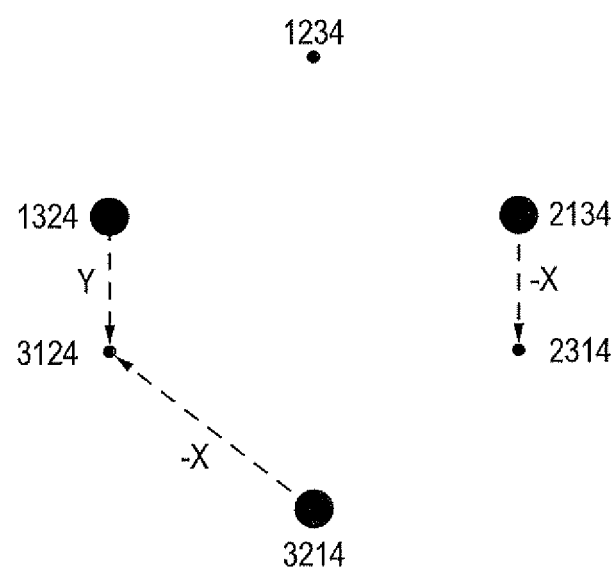
Figure 1F:
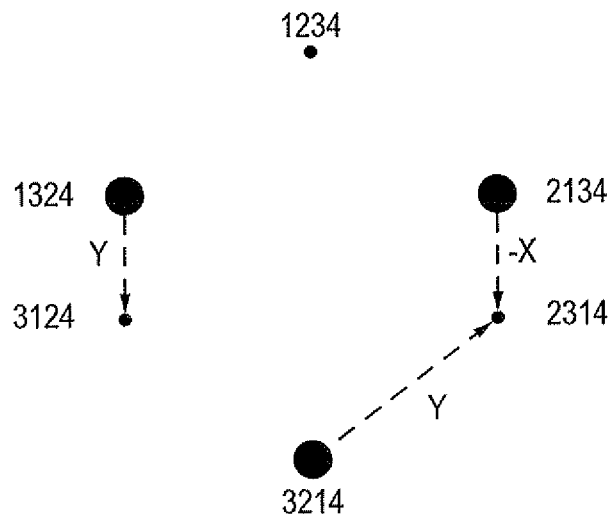
Figure 1G:
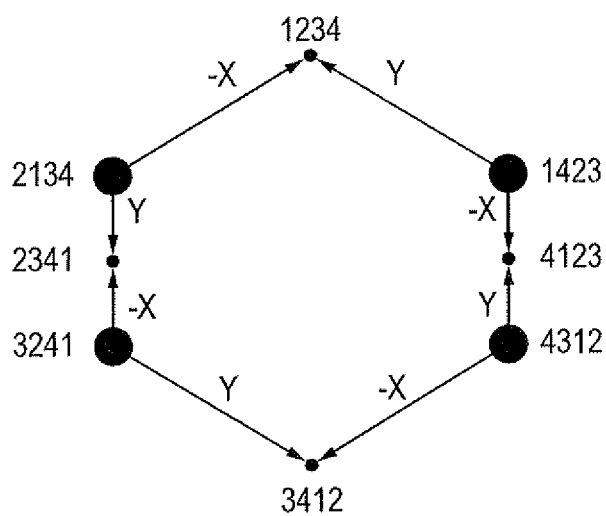
FIGS. 1G to 1K shows how the step 2 of the method works for an even IAS of EVN=4.
Figure 1H:
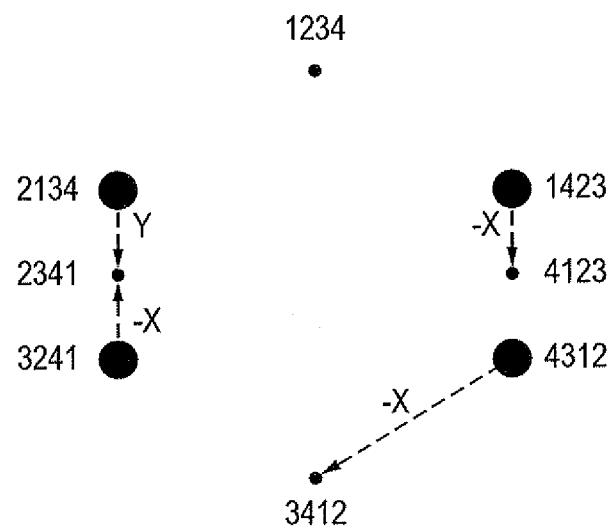
Figure 1I:
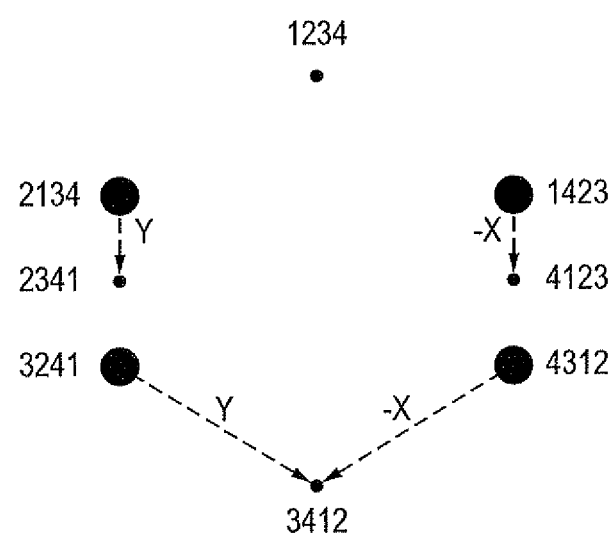
Figure 1J:
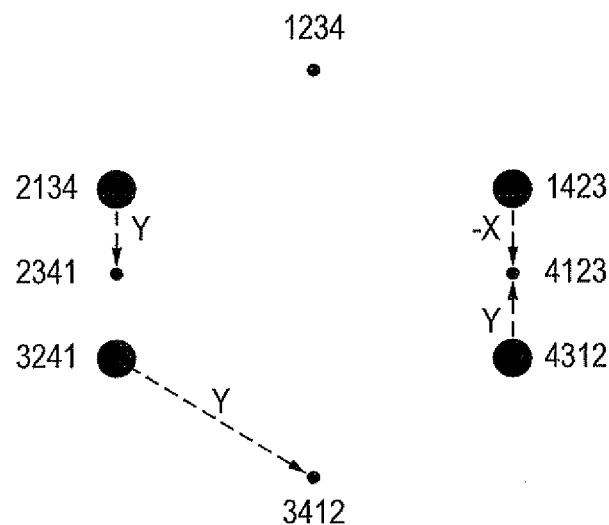
Figure 1K:
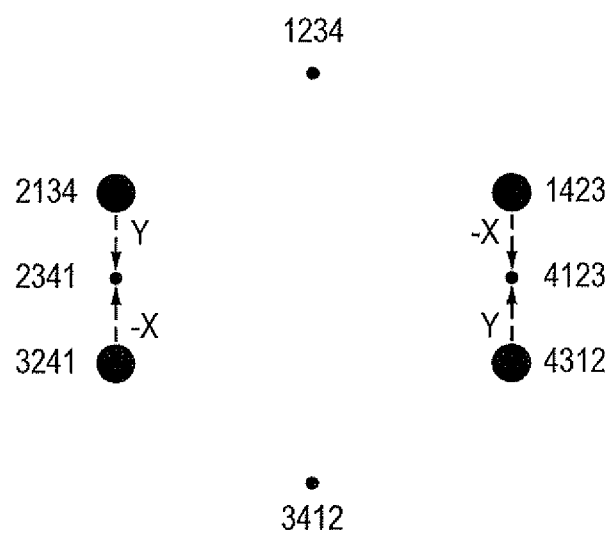
Figure 2A:
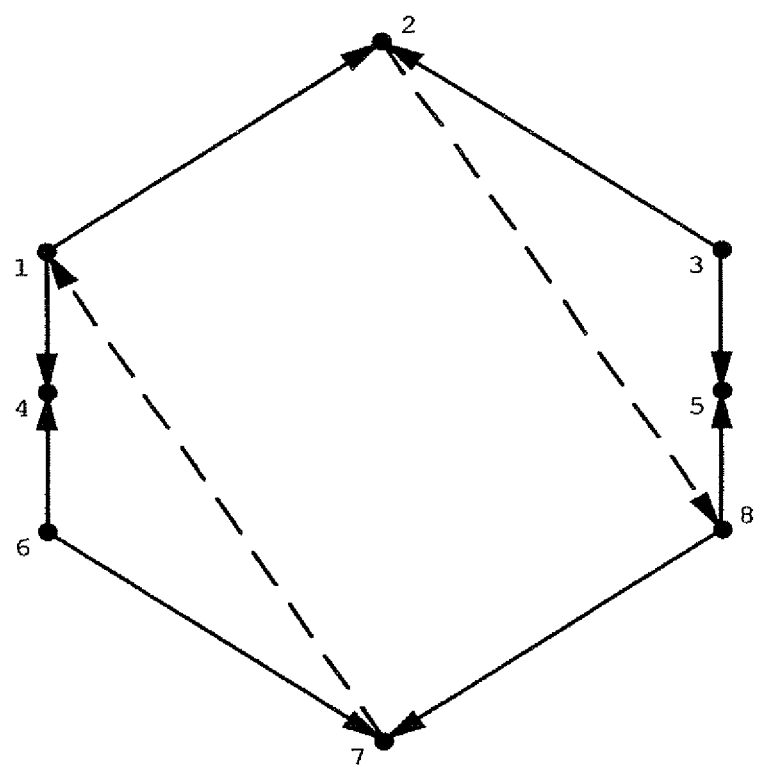
FIG. 2A shows an example of a cycle-entangled case.

The second intermediate problem of step 2 answers the following question: starting in the identity in which concrete vertices can the HT end? The solution to this problem is provided by the method of the invention by generating the IAS, considering it as an ordered list of permutations or vertices and assigning to each position of the ordered list an ordinal number. To the first permutation of the IAS, the identity (which by convenience will be considered form now on as the initial vertex of an HT) the ordinal number 1 is assigned. Then the permutations corresponding to even ordinal numbers can be ending vertex and those not corresponding to it must be discarded as ending vertices. For instance with generators x=1243 and y=4132, the EVN is 4. We assign the 8 ordinal numbers (on the left column), to the corresponding permutations (in next column) which are generated by the sequence of the
IAS(14*(−xy)) (in next column),
1° 1234 −x
2° 1243 y→selected as ending vertex
3° 3142 −x
4° 3124 y→selected as ending vertex
5° 4321 −x
6° 4312 y→selected as ending vertex
7° 2413 −x
8° 2431 y→selected as ending vertex
and applying the procedure the set of possible ending vertices is {1243, 3124, 4312, 2431} that is permutations or vertices in positions 2°, 4°, 6° and, 8° (the 2° and the 8° being the cycle vertices). This procedure is valid for any n. An HT, if any, must end on one of the selected vertices. Above is a simplified version of the general procedure explained in FIGS. 1A-1K. In these Figures marked edges, that is edges which must belong to the HT after propagation (extraction of consequences of the vertex-choices made), will have dashed style; deleted edges, that is those not belonging to the HT after the propagation (extraction of the consequences of choices), will just be deleted. Let's suppose that in FIG. 1A neither vertices labelled 1243 nor 1423 are ending vertices. Then the edges (1243,1234) and (1423, 1234) must be deleted and edges (1243,1432) and (1423, 1432) must be marked (recall that only two arcs go out from each vertex). Since a HT passes through all the vertices (except the initial and ending if a path) if one edge is deleted the other must be marked. This situation appears in FIG. 1B. But this situation is a contradiction (i.e. not possible in a HT). We can conclude then that either 1243, either 1423, must be ending vertices in any HT. A similar procedure can be applied to an EVN of any size n to determine the set of possible ending vertices. In FIGS. 1C, 1D, 1E, 1F we can see an example for a case of odd EVN=3. FIG. 1C depicts an IAS identity 1234 and generators −x=1324 and v=2134. Vertices are labeled with the corresponding permutations; edges are labeled with corresponding generators. We suppose that there are no Hamiltonian cycles (i.e. the two vertices marked with a large black disk in FIG. 1C and labeled with permutations 1324 and 2134 can not be ending vertices in a Hamiltonian cycle); then by propagation the two dashed arcs in FIG. 1D bellow digraph must be in the Hamiltonian path. The two vertices to which these two arcs point, that is, vertices labeled 3124 and 2314 can be or can not be ending vertices (at this stage we can not decide about this). Now we suppose that the third vertex marked with a large disk in FIG. 1E that is vertex labeled with permutation 3214 is not an ending vertex (it should be noted that this chain of two suppositions is equivalent to suppose from the beginning that the three vertices which has been marked by a large disk in FIG. 1E are not ending vertices of a Hamiltonian traversal). This supposition leads to a contradiction, concretely two marked edges pointing to the same vertex (a situation that makes impossible the existence of a Hamiltonian path) in any of the two possible options, which are shown in FIGS. 1E and 1F. The conclusion again is clear: if we want to get a Hamiltonian path the only possible ending vertices are those which have been marked by a large disk. Finally, in FIGS. 1G to 1K, is shown the situation for a digraph of even EVN=4. FIG. 1G depicts an IAS corresponding to identity 1234 and generators −x=2134 and y=1342. Vertices in this IAS are labeled with corresponding permutations; edges are labeled with corresponding generators. The vertices that at the beginning of the procedure we suppose are not ending vertices are marked by a large black disk in FIG. 1G, that is, vertices labeled with permutations 2134, 3241, 4312, and 1423. Then the four possible situations after the propagation (with some edges deleted and some edges marked as belonging to the HT in dashed style) are shown in FIGS. 1H, 1I, 1J and 1K all of them in contradiction with the possibility of obtaining a HT. Again the conclusion is that only any of the vertices marked by a large black disk are possible ending vertices. It can be seen that the same method will work independently of the length of the EVN: every IAS can be represented as a hexagon (for n bigger, the two vertical sides will be larger, but of equal size). The identity will be in the upper central side of the hexagon and the (2n/2)+1 vertex in the central lower side. We always assume that the two vertices adjacent to the identity are not ending vertices and we propagate this assumption down the two sides and a contradiction will arise. It follows always as a conclusion that if we want to get a Hamiltonian traversal then only half of the vertices of the IAS located in predictable positions can be ending vertices. The procedure described above is just a simplified version of this method. This is the first layer of obstructions (IAS obstructions) which depends only on the structure of the IAS and we call it the IAS-obstructions test. The method of step 2 of decision procedure described previously and with more details in FIG. 1 has been discovered by the inventor and provides a very fast method for answer two key questions regarding hamiltonicity: in how many and in which vertices must a hamiltonian traversal ends if it exists. As any skilled in the art would recognize this procedure will be highly informative for example when facing for example inputs of size n! and will be used in following steps: According to Curran (for details see S. J. Curran "Hamilton paths in Cayley digraphs of metacyclic groups"; Preliminaries; in Discrete Mathematics 115 (1993) 133-139) a different method for determining the set of possible ending vertices was developed by Housman.

Step 3 of the Method of the Invention:

when the EVN is odd the assignment of ordinal numbers to the permutations or vertices selected as ending vertices in step 2 is repeated again and the permutations corresponding to the even ordinal numbers are selected as ending vertices for cases where the order of the digraph (the number of vertices of the digraph) is even and to the odd ordinal numbers when the order of the digraph is odd.

For instance with a pair of generators of EVN=5, step 2 outputs an ordered list of selected permutations with ordinal numbers 2°, 4°, 6°, 8° and 10° (see first column bellow) to which ordinal numbers from 1 to 5 are assigned (second column bellow)

2° 1→selected as ending vertex for odd digraph order.
4° 2°→selected as ending vertex for even digraph order.
6° 3°→selected as ending vertex for odd digraph order.
8° 4°→selected as ending vertex for odd digraph order.
10° 5°→selected as ending vertex for odd digraph order.
So the permutations corresponding to even numbers of second column 2° and 4° in an even order digraph are selected and the permutations corresponding to odd numbers in second column in odd order digraphs are selected. Only these can be ending vertices when the EVN is odd.

Since they will be used later we explain in details the facts on which step 3 is based: if no vertex is marked as an ending vertex in the identity and all the IAS are activated (independently of how the activation is done) then a cycle cover of the digraph is obtained with n cycles (n a natural number or zero); when the EVN is odd if the IAS are reactivated (no matter how this reactivation is done) a new cycle cover of m cycles is obtained (m a natural number or zero); when the EVN is odd the parity is conserved (i.e. |n−m|/2=integer or n is congruent with m (mod 2)); since a hamiltonian cycle is a cover of one cycle it follows obviously that we only can get a hamiltonian cycle when the number of cycles in the cover is odd; when the digraph is of even order and the EVN order is odd hamiltonian cycles can not be obtained (when the digraph order is of odd order case this fact is reversed).

With the output of second step (i.e. in which vertices a HT must end if it exists), if a path ending vertex is marked in the identity IAS; if consequences of this marking in the identity IAS are extracted; if all the other IAS are activated (no matter how the activation is done) we get a cover of the digraph where the total number of components is always a certain number n of cycles plus an unique path from the identity to the marked path ending vertex; when the EVN is odd, if this marked path ending vertex is kept and the IAS are reactivated, the parity is conserved: the number of cycles m obtained after reactivation is congruent (mod 2) with the number of cycles n before reactivation plus an unique path; therefore it can only exist a hamiltonian path when the total number of components is even. Now if the present path ending vertex is changed by the next possible ending vertex in the identity IAS then the number of total components will change by one (this last fact is Lemma 1.8 in a paper of S. J. Curran "A generalisation of a theorem of Rankin" in Congressus Numerantium 83 (1991). pp 167-175); by Rankin theorem it is known that for even digraph orders there are no cycles when the EVN is odd, so the total number of components when a vertex adjacent to the identity is marked as an ending vertex must be even. Then by previous proposition the number of total components when marking the next ending vertex must be odd and therefore a hamiltonian path is not impossible, the next must be even and no hamiltonian path can exist and so on (when the digraph order is odd all this facts are reversed: we can have cycles no paths in next vertices to cycles and so on).

The third step of the decision procedure is just a simplified implementation of all this facts.

This is the second level of obstructions. In this case again it does not depend on the particular choice of the generators nor on how the IAS are connected but on the parity of the EVN and digraph order. We call it the parity-obstruction-test.

The method described step 3 of decision procedure for deciding in which of the possible ending vertices of the IAS there must be obstructions was discovered first by R. A Rankin for cycles and a generalisation to paths was discovered by S. J. Curran. For complete details of this facts see R. A. Rankin: "A campanological problem in graph theory" in Math. Proc. Camb. Phil. Soc. 44 (1948) 17-25; S. J. Curran "A generalization of a theorem of Rankin" in Congressus Numerantium 83 (1991). pp 167-175). The generalization to paths needs the facts described in step 2 and Rankin's method for cycles and was rediscovered by the inventor before being aware of Curran result. Lemma 1.8 in Curran's is of special relevance for the method. As any skilled in the art would recognize both results are highly informative for practical purposes. Rankin result is well known by practitioners but Curran result, of equal practical importance, seems less known by practitioners. A generalization of Rankin method for cycles in some inputs with even EVN has been discovered by the inventor, and will be used in the step 7 of decision procedure of the method of the invention.

After the Regularity-test of first step of decision procedure, IAS-obstruction-test of second step of decision procedure and parity-obstruction-test of third step of decision procedure the identity IAS with some permutations (vertices) marked as possible SEVs is obtained. Once chosen a starting vertex (let's remind that the identity by convenience has been taken as starting vertex) it can be known that if a HT exists in this input then it has to end by necessity in any of these marked ending vertices. However cases can be constructed that has no HT in any of the possible ending vertices (i.e. the digraph with parameters: 24 vertices, degree 6 generators 123465 and 254613 of order 2 and 3, and EVN 6), cases can be constructed with HT in some of the possible ending vertices but not in others (i.e. the digraph with parameters: 24 vertices, and degree 8 generators 12453786 and 36725418, both of orders 3, and EVN 6), and cases can be constructed with HT in all the possible ending vertices ({24,7,1325476,2316754,2,12, EVN6}). It is therefore of interest some additional fast structural test which separates which cases might have obstructions (potentially hard cases) and which cases can not have obstructions (easy cases). This test is provided by following step.

Step 4 of the method of the invention: depending on how the IAS belonging to a sub digraph of the input which can be constructed around the identity are connected, they can cause dependencies which might produce obstructions and/or obstacles; by contraposition, if such sub digraph is not connected in such a way that causes obstructions and/or obstacles then the whole digraph can not contain obstructions nor obstacles. The procedure of Step 4 constructs the sub digraph called the identity neighbourhood and during the construction tests if the IAS are connected in such a way as to possibly cause obstructions (then the identity neighbourhood or the generators are twisted) or not (then the identity neighbourhood or the generators are smooth). The test is called smoothness-test.

Construction of the Identity Neighbourhood and Execution Smoothness Test:

Step 4, subroutine 1: The identity IAS is constructed and the permutations generated are kept in memory: a stack, the identity neighbourhood list (INL0), is created for this purpose. Then the identity DAS is constructed; during the generation of the DAS for each new generated permutation the procedure checks if it is already a member of the INL0; if it is a member the procedure stops and concludes the generators are twisted; otherwise the permutation is included in the INL0 with a symbol marking if two arcs form the DAS ins (I) or outs (O) from the permutation and the procedures continues until all the permutations generated by the DAS has been checked. If there are no repetitions the subroutine outputs the INL0 (which must have at the end of this subroutine (2×EVN)−1 permutations) and continues to next subroutine.

Step 4, subroutine 2:

A new stack INL1=INL0 is created and kept in memory. Two stacks are kept in memory: INL0 and INL1. Then for each permutation in the INL0 marked as O the one-generator x-cycle forward sequence and the one-generator y-cycle forward sequence are generated as follows: a permutation from INL0, the starting permutation, must be taken; the generator x must be applied and a new permutation is generated; for each new permutation generated we must check if it is member of INL1; if it is member and it is not adjacent to the starting permutation in the identity IAS or the identity DAS then the procedure stops and concludes that the input is twisted; otherwise the generated permutation is included in INL1 and procedure continues with the next permutation generated. This must be repeated for all permutations in INL0 and for the two generators. If not repetitions appear the subroutine outputs INL0 and INL1 and continues to next subroutine.

Step 4, subroutine 3:

A new stack INL2=INL1 is created and kept in memory. For each permutation in the INL1, depending of the corresponding (I or O) symbol mark, its IAS or DAS must be constructed. As in subroutine 2 the membership test must be effected taking into account that due to some necessary adjacencies (which will appear in every identity neighbourhood) some permutation repetitions must be allowed. Some other repetitions are contingent and when present must stop the procedure concluding that the input is twisted. All this necessary repetitions and contingent repetitions can be well-defined as to be effected in polynomial time by a programmed computer system. If no contingent repetition appears the permutation must be included in the INL2. After having effected this subroutine for every permutation in INL1 either the subroutine stops with the output that the generators are twisted or stops concluding the generators are smooth and outputs INL2.

The following two examples might clarify what the constructs of identity neighbourhood and smooth/twisted generators are:

Two generators of a digraph of 120 vertices are 13452 and 23451. Step 4 of the method outputs that they are smooth generators.

Two generators of a 120 vertices digraph are 23154 and 21534: obviously the permutation 21534 belongs to the identity DAS; by construction it can be seeing that 41352 belongs to the identity IAS. By definition the DAS of 21534 and the IAS of 41352 are members of the identity neighbourhood. It turns out that they share permutation 14523; this is not a necessary repetition; so Step 4 of the procedure outputs that they are twisted generators.

Inputs with smooth generators has an HT in all the possible ending vertices and the searching procedure will find it at worst with a superficial backtracking. Inputs with twisted generators can be potentially hard: obstructions and/or obstacles can be found and therefore the searching procedure might be hard. This is the smoothness-test.

In order to show the scope of the method now we answer two questions: up to isomorphism do we have infinite cases of twisted generators (i.e. do we have infinite potentially hard cases)? If yes, asymptotically will most of the cases fall in the twisted or the smooth classes (i.e. what is the expected asymptotical behaviour of the distribution of cases in the two categories, smooth (easy) and twisted (potentially hard)? An answer to both questions require considering two situations: in first situation the degree g of the permutation of the generators is fixed and variations are made on the order of the digraphs generated by permutations of the fixed degree; in second situation the order is fixed and the variations are made in the degree of the permutations which generates digraphs of such an order.

First situation (the degree g fixed, the digraph order n is variable): if we fix the degree g of the permutation generators, we are allowed to make variations on the order n of digraphs that we can get with this fixed g and we are interested in knowing what is the shape of the distribution of the inputs in the variable orders. For this purpose we would like first to know for each g where lies (exact or as an approximation) the extreme value of the distribution. In other words we look for a Cayley Digraph with regular IAS and a number digraph order close to the minimum order digraph which can be generated by permutations of this degree g and not isomorphic to a digraph generated by permutations of a lower degree (g–i). The following construction gives an approximation of this extreme value for all g and as a by-product answers the first question: we take a permutation with the maximum order corresponding to degree g (for simplicity we consider as equivalent those permutations of consecutive degrees which has the same maximum order and we take as representant of each class the minimum degree: for example the class of maximum order 6 contains permutations of degrees 5 and 6 and we take degree 5 as representant of this class). Now we can take as generators two permutations z and y of the maximum order for this degree maxdeg(g) which commute (xy=yx) and construct the direct product Cz×Cy. Obviously this digraph can always be constructed, will always have order $|V|=(max(g))^2$ vertices and it can be shown easily with a recursive argument that z and y are always twisted generators.

This answers the first question: the number of twisted generators or potentially hard cases is infinite (although it is known that the direct products of the form $(Cn)^2$ are not hard). Regarding the second question, if for simplicity for each g we take the order of above direct product as the lower extreme of the distribution, all the inputs of this degree, non-isomorphic to inputs of a lower degree may range from the maximum digraph order for g, g! (the order of Cayley digraphs of the symmetric group Sg), through g!/2 (the order of the digraphs of the alternating group Ag) to $max(g)^2$ (the order of above direct product). Due to the way their IAS are connected twisted generators limits the growth of the order of its digraph (the number of its vertices). Since when the degree g tends to infinity the maximum digraph order is always g!, unless the asymptotic of the growth of the maximum IAS order or EVN number (i.e. the maximum order of a permutation of the degree g or max(g)) these twisted generators might produce allows it, it will be impossible for twisted generators to generate the Sg (or even Ag). But the asymptotic of the maximum order of a permutation of a given degree, given by Landau function shows that the max(g) growth has an upper bounded by the exponential function $e^g$. Since the limit of $g!/e^g$ (or even $(g!/2)/e^g$) tends to infinity when g tends to infinity we can conclude that there must be a degree h such that for every degree h+i, twisted generators of degree h+i won't generate Sg nor Ag (up to isomorphism). In fact the experimental data points to the fact that this g won't be very big (i.e. 7 or 8).

Now from it is known (for details see Dixon theorems in J. Peter Cameron paper, "Permutations" in Proceedings of Paul Erdos memorial conference, published by Springer and Janos Bolyai Mathematical Society in the collective volume "Paul Erdos and its mathematics" vol 2, p. 205) regarding the probability of two random generators to generate Sn or An we can conclude that when we fix the degree and we effect variations on the order of the digraph most generators will be smooth and therefore easy. This does not excludes the fact that on the extreme there will be infinite potentially (and as experiments suggest actually) hard cases.

In second situation (order fixed, variable degree), we inquire about the asymptotic properties of another distribution which complements the first one: we fix the order g! corresponding to degree g and allow variations on the degree g (i.e. we look for generators of degree (g+i) which generates digraphs of order g!). As in previous distribution we are first interested in knowing where lies the extreme values of the distribution (i.e. the maximum degree g+i which generates a digraph of order g! non isomorphic to a digraph of a lower degree (g+j) with j<i). For this purpose again we construct and extreme infinite family as follows: we take the minimum permutation degree g+i which generates a cycle of order g!/2. This will be the order of generator x. Now we select as generator y any involution such that when compared with generator x the EVN is g!/2. We obtain a digraph of parameters |V|=g!, EVN g!/2, and generators of order 2 and g!/2 (a concrete case of this abstract infinite family for g=4 is the digraph of 24 vertices, EVN 12, generators of degree g+i=9: 123456798 and 23156789 of order 2 and 12). This digraph can always be constructed for every g!; no digraph of a lower degree will be isomorphic to it; it will be the unique digraph of this degree with order g!; the generators of this digraphs are always regular and twisted and will always have obstructions. Now what happens when we make variations from this extreme degree g+i to the other extreme degree g (i.e. what would be the shape of the distribution)? Again (same reference as before) we know that asymptotically most cases will be easy: the fraction of the Cayley digraphs of order g! generated by the degrees (g+i), (g+i−1) . . . (g+2), (g+1) will approach to 0 when g tends to infinity but those generated by the degree g will tend to infinity. The shape of the distribution will become narrower as n grows. Of course for small n it is possible (and it happens) that the modal value of the distribution lies in higher degrees than g.

In summary: after step 4 of the procedure of the method of the present invention, smoothness-test allow us to distinguish easy from potentially hard cases; although we will found infinite twisted generators and therefore infinite potentially hard cases asymptotically most cases will be easy. Twisted generators cases will be found on the extremes of the distributions we have described, that is, when the EVN order is big in relation to the order of the digraphs |V|. It is clear that the |V|/EVN ratio which lies in the limit within easy and potentially hard cases must be the same in both distributions (fixed degree/variable order and fixed order/variable degree) for each degree g.

So far the method consists on the Regularity, IAS-obstruction, Parity-obstruction and Smoothness tests. Although asymptotically most inputs will be easy, for practical applications as network engineering the small to moderate size cases (i.e. from 5! to 10!) might be the more interesting. In this size range still a relevant fraction of potentially hard cases can be found. So it is of interest in converting additional knowledge about the structure of twisted cases into fast procedures for solving the HT problem.

The smoothness test and the proof that asymptotically most cases will be easy has been discovered by the inventor. Regarding the former, new experimental facts regarding hamiltonian paths in 2-generated Cayley digraphs and case analysis after drawing by hand the digraphs has been necessary to this invention. Previous experimental work for cycles in 2-generated Cayley digraphs by F. Ruskey and S. Effler (see references in the background of the invention part) has been of much help. Regarding the later it needs knowledge of the smoothness property, Dixon method and the asymptotic of Landau function. As any skilled in the art would recognize both inventions are highly informative (i.e. will help to save computational resources as time or memory) for practical purposes.

Experimental results show that twisted cases can be classified in the following classes: Class of cases with intrinsic obstructions (for example the digraph of 24 vertices and twisted generators 123465 and 254613 has no HT; we have seen this case before and we will see it later); class of cases with relative obstructions and obstacles (an interesting case in this class is the digraph of 120 vertices, generators 1243675 and 253467, EVN 6 and no hamiltonian cycles, it has hamiltonian paths in all the other possible ending vertices but with some peculiarities which will be explored later; class of cases with relative obstructions but no obstacles (the digraph of 120 vertices and generators 13254 and 24513 has EVN 6 but HTs in only one of the six possible ending vertices and the HT are found directly without any backtracking by the searching procedure); class of cases with no obstructions but with obstacles (the digraph of 60 vertices with generators 34512 and 12453 has EVN 5 and HT in the two possible ending vertices; in one ending vertex the HT is found easily by the searching procedure; in the other possible ending vertex, the vertex 53241, the symmetry breaks from first choice, and in all subsequent choices; as a result only one HT exist and to find it the whole backtracking tree must be explored. We will see this case in more detail later); class of cases without obstructions nor obstacles, that is easy twisted cases (the digraph of 120 vertices generated by 13452 and 24513 is twisted has EVN 5 and HT in the 2 possible ending vertices; the searching procedure of the method has found them directly at both after more than 16 choices; as any skilled in the art can conclude, it is unlikely that they have been found by chance).

The following two tests will help us to give some clarity to this phenomenology.

The first test (step 5) identifies a structural property (entanglement) in inputs which when absent serves as a sufficient condition for HT in all possible SEVs so it separates all twisted cases in 2 classes: unentangled (or easy) and entangled (or potentially hard). The second next test (step 6) identifies a second structural property (cycle-entanglement) highly relevant for hamiltonicity which explains why some deterministic methods with limited time backtracking (Effler, 2002; op-cit. Unknown cases) and heuristics methods used up to now fails totally in some inputs if we ignore it (Ramyaa, 2004: op.cit.) and also provides the clue to a more efficient decision procedure (step 7) for an infinite family of cases.

Step 5 of the method of the invention: The test is based on checking the intersection of two permutation sets. The sets are those generated by the IAS and the DAS. Starting with the identity apply to it the IAS sequence (1n*(−xy)) and write the permutations generated until one repeats. Then apply the DAS sequence (1n*(x−y)) and write the permutations generated by this sequence until one repeats (again excluding the repetition). For regular IAS, the result of this test will be the same starting with one generator or the other (i.e. apply 1*n(−xy) or 1n*(−yx) for the IAS; resp. for the DAS) since both sequences generates the same sets. Two outcomes are possible: either the intersection set contains only the identity and then the input is unentangled or it contains the identity and other permutations and the input is entangled. Some not-commutative inputs are entangled;

some unentangled. On the other hand commutative or abelian inputs (with regular or irregular IAS) are always entangled. It is also important to note that this test classifies all twisted involutory inputs within the entangled class. This is the entanglement-test. All twisted unentangled inputs has a HT in all possible SEVs and the HT will be found easily by the searching procedure (at worst with a superficial backtracking) so they can be considered as easy. In FIG. 3 we present one of the several possible HTs for each possible ending vertex for an unentangled digraph of order 720.

Figure 2B:
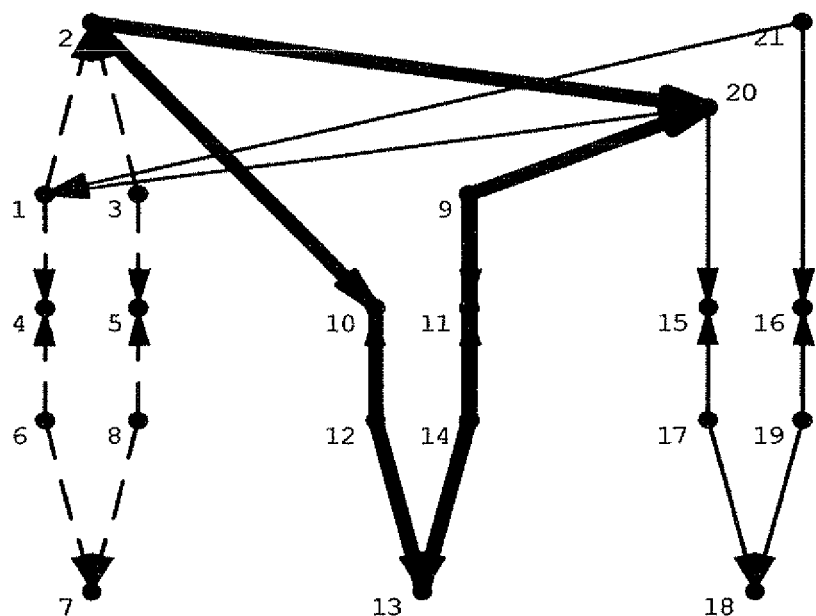
FIG. 2B shows an example of a not cycle-entangled case.

Step 6 of the method of the invention: this step tests another structural property (called cycle-entanglement) relevant for the hamiltonicity. This test must be applied only to entangled inputs (unentangled inputs can not be cycle-entangled). The procedure is based on checking the cardinality of the intersection of finite permutation sets: A generator, let's say x, must be taken and must be applied iteratively to the identity in order to obtain the one-generator forward sequence and the set of permutations generated by it (called cycle set). Then starting from the identity the set of permutations generated by the IAS (starting by same generator x) must be obtained. Cycle set/IAS intersection must be tested. If the cardinality of the intersection is two (the identity and the permutation −x) then the one-generator x cycle is unentangled. If there are more permutations than two in the intersection then the one-generator x cycle is entangled. The test must be effected also for the other one-generator cycle. In fact this test checks how many arcs from the same IAS belongs to the same one generator x cycle. This number "m" or "n" and denote by CE(x,y)=(n, m), ranges from 1 to (|x|/2)) and is another important parameter for hamiltonicity. Two cases are possible: entangled inputs where none of the cycles are entangled then the input is CE(x,y)=(1,1) and cycle-entangled inputs where only one of the cycles is cycle-entangled then CE(x,y)=(1, m) or where the two are cycle-entangled (CE(x,y)=(m,n). An example of cycle-entangled cycle can be seen in FIG. 2A. In this figure vertex labels are arbitrary and the digraph might not represent a real input. Vertex sequence (1,2,8,7,1) is a one-generator cycle. Arcs (1→2) and (8→7) belongs to the same IAS and must be glued in the reduction transformation. By symmetry arcs (2→8) and (7→1) belongs to another IAS (which is not completely represented) and must be glued in the reduction transformation. In FIG. 2B is shown a non cycle-entangled cycle: (1,2,20,1). Every arc in the cycle belongs to a different IAS.

Step 7 of the Method of the Invention:

If after the test of step 6 of the decision procedure the input turns out to be cycle-entangled then a reduction from the input into a smaller parameters size input must be done by gluing or identifying all the arcs from the same IAS which are in the same one-generator cycle. This way an input G1 with parameters {|V|,|x|,|y|,CE(x,y)=(1,n),EVN}, that must be called the extended input or digraph, can be transformed into digraph G2={|V|/n, |x|, |y|/n and EVN/n}, called the reduced input or digraph and vice versa. It is important to realize which properties are invariants under such reductions or transformations: the ratio |V|/EVN is invariant; the activation of all the IAS of a given input by one or the other generator is invariant; the hamiltonicity-traversal property is another invariant in the sense that if the extended input has this property then the reduced must have it; and if the reduced has not a HT then the extended can not have a HT and vice versa; even the number of hamiltonian traversals is an invariant.

The fact that both the hamiltonicity-traversal and number of hamiltonian traversals are conserved after such reductions can be seen by effecting the reduction transformation in an input with an HT marked as follows: start with a cycle-entangled CE(x,y)(1,m) input with at least one HT; mark the identity and any hamiltonian traversal (cycle or path); as a result all the IAS are activated; inactivate the identity IAS; this last action is equivalent to cut the HT in a as much disjoint pieces or paths as the EVN; now glue or identify the arcs as explained in paragraph 066 and a reduced digraph with EVN/m disjoint paths connected by the inactivated identity IAS of order EVN/m will be obtained; solve the perfect matching (this situation can be modelled as a perfect matching in a bipartite graph which fulfils the Hall necessary and sufficient condition and as it is known by any skilled in the art can be solved always efficiently); this will yield a HT in the reduced digraph. The reverse transformation or extension (from the reduced digraph to the extended digraph) can be done in a similar way. For effecting this procedure arbitrary numbers must be assigned to vertices and arbitrary colours to IAS (i.e. we can assign a letter or a number to each 1 in the matrix representation of the digraph which belongs to the same IAS).

When the input is not known to be hamiltonian the reduction must be done first, then an HT must be found in the reduced input and once found (if any) just extend it to the extended digraph as explained in previous paragraph. In fact this will be part of the searching procedure (we call it the reduce procedure) for cycle-entangled digraphs. This will reduce the searching space but the search will be hard anyway if the reduced digraph is hard.

It is important to realize that the starting and ending vertex of a hamiltonian path is not an invariant. For instance let's take the digraph of generators 124365 and 213564 of 24 vertices and EVN 6; let's label it with arbitrary numbers from 1 to 24. Let's reduce it to a digraph of 12 vertices and EVN 3 keeping vertex labels. The extended digraph has only one palindromic hamiltonian path ending at vertex labelled 8. When effecting the procedure as above, we obtain a non palindromic (palindromic property is neither an invariant) hamiltonian path ending at vertex labelled 4 or 10 (when we identify two arcs we identify also its corresponding vertices).

On the other hand the ending vertex of a hamiltonian cycle is an invariant so that if the HT is a cycle it will be transformed into a cycle. This provides a procedure to decide when a cycle-entangled input can not have a hamiltonian cycle:

by Rankin method (see step 3) we know that inputs with odd EVN can not have hamiltonian cycles if |V| is even; when the extended input has an even EVN (and this implies that |V| is even) which is not a power of 2 (i.e. what we can call a mixed even) and CE parameter is even, the EVN of the reduced must be odd and therefore can not have hamiltonian cycle; from this and previous comments it follows that in these conditions the extended digraph can not have a hamiltonian cycle neither. This part can be seen as a generalization of the Rankin method (parity-obstructions-test) to some inputs of even EVN and helps to save great resources to network designers. For instance: most of the 2-generated Cayley digraphs of order 720 in Effler thesis (2002), for which the answer to the hamiltonicity question is labelled unknown are cycle-entangled with a mixed even EVN and odd CE parameter. After applying our method we can confirm that the answer is no to most of these. This procedure is called the reduced-parity obstructions test.

The number of HTs is another invariant. This fact can be used as a sign of obstructions in the extended digraph. For example, if the reduced has only 2 HT and the extended has an EVN=4 it is clear that there will be at least 2 obstructions.

Now we Introduce Some Interesting Examples of Cycle-Entangled Digraphs:
The cycle-entangled digraph (by the two cycles) with parameters {|V|=24, generators 21456783 of order 6 and 36572841 of order 6, and EVN 4} which has HT in all possible 4 SEVs, reduces to an unentangled digraph of parameters {|V|=12, generator1 of order 3, generator 2 of order3, EVN=2}, with several HTs in the two possible SEVs; it is an example of an easy cycle-entangled digraph; the digraph of 24 vertices, generators 124365 of order 2 and 213564 of order 6 and EVN 6 and obstructions in all possible SEVs except in one which reduces to an entangled (since it has an involution) digraph of parameters {12,2,3,3}) is an example of a pair of digraphs where we can decide that no Hamiltonian cycles can be found just by applying the reduced-parity test; The digraph of 120 vertices is cycle-entangled, has generators 1243756 of order 6 and 7134256 of order 5, EVN 6 and has not any hamiltonian cycle, since the reduced has an odd EVN, but has hamiltonian paths in all the four possible ending vertices was presented before; its particularity is that after applying the searching procedure to the extended for two of the SEVs the searching procedure found it directly or after a superficial backtracking (11 choices) but for other two SEVs it had to effect the deep backtracking of more than 500 choices. It reduces to a digraph of 60 vertices, generators of order 3 and 5 and EVN 3. Since the reduced part of the searching method has not been implemented in a computer system and tested experimentally so we do not know if the searching procedure is easy or hard after reduction though only one of the answers is expected since the reduced EVN is 3.

If hard searching extended cases might be solved easily by reduction it seems not impossible that by extension, entangled not cycle-entangled hard cases might be also solved easily.

For instance, an actually entangled not cycle-entangled hard case, already introduced before, belongs to an interesting family which can be described by following parameters: one generator, x, must be of order 3, the other generator, y, of variable order n, the EVN also of variable order n, the relation (x–yx)=(–xy–x) must hold (and therefore it must be entangled); the digraphs of this family admit always a recursive construction and a planar embedding; the digraph is finite up to n=5 i.e. from n>5 only infinite digraphs fulfils this parameters; n=4, with |V|=24 and generators x=1342 and y=2413 is an example of a non-involutory entangled non-cycle-entangled digraph with no hamiltonian cycles. N=5, our example, is a paradigm of a digraph with obstacle, where symmetry breaks from first choice and in all subsequent choices: it has 60 vertices, with degree 5 generators 12453 of order 3 and 34512 of order 5, EVN 5. According to previous explanations this digraph can not have hamiltonian cycles but can have hamiltonian paths ending in permutations 31452 and 53241. The interesting point is that the searching part of the method with the greedy arc-choice step finds of the several hamiltonian paths ending at 31452 directly (after several arc-greedy choices) but needed a deep backtracking to find a hamiltonian path ending at 53241. It can be shown that one and only one hamiltonian path exists ending at this vertex 53241. This type of instances seems totally unapproachable by any method but backtracking. Can this case be solved easily in any of its extensions (reduction transformation is an homomorphism so several extended digraphs might have the same reduction and a reduced digraph is expected to have several extensions if any; concretely this digraph might have an extension of 120 vertices, generators of order 6 and 5 and EVN 10 or an extension of 120 vertices generators of order 3 and 10 and EVN 10 . . . ) ?

Other important question about this case: why the symmetry does not break at 31452 as ending vertex but does break at 53241 ? The main difference is that 53241 is precisely the vertex where the IAS/DAS meet: the identity and this vertex share their IAS and DAS, the choice of the first arc in the HT determines the last arc in the HT.

Some of this dependencies are absent in the other possible ending vertex.

Steps 5, 6 and 7 of decision procedure has been discovered by the inventor.

Again new experimental data produced by the inventor regarding hamiltonian paths in 2-generated Cayley digraphs, and case analysis has been the key facts.

Previous experimental data form S. Effler for cycles has been of much help. The asymmetric hardness of the case of 60 vertices was an important clue to realize that entanglement and dependencies is cause of obstructions and obstacles. From the cycle-entangled property and the reduction transformation the correctness of invariance of hamiltonicity-property follows. The generalization of Rankin method is unknown and provides a powerful method for deciding some well known hard cases (i.e. most "unknown" cases in Effler-Ruskey experimental results; op.cit.).

Step 8 of the method of the invention: Dependencies within the IAS/DAS in the identity neighbourhood in entangled inputs may cause not only cases with obstacles but also cases with intrinsic obstructions (i.e. digraphs with no HT). For brute force methods digraphs with intrinsic obstructions are the hardest so it is of high interest to develop a test which can identify all or some of these cases efficiently.

A simple and highly illustrative case is the digraph of 24 vertices and generators x=254613 of order 3 and y=123465 of order 2 and EVN of order 6 and therefore the digraph can be decomposed in 4 IAS. This digraph shows maximum dependence: every IAS is connected with every other IAS. In this case, before marking the SEV the following analysis can be made: a cycle of order 3 by generator x can only be activated in one way (up to symmetry); that is at least two of its arcs must be activated (if not a two cycle will be forced making impossible to find an HT); for the same reason the third x are can not be activated and this forces this IAS to be activated by y; at this stage there are 3 of the 4 IAS activated. If we activate the remaining IAS by generator x a non hamiltonian cycle will be forced; if we activate by the other generator another non hamiltonian cycle will be forced. It should be noted that since no ending vertex has been marked in the IAS only cycles can be forced. In summary: the fact that one of the generators is an involution restricts to one the possible non-contradictory activation of the other one-generator cycles of order 3. Now after the non-contradictory activation of a non-involutory cycle propagation starts which activates all the IAS, leads to a contradiction. It can be concluded that this input has not an HT.

This procedure can be extended to the general case: when the order of the non-involutory generator is higher than 3, several non-contradictory activations will be possible. For counting purposes (of how many non-contradictory activations are possible) these cases can be modelled by a 2-colouring of a necklace taking into account symmetries. The Polya-Redfield counting theorem allows to conclude that this number will always be bounded by a polynomial. To conclude that the input has not an HT, all possible non-contradictory activations of the non-involutory cycle must lead to a contradiction by propagation (without any further choice step). When this happens we say that the input is 1-compact.

If an input is 1-compact then it has intrinsic obstructions. One may think that compactness depends on the order of the digraph or on the order of the non-involutory generator, but this is not the case: inputs of 120 vertices has been found to be 1-compact. For instance it can be shown that the entangled not cycle-entangled digraph of generators 13254 of order 2 and generator 24135 of order 4 and EVN 6 is 1-compact. Also the entangled not cycle-entangled digraph of 120 vertices and generators 124573 of order 5 and 2136745 of order 2 and EVN=10 is 1-compact. In fact it is conjectured that there are infinite 1-compact inputs. This general procedure of intrinsic obstructions detection is step 8 of decision procedure and is called 1-compactness-test.

On the other hand it can be seen, by construction of a counterexample, that the reverse proposition (all cases with intrinsic obstructions are 1-compact) is not truth: the entangled digraph of 120 vertices and generators 341265 of order 2 and 124563 of order 4 and EVN=5 has intrinsic obstructions but is not compact. In this cases, for which it is also conjectured that there are infinite cases, the propagation does not activate all possible IAS.

The set of IAS activated by propagation after any non-contradictory activations of a cycle is the propagation cluster. N-compact inputs are those cases with intrinsic obstructions but non 1-compact. A test similar to the test in step 8 and called n-compactness-test can be generalized for these cases: for all possible propagation clusters test if a contradiction arises; if that is the case it can be concluded that the digraph has intrinsic obstructions. This leads to a multiplicative procedure which will be efficient only if from some fixed digraph order |V| the number of propagation clusters does not increase (is fixed) with the order of the digraph; otherwise it will be inefficient. The fact that asymptotically hard cases will be found in the extremes of the distribution where the EVN are big compared to the number of vertices does not rule out the first possibility. In any case at this stage if after the 1-compactness test is not 1-compact the method allows to decide whether to apply the n-compactness test whether go directly to the searching procedure.

After experimental results obtained using an implementation of the searching procedure which will be described later, of all the possible 2-generated Cayley Digraphs of the Symmetric group of order 24 (up to isomorphism and according to the data in Effler, 2002) only the case cited above has been shown to have intrinsic obstructions. Of those of SS (120 vertices) many cases have been found: all of them involutory, of EVNs 5,6, 10,12 . . . , entangled not-cycle entangled or cycle-entangled.

Here ends the description of the decision procedure. Bellow we summarize what we have described so far:
Input: the identity, two generators (any pair of permutations, different from the identity of the same degree)
Decision Procedure:
Step 1: IAS-regularity-test. If regular go to next test. Otherwise stop.
Step 2: IAS-obstruction-test. Determination of the set of SEVs.
Step 3: Parity-test. Effects a sieve on the set of SEVs in inputs with odd EVN depending on the parity of |V|.
Step 4: Smoothness-test. If smooth go to searching procedure. If twisted go to next step.
Step 5: Entanglement test. If unentangled go to searching procedure. If entangled go to next step.
Step 6: Cycle-entanglement test. If cycle-entangled go to next step. Otherwise go to step 8.
Step 7: Reduction and reduced-parity test: reduce; apply reduced-parity-test and go to next test step.
Step 8: compactness test. If 1-compact print "this digraph has not an HT" and stop. If not 1-compact, either apply the n-compactness test, either go to searching procedure.

The two tests in Step 8 has been discovered by the inventor. After all these tests every input can be classified into two main classes: easy and potentially hard. Potentially hard inputs class (entangled and cycle entangled) still includes easy cases so it is desirable, maybe more for theoretical purposes than for practical purposes, that additional structural properties are discovered so that easy cases can be separated more accurately from hard cases.

Here starts the description of the searching procedure. During this description the counting and optimization procedures are described also. For the simplicity of explanation the searching part of the method is better explained using the permutation representation, digraph description and adjacency matrix as data structure. However it will be apparent for those skilled in the art that the searching part of the method of the invention is invariant under changes of the object used for representing the elements and generators, the data structure and many other other parameters such as (labels, weights, colours, symbols . . . ).

For better understanding of the description first a reminder of some basic facts about 2-generated cayley digraphs that must be kept in mind to understand the searching part of the method: each vertex has two in arcs, one for each generator, and two out arcs one for each generator; in a HT, if a cycle, for every vertex only one arc points to it and only one are outs from it; if a path no vertex points to the starting or initial vertex and no are outs from the ending vertex.

Depending on the class the input is classified after the decision procedure, the searching procedure can be more complex or simpler. In fact all the searching procedures of this method can be obtained from the most complex by simplifying some steps. The most complex searching procedure is the one to be applied to cycle-entangled inputs, which includes the reduction procedure explained before; if such reduction procedure is eliminated, the searching procedure for all not abelian and not cycle entangled inputs is obtained. Simplifying again the procedure the simplest procedure for regular abelian inputs is obtained. Since the reduction procedure has been explained in details in step 7 of the decision procedure we assume that all the inputs are:
or no-commutative non-cycle entangled
or no-commutative cycle-entangled reduced to a non-commutative input
or abelian.

The searching procedure for not-commutative inputs is described firstly and secondly the procedure for regular abelian. Since both the decision and searching procedures are parts of the same method the first step number of searching procedure (step 9) follows the last step number (step 8) of decision procedure.

Before starting with the detailed description some tools that will be used in the searching procedure are introduced (of which some are well known by any skilled artisan):
We remind that for convenience the identity have been declared to be the starting vertex of the HT (by vertex-symmetry any other choice would yield same result).
Since every Cayley digraph is vertex-transitive any other choice of the identity will not change the results. From step 2 of decision procedure it must be clear that the IAS which contains the identity also contains all possible ending vertices.

The digraph is decomposed in IAS as follows: generate the identity IAS; select a permutation not included in the identity IAS and starting with it generate its IAS; repeat the same procedure until no more IAS can be generated. The cardinality of the IAS (|IAS|) divides the number of vertices of the digraph (|D|). This object is the IAS list.

If in any IAS (excluding the identity IAS which includes the starting vertex (identity) and the ending vertex) an arc (let's say (v1,v2)) is marked, labelled with one generator (let's say x) as belonging to the HT, then the other arc (v3,v2) which points to v2 and which must be labelled with the other generator (let's say y) can not be in the HT; then the arc labelled with x which outs from v3 must be in the HT and so on. This propagation of consequences is usually called arc-forcing. To simplify, here we call "to activate an IAS set by generator x . . . " to the action of marking generator x in an IAS set. It is clear that due to the arc-forcing procedure an IAS not containing the identity must be activated by one generator or the other. But as we will see later this is not truth for the identity IAS.

Knowing all this tools, as noticed by many artisans before, there is an obvious worst case time complexity $O(2^{(|G|/order(-xy))})$ method to search for a hamiltonian cycle or path: choose an initial vertex, and just generate all possible activations of all IAS sets and for each possible activation check if it is a Hamiltonian cycle. Some heuristic variants for this method was tested (for details see Ramyaa, op.cit. 2004) in a restricted 2-generated Cayley Digraphs class (the class where one of the generators is an involution).

Input: the 2-generated Cayley digraph corresponding to generators x,y; IAS list corresponding to this digraph; identity IAS with the SEVs marked after decision procedures. If the original input was a cycle-entangled input the details of the reduction (arbitrary number and colour assignments) must be kept in memory in order to apply the extension procedure once the HT has been found in the reduced digraph.

Step 9 of the method of the invention (or vertex-choice step): select a definite SEV within the SEVs of the identity IAS; delete the identity IAS from the IAS list; effect a propagation of consequences which includes the arc-forcing procedure and a SEVpath/cycle checking procedures (see bellow). Some arcs will be marked as belonging to the HT (this can be done by transforming the corresponding "1" into an "h" in the matrix representation of the digraph), and some will be deleted (this can be done by transforming the corresponding "1" into an "0" in the matrix representation of the digraph). If a cycle vertex has been marked as ending vertex (an ev adjacent to the identity) then the identity IAS set will be activated by only one and the same generator after the arc-forcing. If a path ending vertex is marked then some arcs of identity IAS set will be activated by one generator and others by the other generator after the arc-forcing.

The well known arc-forcing technique has been described before. Now we describe the SEV path/cycle checking procedure:
take any IAS from the IAS list; activate it by generator x and mark the activated arcs as belonging to the HT; check or test if there is a marked non-hamiltonian path from the starting vertex to the ending vertex (we call this the SEV-path-test); if there is not such a path, check if there is a marked non-hamiltonian cycle (we call this the cycle-test). If there is not such a cycle then activate the same IAS by generator y and do the SEV-path-test and the cycle-test. If there is not such a path or cycle let the IAS in the IAS list, and take the next IAS in the list and repeat the same procedure. Repeat it for all the IAS. If for some IAS activated by one of the two generators the test had yield a non-hamiltonian path or cycle, then it can be concluded that this IAS must be activated definitively by the other generator so activate it by the other generator and delete this particular IAS from the IAS list; re-start the procedure for all the remaining IASs in the list again until no more changes are detected. If for a given IAS the SEV-path-test or cycle-test yields true for both generators then it can be concluded that there is a relative obstruction within this particular choice of SEV. Another SEV choice must be made. It is clear that the order on which the IAS is taken from the IAS list, the order on which we mark generators x and y for each IAS, or the order on which the SEV-path-test and cycle-test is effected does not change the result. For simplicity from now on the arc-forcing+SEV-path-test+cycle-test will be called propagation procedure.

The SEV-path-test+cycle-test is a great consumer of one computational resource (time), if the check has to be done iteratively for all the IAS and repeated until nothing change; for implementation purposes this procedure can be optimized as follows: when marking an IAS we can test if any of its arcs are connected with the other already marked IAS in previous iterations; if it is not the case then the SEV-path-test/cycle-test can be saved.

Step 9 terminates in three possible situations: a stable situation with one (the identity IAS) or several IAS sets activated and no contradiction; the output of an HT and then the whole procedure terminates; the output of one or several obstructions (there are even n-compact cases for which the output at this stage is an obstruction for any ev choice (examples: the digraph of 24 vertices, EVN 6 and degree 6 generators 123465 and 254613; the digraph of 120 vertices, EVN 6 and degree 2 and 5 generators 13254 and 24135 etc. . . . ) and an stable situation for a particular SEV.

Some parts of Step 9 are not new; some parts has been discovered by the inventor: SEV marking follows directly from decision procedures; arc-forcing propagation is well known by any skilled in the art; SEV-path test and cycle-test after the marking iteratively all the IAS in the IAS list until no more changes appears is a new procedure which has been discovered by the inventor. It is specific for this kind of combinatorial objects or digraphs and is necessary for any deterministic method to end successfully the search of an HT: in easy cases or you effect this procedure or some arcs will not be pruned correctly and the next step of the method (step 10 or arc-choice step) might not work correctly; in hard cases where mistakes in the arc-choice step seems unavoidable this procedure will greatly reduce the searching space (backtracking iterations). Restrictions in Ramyaa (op.cit. 2004) method embody some kind of procedure similar to cycle-test but it is concluded there that non-involutory restrictions does not yield great advantages. In fact each iteration in Ramyaa thesis can be considered as a backtracking iteration in the method of present invention and it can be seen in his report how many iterations some cases might need. As already explained for easy cases the backtracking iterations in the method of present invention reduce to 0 or a superficial backtracking of around 10 iterations. This data can be compared with data reported by Ramyaa (unfortunately this thesis does not report iteration results for cases of 120 or 720 vertices are the best known).

Step 10 of the Method of the Invention (or Arc-Choice Step):
this step takes the output of step 9 (the digraph in a stable situation) and within the remaining free arcs (those not marked nor deleted in previous step) marks any arc as belonging to the HT. This choice can be done in a greedy manner, by random or according to any preferential criteria depending on the purpose: if for searching, counting or optimization.

For instance, for counting purposes, an upper bound of the number of HTs within an initial vertex and an ending vertex can be obtained with the following arc-choice and counting instructions: choose always the generator x of shortest order until an HT is obtained and count the number of choices (i); repeat the procedure on the same SEV but now choose always the other generator y until a (different) HT is obtained and count the number of choices (j); then a formula for the upper bound for the number of HT within this particular SEV is the finite power sum $(2^i+2^{(i+1)}+ \ldots +2^{(j-1)}+2^j)$. This counting procedure must be repeated for all possible ending vertices choices for a fixed starting vertex and add all this partial sums (for each EV) in order to get an upper bound for the total number of HT in the given input. This is the counting procedure.

As any skilled in the art will can realize the procedure will work exactly as well starting the count by generator y and then by generator x or changing the order on which the procedure is effected for any ending vertex.

Optimization implies, generally speaking, a choice of a particular subset of solutions which fulfils some requirements, within all possible solutions.

Since Step 10 of the method admits choices specification according to any criterion, it can be easily adapted for optimization purposes. In some cases all possible solutions need to be generated. As any skilled in the art will recognize this can also be done easily by some variations in the method we are describing.

For convenience and simplicity of explanation the arc-choice instruction selected here (and implemented for experimental tests) is suited for searching purposes: choose always the first found arc in the row of the starting vertex (identity) or in the row of the last vertex of the path of marked arcs (as belonging to the HT) starting from the starting vertex; as any skilled in the art can realize the result will be the same with any other particular choice. As we have seen before, for inputs where obstructions or obstacles are expected to be found (where symmetry breaks at some stage of the procedure), the effected choice can be wrong. Therefore for the backtracking procedure the situation of the digraph and the IAS list must be saved in a stack (let's call it the backtracking digraph and IAS list stacks) before each choice in order to recover it in case of backtracking.

Once arc-choice has been done the propagation procedure starts. As a result some arcs will be marked as belonging to the HT and some will be pruned. As in first step, second step can terminate in three possible outcomes:
it produces an HT and then the whole procedure terminates;
an obstruction and then we must try with the alternative arc-choice and propagate;
or a stable situation and then we must effect a new arc-choice.

If after finding an obstruction the alternative arc-choice also leads to an obstruction backtracking procedure starts. If we are in first arc-choice it could be the case that backtracking stacks are empty and therefore we can conclude that there is no HT within this particular SEV and a new SEV must be chosen. If stable situation, new arc-choices-propagation must be made iteratively until a HT is constructed.

Procedures in Step 10 is a discovery of the inventor and is a consequence of all facts explained previously. The counting procedure is also a discovery of the inventor and it is conjectured that for easy cases will yield a good upper bound on the number of HT. Taking into account that the fact that the number of HTs depends on the degree of freedom of a given input, and this depend on the EVN and the size of the orders of the generators it should follow an algebraic formula for the upper bound.

Complexity results. As it has been shown during the description of the decision procedure this searching procedure will find an HT directly (without backtracking) or with a superficial backtracking) in all inputs (easy cases) except possibly the entangled inputs or cycled-entangled inputs reducible to entangled inputs (hard cases). For evaluating the computational complexity of the procedure two parameters can be used as the size of the input: the degree of the permutation and the number of vertices.

Regarding the first parameter almost every routine in the decision procedure needs the construction of the IAS. By Landau function we can conclude that in the worst case (when the order of the IAS is the maximum order of the corresponding degree) the procedure is exponential with the degree.

Regarding the second parameter and the easy cases the worst case time complexity for both the decision and searching procedures is polynomial in the number of vertices (assuming that we equate direct founding with superficial backtracking founding). For the later (hard cases) the worst case time complexity is exponential in the number of vertices. In any case the use SEV-path-test/cycle test in the propagation step greatly improves available procedures, by effecting a more accurate arc-pruning and therefore minimizing the possibility of making mistakes in free-choice.
Experimental Results:

The decision and searching procedures has been software implemented for testing its performance in a computer system. When evaluating the performance it must be taken into account that the purpose of the test has been to test efficacy and not efficiency: the implementation has been done in high level interpreted language which as it is well known by any skilled artisan is slow compared with other alternatives; the data structure used for representing the digraph has been an adjacency matrix which as it is well known by any skilled artisan is the slowest data structure for representing sparse graphs as 2-generated Cayley digraphs; finally some procedures as propagation step has not been optimised (i.e. the SEV-path-test/cycle-test is a great consumer of time if the check has to be done iteratively for all the IAS and repeated until nothing change; it is also clear that when marking an IAS we can test if it is connected with the other already marked IAS in previous iterations; if it is not the case then the SEV-path-test/cycle-test can be saved with great time savings); the reduction step for cycle-entangled inputs, within we can found the hardest, has not been implemented. The computer system processor is an Intel Centrino. None of the inputs tested needed external memory. Changing all this implementation parameters the performance can greatly be improved.

Under this implementation both for easy and hard cases the procedure takes minutes in the worst case for inputs up to 200 vertices; easy cases can take from one/two hours (up to 400 vertices) to several hours (inputs up to 1000 vertices). In bellow lists it can be seen the result in tabular form of this software implementation to an unentangled case of 720 vertices and EVN of 10. As expected, after the decision procedure the searching procedure found HTs in all the possible ending vertices, starting at the identity. We show an HT for each possible ending vertex. It took within 10 to 12 hours for each instance. The input has generators 12436785 and 35412867. For implementation purposes in all solutions bellow the identity and therefore the list of object to be permuted is {2,3,4,5,6,7,8,9}. In FIG. 3 is shown the IAS corresponding to this input Then in the nine lists bellow is shown the hamiltonian traversal for the 9 of the 10 possible ending vertices choices. In all the lists bellow the HT must be red from left to right and up to down, vi is the starting vertex (23456789) and vf is the ending vertex. In List 1 is shown the hamiltonian cycle at ending vertex vf=56243897. Backtracking started at arc-choice 49 and needed three additional backtraking iterations. A backtraking iteration extracts the last matrix from the stack, marks one of the two arc-choice, propragates and if a contradiction arises marks the other arc-choice. If in one or the other activation a stable situation is reached, another arc-choice is done, so for each backtracking iteration several arc-choices can be done. In this case the hamiltonian cycle was found at arc-choice 53: of the 3 backtracking iterations one has 2 arc-choices. That's what is called a superficial backtracking. In List 2 is shown the hamiltonian path at ending vertex vf=28546739, obtained directly after 48 arc-choices. In List 3 is shown one hamiltonian path at ending vertex vf=54278963. Solution was found after one backtraking iteration which started at arc-choice number 48 and had 3 arc-choices. In List 4 is shown a hamiltonian path at ending vertex vf=29547386 obtained directly after 47 arc-choices. In List 5 is shown a hamiltonian path at ending vertex vf=53249678. Backtracking started after arc-choice 48 and ended after two iterations and 4 arc-choices. In List 6 a hamiltonian path ending at vf=26543897; bactracking started after arc-choice 47, needed 3 iterations and 6 more arc-choices. In List 7 a hamiltonian path found directly at ending vertex vf=58246739 after 46 arc-choices. In List 8 a hamiltonian path at ending vertex vf=27548963; backtracking started after arc-choice 45 and needed 4 more arc-choices. In List 9 a hamiltonian path at ending vertex vf=59247386. Backtracking started after arc-choice 46, needed 8 iterations and 22 more arc-choices. This was the hardest solution to be found. Equally we could have shown a tenth List with the hamiltonian cycle ending at 23549678 in whose search backtracking started after arc-choice 52 and needed 1 iteration.

List 1:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3}, {2,9,4,5,8,3,6,7}, {4,8,5,2,9,7, 3,6}, {5,9,2,4,8,6,7,3}, {2,8,4,5,9,3,6,7}, {2,8,5,4,3,6,7,9}, {2,8,4,5,6,7,9,3}, {2,8,5,4,7,9,3,6}, {5,7,4,2,8,6,9,3}, {4,8, 2,5,7,3,6,9}, {2,7,5,4,8,9,3,6}, {2,7,4,5,9,3,6,8}, {2,7,5,4,3, 6,8,9}, {2,7,4,5,6,8,9,3}, {4,6,5,2,7,3,8,9}, {5,7,2,4,6,9,3, 8}, {2,6,4,5,7,8,9,3}, {2,6,5,4,8,9,3,7}, {2,6,4,5,9,3,7,8}, {2,6,5,4,3,7,8,9}, {5,3,4,2,6,9,7,8}, {4,6,2,5,3,8,9,7}, {2,3, 5,4,6,7,8,9}, {2, 3,4,5,7,8,9,6}, {2,3,5,4,8,9,6,7}, {5,8,4,2, 3,7,9,6}, {4,3,2,5,8,6,7,9}, {2,8,5,4,3,9,6,7}, {2, 8,4,5,9,6, 7,3}, {2,8,5,4,6,7,3,9}, {5,6,4,2,8,9,7,3}, {4,8,2,5,6,3,9,7}, {2,6,5,4,8,7,3,9}, {2,6, 4,5,7,3,9,8}, {2,6,5,4,3,9,8,7}, {2,6, 4,5,9,8,7,3}, {4,9,5,2,6,3,8,7}, {5,6,2,4,9,7,3,8}, {2,9, 4,5, 6,8,7,3}, {2,9,5,4,8,7,3,6}, {2,9,4,5,7,3,6,8}, {2,9,5,4,3,6,8, 7}, {5,3,4,2,9,7,6,8}, {4,9,2, 5,3,8,7,6}, {2,3,5,4,9,6,8,7}, {2,3,4,5,6,8,7,9}, {2,3,5,4,8,7,9,6}, {2,3,4,5,7,9,6,8}, {4,7, 5, 2,3,8,9,6}, {5,3,2,4,7,6,8,9}, {2,7,4,5,3,9,6,8}, {2,7,5,4, 9,6,8,3}, {2,7,4,5,6,8,3,9}, {2,7,5,4, 8,3,9,6}, {5,8,4,2,7,6, 3,9}, {4,7,2,5,8,9,6,3}, {2,8,5,4,7,3,9,6}, {2,8,4,5,3,9,6,7}, {2,8,5,4, 9,6,7,3}, {2,8,4,5,6,7,3,9}, {4,6,5,2,8,9,7,3}, {5,8, 2,4,6,3,9,7}, {2,6,4,5,8,7,3,9}, {2,6,5,4,7, 3,9,8}, {2,6,4,5, 3,9,8,7}, {4,3,5,2,6,7,9,8}, {4,3,2,5,7,9,8,6}, {4,3,5,2,9,8,6, 7}, {5,9,2,4,3, 7,8,6}, {2,3,4,5,9,6,7,8}, {4,9,5,2,3,8,6,7}, {5,3,2,4,9,7,8,6}, {2,9,4,5,3,6,7,8}, {2,9,5,4,6,7, 8,3}, {2,9, 4,5,7,8,3,6}, {2,9,5,4,8,3,6,7}, {5,8,4,2,9,7,3,6}, {4,9,2,5,8, 6,7,3}, {2,8,5,4,9,3, 6,7}, {2,8,4,5,3,6,7,9}, {2,8,5,4,6,7,9, 3}, {2,8,4,5,7,9,3,6}, {4,7,5,2,8,6,9,3}, {5,8,2,4,7,3,6, 9}, {2,7,4,5,8,9,3,6}, {2,7,5,4,9,3,6,8}, {2,7,4,5,3,6,8,9}, {2,7, 5,4,6,8,9,3}, {4,7,2,5,6,9,3,8}, {2,6,5,4, 7,8,9,3}, {5,7,4,2, 6,3,8,9}, {4,6,2,5,7,9,3,8}, {4,6,5,2,9,3,8,7}, {4,6,2,5,3,8, 7,9}, {2,3,5,4,6,9, 8,7}, {2,3,4,5,9,8,7,6}, {2,3,5,4,8,7,6,9}, {5,8,4,2,3,9,7,6}, {4,3,2,5,8,6,9,7}, {2,8, 5,4,3,7,6,9}, {2,8, 4,5,7,6,9,3}, {2,8,5,4,6,9,3,7}, {5,6,4,2,8,7,9,3}, {4,8,2,5,6, 3,7,9}, {4,8,5,2,3,7,9,6}, {5,3,2,4,8,6,7, 9}, {5,3,4,2,6,7,9,8}, {5,3,2,4,7,9,8,6}, {5,3,42,9,8,6,7}, {4,9,2,5,3,7,8,6}, {4,9,5,2,7,8,6,3}, {4,9,2,5,8,6,3,7}, {2,8, 5,4,9,7,6,3}, {5, 9,4,2,8,3,7,6}, {4,8,2,5,9,6,3,7}, {2,9,5,4, 8,7,6,3}, {5,8,4,2,9,3,7,6}, {5,8,2,4,3,7,6,9}, {5, 8,4,2,7,6, 9,3}, {4,7,2,5,8,3,6,9}, {4,7,5,2,3,6,9,8}, {4,7,2,5,6,9,8,3}, {4,7,5,2,9,8,3,6}, {5,9, 2,4,7,6,8,3}, {5,9,4,2,6,8,3,7}, {4,6, 2,5,9,7,8,3}, {2,9,5,4,6,3,7,8}, {5,6,4,2,9,8,3,7}, {4,9, 2,5, 6,7,8,3}, {4,9,5,2,7,8,3,6}, {4,9,2,5,8,3,6,7}, {2,8,5,4,9,7,3, 6}, {5,9,4,2,8,6,7,3}, {5,9,2, 4,6,7,3,8}, {5,9,4,2,7,3,8,6}, {5,9,2,4,3,8,6,7}, {2,3,4,5,9,7,8,6}, {4,9,5,2,3,6,7,8}, {5,3, 2, 4,9,8,6,7}, {2,9,4,5,3,7,8,6}, {2,9,5,4,7,8,6,3}, {5,7,4,2, 9,3,8,6}, {5,7,2,4,3,8,6,9}, {2,3,4,5, 7,9,8,6}, {2,3,5,4,9,8, 6,7}, {5,9,4,2,3,7,8,6}, {5,9,2,4,7,8,6,3}, {2,7,4,5,9,3,8,6}, {4,9,5,2, 7,6,3,8}, {4,9,2,5,6,3,8,7}, {2,6,5,4,9,7,3,8}, {5,9, 4,2,6,8,7,3}, {5,9,2,4,8,7,3,6}, {5,9,4,2,7, 3,6,8}, {4,7,2,5, 9,8,3,6}, {4,8,5,2,7, 3,6,9}, {5,7,2,4,8,9,3,6}, {5,7,4,2,9,3,6,8}, {4,9,2,5,7,8,3,6}, {4,9,5,2,8,3,6,7}, {4,9,2,5,3,6, 7,8}, {4,9, 5,2,6,7,8,3}, {5,6,2,4,9,3,7,8}, {5,6,4,2,3,7,8,9}, {5,6,2,4,7, 8,9,3}, {2,7,4,5,6,3, 8,9}, {4,6,5,2,7,9,3,8}, {4,6,2,5,9,3,8, 7}, {2,9,5,4,6,7,3,8}, {2,9,4,5,7,3,8,6}, {4,7,5,2,9,6,3, 8}, {4,7,2,5,6,3,8,9}, {2,6,5,4,7,9,3,8}, {2,6,4,5,9,3,8,7}, {4,9, 5,2,6,7,3,8}, {4,9,2,5,7,3,8, 6}, {2,7,5,4,9,6,3,85}, {5,9,4,2, 7,8,6,3}, {5,9,2,4,8,6,3,7}, {2,8,4,5,9,7,6,3}, {4,9,5,2,8,3,7, 6}, {5,8,2,4,9,6,3,7}, {2,9,4,5,8,7,6,3}, {4,8,5,2,9,3,7,6}, {4,8,2,5,3,7,6,9}, {4,8,5,2,7,6,9,3}, {5,7,2,4,8,3,6,9}, {5,7, 4,2,3,6,9,8}, {5,7,2,4,6,9,8,3}, {4,9,2,5,7, 6,8,3}, {4,9,5,2, 6,8,3,7}, {5,6,2,4,9,7,8,3}, {2,9,4,5,6,3,7,8}, {4,6,5,2,9,8,3, 7}, {5,9,2,4,6,7,8,3}, {5,9,4,2,7,8,3,6}, {5,9,2,4,8,3,6,7}, {2,8,4,5,9,7,3,6}, {4,9,5,2,8,6,7,3}, {4,9, 2,5,6,7,3,8}, {2, 6,5,4,9,8,7,3}, {5,9,4,2,6,3,8,7}, {4,6,2,5,9,7,3,8}, {2,9,5,4, 6,8,7,3}, {2,9,4,5,8,7,3, 6}, {2,9,4,5,3,6,8,7}, {4,3,5,2,9,7,6,8}, {5,9,2,4,3,8,7,6}, {2,3,4,5,9,6,8,7}, {2,3, 5,4,6,8,7,9}, {2,3,4,5,8,7,9,6}, {2,3, 5,4,6,8,7,9}, {2,3,4,5,8,7,9,6}, {2,3, 5,4,7,9,6,8}, {4,7,5,2,3,6,9,8}, {4,3,2,5,7,6,8,9}, {4,7,5,2,6,8,9,3}, {5,6,2, 4,7,3,8,9}, {4,7,5,2,6,9,3,8}, {4,7,2,5,9,3,8,6}, {4,6,5,2,9, 3,8,7}, {4,6,2,5,3,8,7,9}, {2,3,5,4,6,9,8,7}, {5,6,4,2,3,8,9,7}, {53,2,4,6,7,8,9}, {5,3,4,2,7,8,9}, {4,7,2,5,3,6,8,9}, {4,7,5,2,6,8,9,3}, {5,6,2, 4,7,3,8,9}, {4,6,5,2,8,9, 3,7}, {4,6,2,5,8,9, 3,7}, {4,6,2,5,3,7,8,9}, {2,3,5,4,6,9,7,8}, {5,6,4,2,3,8,9,7}, {5,6,2,4,8,9,7,3}, {2,8,4,5,6,3,9,7}, {4,6, 5,2,8,7,3,9}, {5,8,2,4,6,9,7,3}, {2,6,4,5,8,3,9,7}, {2,6,54,35, 6,3,9,7,9,7,8}, {5, 3,4,2,6,8,9,7}, {5,3,2,4,8,9,7,6}, {2,8,4, 5,3,6,9,7}, {2,8,5,4,6,9,7,3}, {5,6,4,2,8,3,9,7}, {5, 6,2,4,3, 9,7,8}, {2,3,4,5,6,8,9,7}, {2,3,5,4,8,9,7,6}, {5,8,4,2,3,6,9, 7}, {4,3,2,5,8,7,6,9}, {2,8, 5,4,3,9,7,6}, {5,3,4,2,8,6,9,7}, {5,3,2,4,6,9,7,8}, {2,6,4,5,3,8,9,7}, {4,3,5,2,6,7,8,9}, {4,3, 2,5,7,8,9,6}, {4,3,5,2,8,9,6,7}, {4,3,2,5,9,6,7,8}, {2,9,5,4,3, 8,6,7}, {5,3,4,2,9,7,8,6}, {5,3,2, 4,7,8,6,9}, {2,7,4,5,3,9,8, 6}, {4,3,5,2,7,6,9,8}, {4,3,2,5,6,9,8,7}, {4,3,5,2,9,8,7,6}, {5,9,2, 4,3,6,8,7}, {2,3,4,5,9,7,6,8}, {4,9,5,2,3,8,7,6}, {5,3, 2,4,9,6,8,7}, {5,3,4,2,6,8,7,9}, {4,6,2,5, 3,9,8,7}, {2,3,5,4, 6,7,9,8}, {5,6,4,2,3,8,7,9}, {5,6,2,4,8,7,9,3}, {2,8,4,5,6,3,7, 9}, {2,8,5,4, 3,7,9,6}, {5,3,4,2,8,6,7,9}, {5,3,2,4,6,7,9,8}, {2,6,4,5,3,8,7,9}, {4,3,5,2,6,9,8,7}, {5,6,2,4,3, 7,9,8}, {5,6, 4,2,7,9,8,3}, {4,7,2,5,6,3,9,8}, {2,6,5,4,7,8,3,9}, {5,7,4,2,6, 9,8,3}, {4,6,2,5,7, 3,9,8}, {4,6,5,2,3,9,8,7}, {4,6,2,5,9,8,7, 3}, {2,9,5,4,6,3,8,7}, {5,6,4,2,9,7,3,8}, {4,9,2,5,6,8, 7,3}, {4,9,5,2,8,7,3,6}, {5,8,2,4,9,6,7,3}, {5,8,4,2,6,7,3,9}, {5,8, 2,4,7,3,9,6}, {5,8,4,2,3,9, 6,7}, {4,3,2,5,8,7,9,6}, {4,3,5,2, 7,9,6,8}, {5,7,2,4,3,8,9,6}, {2,3,4,5,7,6,8,9}, {4,7,5,2,3,9,6, 8}, {4,7,2,5,9,6,8,3}, {4,7,5,2,6,8,3,9}, {5,6,2,4,7,9,8,3}, {2,7,4,5,6,3,9,8}, {4,6,5,2,7,8,3, 9}, {4,6,2,5,8,3,9,7}, {4,6, 5,2,3,9,7,8}, {5,3,2,4,6,8,9,7}, {5,3,4,2,8,9,7,6}, {4,8,2,5,3, 6,9,7}, {4,8,5,2,6,9,7,3}, {4,8,2,5,9,7,3,6}, {2,9,5,4,8,6,7, 3}, {5,8,4,2,9,3,6,7}, {5,8,2,4,3,6,7,9}, {5,8,4,2,6,7,9,3}, {4, 6,2,5,8,3,7,9}, {4,6,5,2,3,7,9,8}, {5,3,2,4,6,8,7,9}, {5,3, 4,2,8,7,9,6}, {5,3,2,4,7,9,6,8}, {2,7,4,5,3,8,9,6}, {4,3,5,2,7, 6,8,9}, {5,7,2,4,3,9,6,8}, {5,7,4,2,9,6,8,3}, {4,9,2,5,7,3,6, 8}, {4,9,5,2,3,6,8,7}, {5,3,2,4,9,7,6,8}, {2,9,4,5,3,8,7,6}, {4,3,5,2,9,6,8,7}, {5, 9,2,4,3,7,6,8}, {5,9,4,2,7,6,8,3}, {5,9, 2,4,6,8,3,7}, {2,6,4,5,9,7,8,3}, {4,9,5,2,6,3,7,8}, {5, 6,2,4, 9,8,3,7}, {5,6,4,2,8,3,7,9}, {4,8,2,5,6,9,3,7}, {2,6,5,4,8,7,9, 3}, {5,8,4,2,6,3,7,9}, {5,8, 2,4,3,7,9,6}, {2,3,4,5,8,6,7,9}, {4,8,5,2,3,9,6,7}, {5,3,2,4,8,7,9,6}, {5,3,4,2,7,9,6,8}, {4,7, 2,5,3,8,9,6}, {2,3,5,4,7,6,8,9}, {5,7,4,2,3,9,6,8}, {5,7,2,4,9, 6,8,3}, {5,7,4,2,6,8,3,9}, {4,6,2, 5,7,9,8,3}, {2,7,5,4,6,3,9, 8}, {5,6,4,2,7,8,3,9}, {5,6,2,4,8,3,9,7}, {5,6,4,2,3,9,7,8}, {4,3,2, 5,6,8,9,7}, {4,3,5,2,8,9,6,7}, {5,8,2,4,3,6,9,7}, {5,8, 4,2,6,9,7,3}, {5,8,2,4,9,7,3,6}, {2,9,4,5, 8,6,7,3}, {4,8,5,2, 9,3,6,7}, {4,8,2,5,3,6,7,9}, {4,8,5,2,6,7,9,3}, {5,6,2,4,8,3,7, 9}, {5,6,4,2, 3,7,9,8}, {4,3,2,5,6,8,7,9}, {4,3,5,2,8,7,9,6}, {4,3,2,5,7,9,6,8}, {2,7,5,4,3,8,6,9}, {5,3,4,2,7, 6,8,9}, {4,7, 2,5,3,9,6,8}, {4,7,5,2,9,6,8,3}, {5,9,2,4,7,3,6,8}, {5,9,4,2,3, 6,8,7}, {2,9,5,4,3,8,7,6}, {5,3,4,2,9,6,8, 7}, {4,9,2,5,6,8, 7}, {4,9,5,2,7,6,8,3}, {4,9,2,5,6,8, 3,7}, {2,6,5,4,9,7,8,3}, {5,9,4,2,6,3,7,8}, {4,6,2,5,9,8,3,7}, {4,6, 5,2,8,3,7,9}, {5,8,2,4,6,9, 3,7}, {2,6,4,5,8,7,9,3}, {4,8,5,2, 6,3,7,9}, {4,8,2,5,3,7,9,6}, {2,3,5,4,8,6,7,9}, {2,3,4,5,6,7,9, 8}, {4,6,5,2,3,8,7,9}, {4,6,2,5,8,7,9,3}, {2,8,5,4,6,3,7,9}, {5,6,4,2,8,9,3,7}, {4,8,2,5,6,7,9, 3}, {4,8,5,2,7,9,3,6}, {4,8, 2,5,9,3,6,7}, {4,8,5,2,3,6,7,9}, {5,3,2,4,8,9,6,7}, {2,8,4,5,3, 7,9,6}, {4,3,5,2,8,6,7,9}, {4,3,2,5,6,7,9,8}, {2,6,5,4,3,8,7, 9}, {5,3,4,2,6,9,8,7}, {4,6,2,5,3,7,9,8}, {4,6,5,2,7,9,8,3}, {5,7,2,4,6,3,9,8}, {2,6,4,5,7,8,3,9}, {4,7,5,2,6,9,8,3}, {5,6, 2,4,7,3,9,8}, {5,6,4,2,3,9,8,7}, {5,6,2,4,9,8,7,3}, {2,9,4,5,6, 3,8,7}, {4,6,5,2,9,7,3,8}, {5,9,2,4,6,8,7,3}, {5,9,4,2,8,7,3, 6}, {4,8,2,5,9,6,7,3}, {4,8,5,2,6,7,3,9}, {4,8,2,5,7,3,9,6}, {2,7,5,4,8,6,3,9}, {5, 8,4,2,7,9,6,3}, {4,7,2,5,8,3,9,6}, {2,8, 5,4,7,6,3,9}, {5,7,4,2,8,9,6,3}, {5,7,2,4,9,6,3,8}, {2, 9,4,5, 7,8,6,3}, {4,7,5,2,9,3,8}, {4,7,2,5,3,8,6,9}, {2,3,5,4,7,9,8, 6}, {2,3,4,5,9,8,6,7}, {4,9, 5,2,3,7,8,6}, {4,9,2,5,7,8,6,3}, {2,7,5,4,9,3,8,6}, {5,9,4,2,7,6,38}, {5,9,2,4,6,3,8,7}, {2,6, 4,5,9,7,3,8}, {4,9,5,2,6,8,7,3}, {4,9,2,5,8,7,3,6}, {4,9,5,2,7, 3,6,8}, {5,7,2,4,9,8,3,6}, {5,7,4, 2,8,3,6,9}, {4,8,2,5,7,9,3, 6}, {2,7,5,4,8,6,9,3}, {5,8,4,2,7,3,9,6}, {5,8,2,4,7,8,3,6}, {5,9,4,2,8,3,6,7}, {5,9, 2,4,3,6,7,8}, {5,9,4,2,6,7,8,3}, {4,6,2,5, 9,3,7,8}, {4,6,5,2, 3,7,8,9}, {4,6,2,5,7,8,9,3}, {4,6,5,2,8,9,3,7}, {5,8,2,4,6,7,9, 3}, {5,8,4,2, 7,9,3,6}, {5,8,2,4,9,3,6,7}, {5,8,4,2,3,6,7,9}, {4,3,2,5,8,9,6,7}, {4,3,5,2,9,6,7,8}, {4,3,2,5,6, 7,8,9}, {4,3, 7,8,9,6}, {5,7,2,4,3,6,8,9}, {5,7,4,2,6,8,9,3}, {4,6,2,5,7, 3,8,9}, {2,7,5,4,6, 9,3,8}, {5,6,4,2,7,8,9,3}, {5,6,2,4,8,9,3, 7}, {5,6,4,2,9,3,7,8}, {5,6,2,4,3,7,8,9}, {2,3,4,5,6,9, 7,8}, {4,6,5,2,3,8,9,7}, {4,6,2,5,8,9,7,3}, {2,8,5,4,6,3,9,7}, {5,6, 4,2,8,7,3,9}, {4,8,2,5,6,9, 7,3}, {2,6,5,4,8,3,9,7}, {2,6,4,5, 3,9,7,8}, {4,3,5,2,6,8,9,7}, {4,3,2,5,8,9,7,6}, {2,8,5,4,3,6,9, 7}, {2,8,4,5,6,9,7,3}, {4,6,5,2,8,3,9,7}, {4,6,2,5,3,9,7,8}, {2,3,5,4,6,8,9,7}, {2,3,4,5,8,9,7, 6}, {4,8,5,2,3,6,9,7}, {5,3, 2,4,8,7,6,9}, {2,8,4,5,3,9,7,6}, {4,3,5,2,8,6,9,7}, {4,3,2,5,6, 9,7,8}, {2,6,5,4,3,8,9,7}, {5,3,4,2,6,7,8,9}, {5,3,2,4,7,8,9, 6}, {5,3,4,2,8,9,6,7}, {5,3,2,4,9,6,7,8}, {2,9,4,5,3,8,6,7}, {4,3,5,2,9,7,8,6}, {4,3,2,5,7,8,6,9}, {2,7,5,4,3,9,8,6}, {5,3, 4,2,7,6,9,8}, {5,3,2,4,6,9,8,7}, {5,3,4,2,9,8,7,6}, {4,9,2,5,3, 6,8,7}, {2,3,5,4,9,7,6,8}, {5,9,4,2,3,8,7,6}, {4,3,2,5,9,6,8, 7}, {4,3,5,2,6,8,7,9}, {5,6,2,4,3,9,8,7}, {5,6,4,2,9,8,7,3}, {5,6,2,4,8,7,3,9}, {5, 6,4,2,7,3,9,8}, {4,7,2,5,6,8,3,9}, {4,7, 5,2,8,3,9,6}, {5,8,2,4,7,6,3,9}, {2,7,4,5,8,9,6,3}, {4, 8,5,2, 7,3,9,6}, {4,8,2,5,3,9,6,7}, {4,8,5,2,9,6,7,3}, {4,8,2,5,6,7,3, 9}, {2,6,5,4,8,9,7,3}, {5,8, 4,2,6,3,9,7,6}, {5,8,2,4,3,9,7,6}, {2,3,4,5,8,6,9,7}, {4,8,5,2,3,7,6,9}, {4,8,2,5,7,6,9,3}, {4,8, 5,2,6,9,3,7}, {4,8,2,5,9,3,7,6}, {2,9,5,4,8,6,3,7}, {5,8,4,2,9, 7,6,3}, {4,9,5, 2,3,7,6,8}, {4,9,5, 2,3,7,6,8}, {5,3,2,4,9,8,7, 6}, {5,3,4,2,8,7,6,9}, {5,3,2,4,7,6,9,8}, {2,7,4,5,3,8,6,9}, {4,3,5, 2,7,9,8,6}, {5,7,2,4,3,6,9,8}, {2,3,5,4,7,8,6,9}, {4,7, 5,2,3,9,8,6}, {4,7,2,5,9,8,6,3}, {2,9,5,4, 7,3,8,6}, {5,7,4,2, 9,6,3,8}, {5,7,2,4,6,3,8,9}, {2,6,4, 5,7,9,3,8}, {2,6,5,4,9,3, 8,7}, {5,9,4,2, 6,7,3,8}, {5,9,2,4,7,3,8,6}, {2,7,4,5,9,6,3,8}, {2,7,5,4,6,3,8,9}, {5,6,4,2,7,9,3,8}, {5,6,2,4,9, 3,8,7}, {2,9, 4,5,6,7,3,8}, {4,6,5,2,9,8,7,3}, {4,6,2,5,8,7,3,9}, {4,6,5,2,7, 3,9,8}, {5,7,2,4,6, 8,3,9}, {5,7,4,2,8,3,9,6}, {4,8,2,5,7,6,3, 9}, {2,7,5,4,8,9,6,3}, {5,8,4,2,7,3,9,6}, {5,8,2,4,3,9, 6,7}, {5,8,4,2,9,6,7,3}, {5,8,2,4,6,7,3,9}, {2,6,4,5,8,9,7,3}, {4,8, 5,2,6,3,9,7}, {4,8,2,5,3,9, 7,6}, {2,3,5,4,8,6,9,7}, {5,8,4,2, 3,7,6,9}, {5,8,2,4,7,6,9,3}, {5,8,4,2,6,9,3,7}, {5,8,2,4,9,3,7, 6}, {2,9,4,5,8,6,3,7}, {4,8,5,2,9,7,6,3}, {5,9,2,4,8,3,7}, {5,9,4,2,3,7,6,8}, {4,3,2,5,9,8,7, 6}, {4,3,5,2,8,7,6,9}, {4,3, 2,5,7,6,9,8}, {2,7,5,4,3,8,6,9}, {5,3,4,2,7,9,8,6}, {4,7,2,5,3, 6,9,8}, {2,3,5,4,7,8,6,9}, {5,7,4,2,3,9,8,6}, {5,7,2,4,9,8,6, 3}, {5,7,4,2,8,6,3,9}, {4,8,2,5,7,9,6,3}, {4,8,5,2,9,6,3,7}, {5,9,2,4,8,7,6,3}, {2,8,4,5,9,3,7,6}, {4,9,5,2,8,6,3,7}, {5,8, 2,4,9,7,6,3}, {2,9,4,5,8,3,7,6}, {2,9,5,4,3,7,6,8}, {2,9,4,5,7, 6,8,3}, {2,9,5,4,6,8,3,7}, {5,6,4,2,9,7,8,3}, {4,9,2,5,6,3,7, 8}, {2,9,5,4,6,8,3,7}, {2,6,4,5,8,3,7,9}, {2,6,5,4,3,7,9,8}, {2,6,4,5,7,9,8,3}, {4, 7,5,2,6,3,9,8}, {5,6,2,4,7,8,3,9}, {2,7, 4,5,6,9,8,3}, {2,7,5,4,9,8,3,6}, {2,7,4,5,8,3,6,9}, {2, 7,5,4, 3,6,9,8}, {5,3,4,2,7,8,6,9}, {4,7,2,5,3,9,8,6}, {2,3,5,4,7,6,9, 8}, {5,7,4,2,3,8,6,9}, {5,7, 2,4,8,6,9,3}, {2,8,4,5,7,3,6,9}, {4,7,5,2,8,9,3,6}, {4,7,2,5,9,3,6,8}, {4,7,5,2,3,6,8,9}, {4,7, 2,5,6,8,9,3}, {2,6,5,4,7,3,8,9}, {5,7,4,2,6,9,3,8}, {5,7,2,4,9, 3,8,6}, {2,9,4,5,7,6,3,8}, {4,7,5, 2,9,8,6,3}, {4,7,2,5,8,6,3, 9}, {2,8,5,4,7,9,6,3}, {5,7,4,2,8,3,9,6}, {2,8,4,5, 7,6,3,9}, {4,7,5,2, 8,9,6,3}, {4,7,2,5,9,6,3,8}, {5,6,2,4,7,9,3, 8}, {5,6,4,2, 9,3,8,7}, {5,6,2,4,3,8,7,9}, {2,3,4,5,6,9,8,7}, {2,3,5,4,9,8,7,6}, {2,3,4,5,8,7,6,9}, {4,8,5,2,3, 9,7,6}, {5,3, 2,4,8,6,9,7}, {2,8,4,5,3,7,6,9}, {2,8,5,4,7,6,9,3}, {2,8,4,5,6, 9,3,7}, {4,6,5,2,8, 7,9,3}, {5,8,2,4,6,3,7,9}, {2,6,4,5,8,9,3, 7}, {2,6,5,4,9,3,7,8}, {2,6,4,5,3,7,8,9}, {4,3,5,2,6,9, 7,8}, vf}
List2:
{vi, {2,3,5,4,7,8,9,6}, {2,3,4,5,8,9,6,7}, {2,3,5,4,9,6,7,8}, {6,9,4,2,3,8,6, 7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {28,5,4,3,6,7,9}, {2,8,4,5,6,7,9,3}, {2,8,5,4,7,9,3,6}, {5,7,4,2,8,6,9,3}, {4,8, 2,5,7,3,6,9}, {2,7,5,4,8,9,3,6}, {2,7,4,5,9,3,6,8}, {2,7,5,4,3, 6,8,9}, {2,7,4,5,6,8,9,3}, {4,6,5,2,7,3,8,9}, {5,7,2,4,6,9,3, 8}, {2,6,4,5,7,8,9,3}, {2,6,5,4,8,9,3,7}, {2,6,4,5,9,3,7,8}, {2,6,5,4,3,7,8,9}, {5,3,4,2,6,9,7,8}, {4,6,2,5,3,8,9,7}, {2,3, 5,4,6,7,8,9}, {2, 3,4,5,7,8,9,6}, {2,3,5,4,8,9,6,7}, {2,3,4,5, 9,6,7,8}, {4,9,5,2,3,8,6,7}, {5,3,2,4,9,7,8,6}, {2, 9,4,5,3,6, 7,8}, {2,9,5,4,6,7,8,3}, {2,9,4,5,7,8,3}, {2,9,5,4,8,3,6,7}, {5,8,4,2,9,7,3,6}, {4,9, 2,5,8,6,7,3}, {2,8,5,4,9,3,6,7}, {2,8, 4,5,3,6,7,9}, {2,8,5,4,6,7,9,3}, {2,8,4,5,7,9,3,6}, {4,7, 5,2, 8,6,9,3}, {5,8,2,4,7,3,6,9}, {2,7,4,5,8,9,3,6}, {2,7,5,4,9,3,6, 8}, {2,7,4,5,3,6,8,9}, {2,7,5, 4,6,8,9,3}, {5,6,4,2,7,3,8,9}, {4,7,2,5,6,9,3,8}, {2,6,5,4,7,8,9,3}, {2,6,4,5,8,9,3,7}, {2,6, 5, 4,9,3,7,8}, {2,6,4,5,3,7,8,9}, {4,3,5,2,6,9,7,8}, {5,6,2,4, 3,8,9,7}, {5,6,4,2,8,9,7,3}, {4,8,2,5, 6,3,9,7}, {2,6,5,4,8,7, 3,9}, {2,6,4,5,7,3,9,8}, {2,6,5,4,3,9,8,7}, {2,6,4,5,9,8,7,3}, {4,9,5,2, 6,3,8,7}, {5,6,2,4,9,7,3,8}, {2,9,4,5,6,8,7,3}, {2,9, 5,4,8,7,3,6}, {2,9,4,5,7,3,6,8}, {2,9,5,4,3, 6,8,7}, {5,3,4,2, 9,7,6,8}, {4,9,2,5,3,8,7,6}, {2,3,5,4,9,6,8,7}, {2,3,4,5,6,8,7, 9}, {2,3,5,4,8, 7,9,6}, {2,3,4,5,7,9,6,8}, {4,7,5,2,3,8,9,6}, {5,3,2,4,7,6,8,9}, {2,7,4,5,3,9,6,8}, {2,7,5,4,9,6, 8,3}, {2,7, 4,5,6,8,3,9}, {2,7,5,4,8,3,9,6}, {5,8,4,2,7,6,3,9}, {4,7,2,5,8, 9,6,3}, {2,8,5,4,7,3, 9,6}, {2,8,4,5,3,9,6,7}, {2,8,5,4,9,6,7, 3}, {2,8,4,5,6,7,3,9}, {4,6,5,2,8,9,7,3}, {5,8,2,4,6,3,9, 7}, {2,6,4,5,8,7,3,9}, {2,6,5,4,7,3,9,8}, {2,6,4,5,3,9,8,7}, {4,3, 5,2,6,7,9,8}, {4,3,2,5,7,9,8, 6}, {4,3,5,2,9,8,6,7}, {5,9,2,4, 3,7,8,6}, {5,9,4,2,7,8,6,3}, {4,7,2,5,9,3,8,6}, {2,9,5,4,7,6,3, 8}, {5,7,4,2,9,8,6,3}, {4,9,2,5,7,3,8,6}, {2,7,5,4,9,6,3,8}, {2,7,4,5,6,3,8,9}, {4,6,5,2,7,9,3,8}, {4,6,2,5,9,3,8,7}, {2,9, 5,4,6,7,3,8}, {2,9,4,5,7,3,8,6}, {4,7,5,2,9,6,3,8}, {4,7,2,5,6, 3,8,9}, {2,6,5,4,7,9,3,8}, {2,6,4,5,9,3,8,7}, {4,9,5,2,6,7,3, 8}, {5,6,2,4,9,8,7,3}, {2,9,4,5,6,3,8,7}, {2,9,5,4,3,8,7,6}, {5,3,4,2,9,6,8,7}, {4,9,2,5,3,7,6,8}, {2,3,5,4,9,8,7,6}, {2,3, 4,5,8,7,6,9}, {4, 8,5,2,3,9,7,6}, {4,8,2,5,9,7,6,3}, {2,9,5,4, 8,3,7,6}, {2,9,4,5,3,7,6,8}, {4,3,5,2,9,8,7,6}, {4, 3,2,5,8,7, 6,9}, {2,8,5,4,3,9,7,6}, {2,8,4,5,9,7,6,3}, {4,9,5,2,8,3,7,6}, {5,8,2,4,9,6,3,7}, {2,9, 4,5,8,7,6,3}, {4,8,5,2,9,3,7,6}, {5,9, 2,4,8,6,3,7}, {5,9,4,2,6,3,7,8}, {4,6,2,5,9,8,3,7}, {4,6, 5,2, 8,3,7,9}, {4,6,2,5,3,7,9,8}, {4,6,5,2,7,9,8,3}, {5,7,2,4,6,3,9, 8}, {5,7,4,2,3,9,8,6}, {4,3,2, 5,7,6,9,8}, {2,7,5,4,3,8,6,9}, {5,3,4,2,7,9,8,6}, {4,7,2,5,3,6,9,8}, {2,3,5,4,7,8,6,9}, {2,3, 4, 5,8,6,9,7}, {4,8,5,2,3,7,6,9}, {5,3,2,4,8,9,7,6}, {2,8,4,5, 3,6,9,7}, {2,8,5,4,6,9,7,3}, {5,6,4,2, 8,3,9,7}, {4,8,2,5,6,7, 3,9}, {2,6,5,4,8,9,7,3}, {5,8,4,2,6,3,9,7}, {4,6,2,5,8,7,3,9}, {4,6,5,2, 7,3,9,8}, {5,7,2,4,6,8,3,9}, {5,7,4,2,8,3,9,6}, {4,8, 2,5,7,6,3,9}, {4,8,5,2,6,3,9,7}, {5,6,2,4,8, 7,3,9}, {5,6,4,2, 7,3,9,8}, {4,7,2,5,6,8,3,9}, {4,7,5,2,8,3,9,6}, {5,8,2,4,7,6,3, 9}, {2,7,4,5,8, 9,6,3}, {4,8,5,2,7,3,9,6}, {5,7,2,4,8,6,3,9}, {2,8,4,5,7,9,6,3}, {2,8,5,4,9,6,3,7}, {5,9,4,2,8,7, 6,3}, {5,9, 2,4,7,6,3,8}, {2,7,4,5,9,8,6,3}, {4,9,5,2,7,3,8}, {4,9,2,5,3,8, 6,7}, {2,3,5,4,9,7, 8,6}, {5,9,4,2,3,6,7,8}, {4,3,2,5,9,8,6,7}, {2,9,5,4,3,7,8,6}, {2,9,4,5,7,8,6,3}, {4,7,5,2,9,3,8, 6}, {4,7, 2,5,3,8,6,9}, {2,3,5,4,7,9,8,6}, {2,3,4,5,9,8,6,7}, {4,9,5,2,3, 7,8,6}, {4,9,2,5,7,8,6, 3}, {2,7,5,4,9,3,8,6}, {2,7,4,5,3,8,6, 9}, {4,3,5,2,7,9,8,6}, {5,7,2,4,3,6,9,8}, {2,3,4,5,7,8,6,9}, {4,7,5,2,3,9,8,6}, {5,3,2,4,7,6,9,8}, {5,3,4,2,6,9,8,7}, {5,3, 2,4,9,8,7,6}, {5,3,4,2,8,7,6,9}, {4,8,2,5,3,9,7,6}, {2,3,5,4,8, 6,9,7}, {5,8,4,2,3,7,6,9}, {4,3,2,5,8,9,7,6}, {2,8,5,4,3,6,9, 7}, {2,8,4,5,6,9,7,3}, {4,6,5,2,8,3,9,7}, {5,8,2,4,6,7,3,9}, {2,6,4,5,8,9,7,3}, {2,6,5,4,9,7,3,8}, {5,9,4,2,6,8,7,3}, {5,9, 2,4,8,7,3,6}, {5,9,4,2,7,3,6,8}, {5,9,2,4,3,6,8,7}, {2,3,4,5,9, 7,6,8}, {2, 3,5,4,7,6,8,9}, {5,7,4,2,3,9,6,8}, {4,3,2,5,7,8,9, 6}, {4,3,5,2,8,9,6,7}, {4,3,2,5,9,6,7,8}, {2, 9,5,4,3,8,6,7}, {5,3,4,2,9,7,8,6}, {4,9,2,5,3,7,6,8}, {4,9,2,5,7,6,8,3}, {5,6, 2,4,9,3,7,8}, {5,6, 4,2,3,7,8,9}, {4,3,2,5,6,9,7,8}, {2,6,5,4, 3,8,9,7}, {5,3,4,2,6,7,8,9}, {4,6,2,5,3,9,7,8}, {2,3, 5,4,6,8, 9,7}, {2,3,4,5,8,9,7,6}, {4,8,5,2,3,6,9,7}, {4,8,2,5,6,9,7,3}, {2,6,5,4,8,3,9,7}, {2,6,4, 5,3,9,7,8}, {4,3,5,2,6,8,9,7}, {5,6, 2,4,3,7,8,9}, {2,3,4,5,6,9,7,8}, {4,6,5,2,3,8,9,7}, {4,6,2, 5,8, 9,7,3}, {4,6,5,2,9,7,3,8}, {4,6,2, 5,7,3,8,9}, {2,7,5,4,6,9,3, 8}, {5,6,4,2,7,8,9,3}, {5,6,2,4, 8,9,3,7}, {5,6,4,2,9,3,7,8}, {4,9,2,5,6,8,3,7}, {2,6,5,4,9,7,8,3}, {2,6,4,5,7,8,3,9}, {4,7, 5,2, 6,9,8,3}, {4,7,2,5,9,8,3,6}, {2,9,4,5,6,8,3,7}, {4,6,5,2, 9,7,8,3}, {4,6,2,5,7, 8,3,9}, {2,7,5,4,6,9,8,3}, {2,7,4,5,9,8, 3,6}, {4,9,5,2,7,6,8,3}, {5,7,2,4,9,3,6,8}, {5,7,4,2,3, 6,8,9}, {5,7,2,4,6,8,9,3}, {2,6,4,5,7,3,8,9}, {4,7,5,2,6,9,3,8}, {5,6, 2,4,7,9,3,8}, {4,8,2,5,6,7,9,3}, {4,8,5,2, 7,9,3,6}, {5,6, 2,4,7,8,9,3}, {2,7,4,5,6,3,9,8}, {4,6, 5,2,7,8,3,9}, {4,7,5,2,6,8,3,9}, {5,6,2,4,7,9,8,3}, {2,7,4,5,6,3,9,8}, {4,6, 5,2,9,8,3,7}, {4,8,2,5,9, 3,7,6}, {2,9,5,4,8,6,3,7}, {2,9,4,5,6,3,7,8}, {4,6,5,2,9,8,3, 7}, {5,9,2,4,6,7,8,3}, {5,9,4,2,7, 8,3,6}, {4,7,2,5,9,6,8,3}, {4,7,5,2,6,8,3,9}, {5,6,2,4,7,9,8,3}, {2,7,4,5,6,3,9,8}, {4,6, 5,2,7,8,3,9}, {5,7, 2,4,6,9,8,3}, {5,7,4,2,9,8,3,6}, {5, 7,2,4, 8,3,6,9}, {5,7,4,2,3,6,9,8}, {4,3,2,5,7,8,6,9}, {2,7,5,4,3,9,8, 6}, {5,3,4,2,7,6,9,8}, {5, 3,4,2,7,6,9,8}, {5,3,4,2,9,8,7,6}, {5,3,2,4,8,5,3,9,7,6}, {2,8,4,5,3,9,7,6}, {4,3,5,2,8,6,9,7}, {5,8, 2,4,3,7,6,9}, {5,8,4,2,7,6,9,3}, {5,8,2,4,6,9,3,7}, {5,8,4,2,9, 3,7,6}, {4,9,2,5,8,6,3,7}, {2,8, 5,4,9,7,6,3}, {5,9,4,2,8,3,7, 6}, {4,8,2,5,9,6,3,7}, {2,9,5,4,8,7,6,3}, {2,9,4,5,7,6,3,8}, {4,7,5, 2,9,8,6,3}, {5,9,2,4,7,3,8,6}, {2,7,4,5,9,6,3,8}, {2,7, 5,4,6,3,8,9}, {5,6,4,2,7,9,3,8}, {5,6,2, 4,9,3,8,7}, {2,9,4,5, 6,7,3,8}, {4,6,5,2,9,8,7,3}, {5,9,2,4,6,3,8,7}, {2,6,4,5,9,7,3, 8}, {4,9,5,2, 6,8,7,3}, {4,9,2,5,8,7,3,6}, {4,9,5,2,7,3,6,8}, {4,9,2,5,3,6,8,7}, {2,3,5,4,9,7,6,8}, {5,9,4,2, 3,8,7,6}, {4,3, 2,5,9,6,8,7}, {4,3,5,2,6,8,7,9}, {5,6,2,4,3,9,8,7}, {5,6,4,2,9, 8,7,3}, {4,9,2,5,6, 3,8,7}, {4,9,5,2,3,8,7,6}, {5,33,2,4,9,6,8, 7}, {5,3,4,2,6,8,7,9}, {4,6,2,5,3,9,8,7}, {2,3,5,4,6, 7,9,8}, {5,6,4,2,3,8,7,9}, {5,6,4,2,8,7,9,3}, {2,8,5,4,3,7,9,6}, {2,8,5, 4,3,7,9,6}, {5,3,4,2,8,6, 7,9}, {4,8,2,5,3,9,6,7}, {4,8,5,2,9, 6,7,3}, {5,9,2,4,8,3,6,7}, {2,8,4,5,9,7,3,6}, {4,9,5,2,8,6, 7,3}, {4,9,2,5,6,7,3,8}, {2,6,5,4,9,8,7,3}, {5,9,4,2,6,3,8,7}, {4,6,2,5,9,7,3,8}, {2,9,5,4,6,8,7, 3}, {2,9,4,5,8,7,3,6}, {2,9, 5,4,7,3,6,8}, {2,9,4,5,3,6,8,7}, {4,3,5,2,9,7,6,8}, {5,9,2,4,3, 8,7, 6}, {2,3,4,5,9,6,8,7}, {2,3,5,4,6,8,7,9}, {2,3,4,5,8,7,9, 6}, {2,3,5,4,7,9,6,8}, {5,7,4,2,3,8,9,6}, {4,3,2,5,7,6,8,9}, {2,7,5,4,3,9,6,8}, {2,7,4,5,9,6,8,3}, {2,7,5,4,6,8,3,9}, {2,7, 4,5,8,3,9,6}, {4,8,5,2,7,6,3,9}, {5,7,2,4,8,9,6,3}, {2,8,4,5,7, 3,9,6}, {4,7,5,2,8,6,3,9}, {5,8,2,4,7,9,6,3}, {5,8,4,2,9,6,3, 7}, {4,9,2,5,8,7,6,3}, {2,8,5,4,9,3,7,6}, {5,9,4,2,8,6,3,7}, {5,9,2,4,6,3,7,8}, {2,6,4,5,9,8,3,7}, {2,6,5,4,8,3,7,9}, {2,6, 4,5,3,7,9,8}, {2,6,5,4,7,9,8,3}, {5,7,4,2,6,3,9,8}, {5, 7,2,4, 3,9,8,6}, {2,3,4,5,7,6,9,8}, {4,7,5,2,3,8,6,9}, {4,7,2,5,8,6,9, 3}, {2,8,5,4,7,3,6,9}, {5, 7,4,2,8,9,3,6}, {4,8,2,5,7,6,9,3}, {2,7,5,4,8,3,6,9}, {2,7,4,5,3,6,9,8}, {4,3,5,2,7,8,6,9}, {4,3, 2,5,8,6,9,7}, {2,8,5,4,3,7,6,9}, {2,8,4,5,7,6,9,3}, {4,7,5,2,8, 3,6,9}, {5,8,2,4,7,9,3,6}, {2,7, 4,5,8,6,9,3}, {4,8,5,2,7,3,6, 9}, {4,8,2,5,3,6,9,7}, {4,8,5,2,6,9,7,3}, {5,6,2,4,8,3,9,7}, {5,6,4, 2,3,9,7,8}, {4,3,2,5,6,8,9,7}, {4,3,5,2,8,9,7,6}, {4,3, 2,5,9,7,6,8}, {4,3,5,2,7,6,8,9}, {5,7,2, 4,3,9,6,8}, {5,7,4,2, 9,6,8,3}, {4,9,2,5,7,3,6,8}, {4,9,5,2,3,6,8,7}, {4,9,2,5,6,8,7, 3}, {4,9,5,2, 8,7,3,6}, {5,8,2,4,9,6,7,3}, {5,8,4,2,6,7,3,9}, {5,8,2,4,7,3,9,6}, {5,8,4,2,3,9,6,7}, {4,3,2,5, 8,7,9,6}, {4,3, 5,2,7,9,6,8}, {5,7,2,4,3,8,9,6}, {2,3,4,5,7,6,8,9}, {4,7,5,2,3, 9,6,8}, {5,3,2,4,7, 8,9,6}, {5,3,4,2,8,9,6,7}, {5,3,2,4,9,6,7, 8}, {2,9,4,5,3,8,6,7}, {4,3,5,2,9,7,8,6}, {5,9,2,4,3, 6,7,8}, {5,9,4,2,6,7,8,3}, {4,6,2,5,9,3,7,8}, {4,6,5,2,3,7,8,9}, {5,3, 2,4,6,9,7,8}, {2,6,4,5,3,8, 9,7}, {4,3,5,2,6,7,8,9}, {5,6,2,4, 3,9,7,8}, {2,3,4,5,6,8,9,7}, {2,3,5,4,8,9,7,6}, {5,8,4,2,3,6,9,7}, {5,8,2,4,6,9,7,3}, {2,6,4,5,8,3,9,7}, {2,6,5,4,3,9,7,8}, {5,3,4,2,6,8,9,7}, {4,6,2,5,3,7,8, 9}, {2,3,5,4,6,9,7,8}, {5,6,4,2,3,8,9,7}, {5,6,2,4,8,9,7,3}, {2,8,4,5,6,3,9,7}, {4,6,5,2,8,7,3, 9}, {4,6,2,5,7,3,9,8}, {2,4,6,8,7,3,5,9}, {5,3,2,4,6,7,9,8}, {2,6,4,5,3,8,7,9}, {4,3,5,2,6,9,8,7}, {4,3,2,5,9,8,7,6}, {4,3,5,2,8,7,6,9}, {5,8,2,4,3,9,7,6}, {5,8,4,2,9,7,6,3}, {4,9,2,5,8,3,7,6}, {4,9,5,2,3,7,6,8}, {4,9,2,5,7,6,8,3}, {4,9,5,2,6,8,3,7}, {5,6,2,4,9,7,8,3}, {5,6,4,2,7,8,3,9}, {4,7,2,5,6,9,8,3}, {4,7,5,2,9,8,3,6}, {4,7,2,5,8,3,6,9}, {4,7,5,2,3,6,9,8}, {5,3,2,5,2,9,8,3,6}, {5,3,4,2,8,6,9,7}, {4,8,2,5,3,7,6,9}, {4,8,5,2,7,6,9,3}, {4,8,2,5,6,9,3,7}, {2,6,5,4,8,7,9,3}, {5, 8,4,2, 6,3,7,9}, {5,8,2,4,3,7,9,6}, {2,3,4,5,8,6,7,9}, {4,8,5,2,3,9,6, 7}, {5,3,2,4,8,7,9,6}, {5, 3,4,2,7,9,6,8}, {4,7,2,5,3,8,9,6}, {4,7,5,2,8,9,6,3}, {4,7,2,5,9,6,3,8}, {4,7,5,2,6,3,8,9}, {5,6, 2,4,7,9,3,8}, {5,6,4,2,9,3,8,7}, {5,6,2,4,3,8,7,9}, {5,6,4,2,8, 7,9,3}, {4,8,2,5,6,3,7,9}, {4,8, 5,2,3,7,9,6}, {5,3,2,4,8,6,7, 9}, {5,3,4,2,6,7,9,8}, {5,3,2,4,7,9,8,6}, {5,3,4,2,9,8,6,7}, {4,9,2, 5,3,7,8,6}, {4,9,5,2,7,8,6,3}, {5,7,2,4,9,38,6}, {5,7, 4,2,3,8,6,9}, {5,7,2,4,8,6,9,3}, {2,8,4, 5,7,3,6,9}, {4,7,5,2, 8,9,3,6}, {5,8,2,4,7,6,9,3}, {5,8,4,2,6,9,3,7}, {5,8,2,4,9,3,7, 6}, {2,9,4,5, 8,6,3,7}, {4,8,5,2,9,7,6,3}, {5,9,2,4,8,3,7,6}, {5,9,4,2,3,7,6,8}, {5,9,2,4,7,6,8,3}, {5,9,4,2, 6,8,3,7}, {4,6, 2,5,9,7,8,3}, {5,6,4,2,9,8,3,7}, {4,9,2,5,6, 7,8,3}, {2,9,5,4,6,3,7,8}, {5,7,2,4,9,6,8,3}, {5,7,4,2,6,8,3, 9}, {4,9,5,2,7, 8,3,6}, {5,7,2,4,9,6,8,3}, {5,7,4,2,6,8,3, 9}, {4,6,2,5,7,9,8,3}, {2,7,5,4,6,3,9,8}, {2,7,4,5,3, 9,8,6}, {4,3,5,2,7,6,9,8}, {4,3,2,5,6,9,8,7}, {2,6,5,4,3,7,9,8}, {2,6, 4,5,7,9,8,3}, {4,7,5,2,6,3, 9,8}, {4,7,2,5,3,9,8,6}, {2,3,5,4, 7,6,9,8}, {2,3,4,5,6,9,8,7}, {4,6,5,2,3,7,9,8}, {5,3,2,4,6,8, 7,9}, {5,3,4,2,8,7,9,6}, {5,3,2,4,7,9,6,8}, {2,7,4,5,3,8,9,6}, {2,7,5,4,8,9,6,3}, {5,8,4,2,7,3,9, 6}, {4,7,2,5,8,6,3,9}, {2,8, 5,4,7,9,6,3}, {2,8,4,5,9,6,3,7}, {4,9,5,2,8,7,6,3}, {4,9,2,5,7, 6,3, 8}, {2,7,5,4,9,8,6,3}, {2,7,4,5,8,6,3,9}, {4,8,5,2,7,9,6, 3}, {5,7,2,4,8,3,9,6}, {2,8,4,5,7,6,3,9}, {2,8,5,4,6,3,9,7}, {5,6,4,2,8,7,3,9}, {5,6,2,4,7,3,9,8}, {5,6,4,2,3,9,8,7}, {4,3, 2,5,6,7,9,8}, {2,6,5,4,3,8,7,9}, {2,6,4,5,8,7,9,3}, {4,8,5,2,6, 3,7,9}, {4,8,2,5,3,7,9,6}, {2,3,5,4,8,6,7,9}, {2,3,4,5,6,7,9, 8}, {4,6,5,2,3,8,7,9}, {4,6,2,5,8,7,9,3}, {2,8,5,4,6,3,7,9}, {2,8,4,5,3,7,9,6}, {4,3,5,2,8,6,7,9}, {5, 8,2,4,3,9,6,7}, {5,8, 4,2,9,6,7,3}, {4,9,2,5,8,3,6,7}, {2,8,5,4,9,7,3,6}, {5, 9,4,2, 8,6,7,3}, {5,9,2,4,6,7,3,8}, {5,9,4,2,7,3,8,6}, {5,9,2,4,35,8, 6,7}, {2,3,4,5,9,7,8,6}, {4, 9,5,2,3,6,7,8}, {5,3,2,4,9,8,6,7}, {2,9,4,5,3,7,8,6}, {2,9,5,4,7,8,6,3}, {5,7,4,2,9,3,8,6}, {5,7, 2,4,3,8,6,9}, {2,3,4,5,7,9,8,6}, {2,3,5,4,9,8,6,7}, {5,9,4,2,3, 7,8,6}, {5,9,2,4,7,8,6,3}, {2,7, 4,5,9,3,8,6}, {4,9,5,2,7,6,3, 8}, {5,7,4,2,8,6,3,9}, {4,8,2,5,7,9,6,3}, {4,8,5, 2,9,6,3,7}, {5,9,2,4,8,7,6,3}, {5,9,4,2,7,6,3,8}, {4,7, 2,5,9,8,6,3}, {2,9,5,4,7,3,8,6}, {5,7,4, 2,9,6,3,8}, {5,7,2,4, 6,3,8,9}, {2,6,4,5,7,9,3,8}, {2,6,5,4,9,3,8,7}, {5,9,4,2,6,7,3, 8}, {4,6,2,5, 9,8,7,3}, {2,9,5,4,6,3,8,7}, {5,6,4,2,9,7,3,8}, {5,6,2,4,7,3,8,9}, {2,7,4,5,6,9,3,8}, {4,6,5,2, 7,8,9,3}, {4,6, 2,5,8,9,3,7}, {4,6,5,2,9,3,7,8}, {5,9,2,4,6,8,3,7}, {2,6,4,5,9, 7,8,3}, {4,9,5,2,6, 3,7,8}, {5,6,2,4,9,8,3,7}, {5,6,4,2,8,3,7, 9}, {5,6,2,4,3,7,9,8}, {5,6,4,2,7,9,8,3}, {4,7,2,5,6, 3,9,8}, {2,6,5,4,7,8,3,9}, {5,7,4,2,6,9,8,3}, {5,7,2,4,9,8,3,6}, {5,7, 4,2,8,3,6,9}, {4,8,2,5,7,9, 3,6}, {2,7,5,4,8,6,9,3}, {5,8,4,2, 7,3,6,9}, {5,8,2,4,3,6,9,7}, {5,8,4,2,6,9,7,3}, {4,6,2,5,8,3, 9,7}, {4,6,5,2,3,9,7,8}, {5,3,2,4,6,8,9,7}, {5,3,4,2,8,9,7,6}, {5,3,2,4,9,7,6,8}, {2,9,4,5,3,8,7, 6}, {4,3,5,2,9,6,8,7}, {5,9, 2,4,3,7,6,8}, {5,9,4,2,7,6,8,3}, {4,7,2,5,9,3,6,8}, {4,7,5,2,3, 6,8, 9}, {4,7,2,5,6,8,9,3}, {2,6,5,4,7,3,8,9}, {5,7,4,2,6,9,3, 8}, {4,6,2,5,7,8,9,3}, {4,6,5,2,8,9,3,7}, {5,8,2,4,6,7,9,3}, {5,8,4,2,7,9,3,6>}, {5,8,2,4,9,3,6,7}, {5,8,4,2,3,6,7,9}, {4,3,2,5,8,9,6,7}, {4,3,5,2,9,6,7,8}, {4,3,2,5,6,7,8,9}, {4,3, 5,2,7,8,9,6}, {5,7,2,4,3,6,8,9}, {5,7,4,2,6,8,9,3}, {5,7,2,4,8, 9,3,6}, {5,7,4,2,9,3,6,8}, {4,9,2,5,7,8,3,6}, {4,9,5,2, 8,3,6, 7}, {5,8,2,4,9,7,3,6}, {2,9,4,5,8,6,7,3}, {4,8,5,2,9,3,6,7}, {4,8,2,5,3,6,7,9}, {4,8,5,2,6,7,9,3}, {5,6,2,4,8,3,7,9}, {5, 6,4,2,3,7,9,8}, {4,3,2,5,6,8,7,9}, {4,3,5,2,8,7,9,6}, {4,3,2,5, 7,9,6,8}, {2,7,5,4,3,8,9,6}, {5, 3,4,2,7,6,8,9}, {4,7,2,5,3,9, 6,8}, {4,7,5,2,9,6,8,3}, {5,9,2,4,7,3,6,8}, {5,9,4,2,3,6,8,7}, {5,9,2,4,6,8,7,3}, {5,9,4,2,8,7,3,6}, {4,8,2,5,9,6,7,3}, {4,8, 5,2,6,7,3,9}, {4,8,2,5,7,3,9,6}, {2,7, 5,4,8,6,3,9}, {5,8,4,2, 7,9,6,3}, {4,7,2,5,8,3,9,6}, {2,8,5,4,7,6,3,9}, {5,7,4,2,8,9,6, 3}, {5,7,2, 4,9,6,3,8}, {5,7,4,2,6,3,8,9}, {4,6,2,5,7,9,3,8}, {4,6,5,2,9,3,8,7}, {4,6,2,5,3,8,7,9}, {2,3,5, 4,6,9,8,7}, {2,3, 4,5,9,8,7,6}, {2,3,5,4,8,7,6,9}, {5,8,4,2,3,9,7,6}, {5,8,2,4,9, 7,6,3}, {2,9,4,5, 8,3,7,6}, {2,9,5,4,3,7,6,8}, {2,9,4,5,7,6,8, 3}, {2,9,5,4,6,8,3,7}, {5,6,4,2,9,7,8,3}, {5,6,2,4, 7,8,3,9}, {2,7,4,5,6,9,8,3}, {2,7,5,4,9,8,3,6}, {2,7,4,5,8,3,6,9}, {2,7, 5,4,3,6,9,8}, {5,3,4,2,7, 8,6,9}, {5,3,2,4,8,6,9,7}, {2,8,4,5, 3,7,6,9}, {2,8,5,4,7,6,9,3}, {2,8,4,5,6,9,3,7}, {4,6,5,2,8, 7,9, 3}, {5,8,2,4,6,3,7,9}, {5,8,4,2,3,7,9,6}, {4,3,2,5,8,6,7,9}, {2,8,5,4,3,9,6,7}, {2,8,4,5,9,6, 7,3}, vf}
List3:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {2,8,5,4,3,6,7, 9}, {2,8,4,5,6,7,9,3}, {2,8,5,4,7,9,3,6}, {5,7,4,2,8,6,9,3}, {4,8,2,5,7,3,6,9}, {2,7,5,4,8,9,3,6}, {2,7,4,5,9,3,6,8}, {2,7, 5,4,3,6,8,9}, {2,7,4,5,6,8,9,3}, {4,6,5,2,7,3,8,9}, {5,7,2,4,6, 9,3,8}, {2,6,4,5,7,8,9,3}, {2,6,5,4,8,9,3,7}, {2,6,4,5,9,3,7, 8}, {2,6,5,4,3,7,8,9}, {5,3,4,2,6,9,7,8}, {4,6,2,5,3,8,9,7}, {2,3,5,4,6,7,8,9}, {2, 3,4,5,7,8,9,6}, {2,3,5,4,8,9,6,7}, {2,3, 4,5,9,6,7,8}, {4,9,5,2,3,8,6,7}, {5,3,2,4,9,7,8,6}, {2, 9,4,5, 3,6,7,8}, {2,9,5,4,6,7,8,3}, {2,9,4,5,7,8,3,6}, {2,9,5,4,8,3,6, 7}, {5,8,4,2,9,7,3,6}, {4,9, 2,5,8,6,7,3}, {2,8,5,4,9,3,6,7}, {2,8,4,5,3,6,7,9}, {2,8,5,4,6,7,9,3}, {2,8,4,5,7,9,3,6}, {4,7, 5,2,8,6,9,3}, {5,8,2,4,7,3,6,9}, {2,7,4,5,8,9,3,6}, {2,7,5,4,9, 3,6,8}, {2,7,4,5,3,6,8,9}, {2,7,5, 4,6,8,9,3}, {5,6,4,2,7,3,8, 9}, {4,7,2,5,6,9,3,8}, {2,6,5,4,7,8,9,3}, {2,6,4,5,8,9,3,7}, {2,6,5, 4,9,3,7,8}, {2,6,4,5,3,7,8,9}, {4,3,5,2,6,9,7,8}, {5,6, 2,4,3,8,9,7}, {5,6,4,2,8,9,7,3}, {4,8,2,5, 6,3,9,7}, {2,6,5,4, 8,7,3,9}, {2,6,4,5,7,3,9,8}, {2,6,5,4,3,9,8,7}, {4,9,5,2, 6,3,8,7}, {5,6,2,4,9,7,3,8}, {2,9,4,5,6,8,7,3}, {2,9,5,4,8,7,3,6}, {2,9,4,5,7,3,6,8}, {2,9,5,4,3,6,8,7}, {5,3, 4,2,9,7,6,8}, {4,9,2,5,3,8,7,6}, {2,3,5,4,9,6,8,7}, {2,3,4,5,6, 8,7,9}, {2,3,5,4,8, 7,9,6}, {2,3,4,5,7,9,6,8}, {4,7,5,2,3,8,9, 6}, {5,3,2,4,7,6,8,9}, {2,7,4,5,3,9,6,8}, {2,7,5,4,9,6, 8,3}, {2,7,4,5,6,8,3,9}, {2,7,5,4,8,3,9,6}, {5,8,4,2,7,6,3,9}, {4,7, 2,5,8,9,6,3}, {2,8,5,4,3,9, 6,7}, {2,8,4,5,3,9,6,7}, {2,8,5,4, 9,6,7,3}, {4,6,5,2,8,9,7,3}, {5,8,2,4,6,9,7,3}, {2,6,4,5,8,7,3, 9}, {2,6,5,4,7,3,9,8}, {2,6,4,5,3,9,8,7}, {4,3,5,2,6,7,9,8}, {4,3,2,5,7,9,8, 6}, {4,3,5,2,9,8,6,7}, {5,9, 2,4,3,7,8,6}, {5,9,4,2,7,8,6,3}, {4,7,2,5,9,3,8,6}, {2,9,5,4,7, 6,3,8}, {5,7,4,2,9,8,6,3}, {4,9,2,5,7,3,8,6}, {2,7,5,4,9,6,38}, {2,7,4,5,6,3,8,9}, {4,6,5,2,7,9,3,8}, {4,6,2,5,9,3,8,7}, {2,9, 5,4,6,7,3,8}, {2,9,4,5,7,3,8,6}, {4,7,5,2,9,6,3,8}, {4,7,2,5,6, 3,8,9}, {2,6,5,4,7,9,3,8}, {2,6,4,5,9,3,8,7}, {4,9,5,2,6,7,3, 8}, {5,6,2,4,9,8,7,3}, {2,9,4,5,6,3,8,7}, {2,9,5,4,3,8,7,6}, {5,3,4,2,9,6,8,7}, {4,9,2,5,3,7,6,8}, {2,3,5,4,9,8,7,6}, {2,3, 4,5,8,7,6,9}, {4, 8,5,2,3,9,7,6}, {4,8,2,5,9,7,6,3}, {2,9,5,4, 8,3,7,6}, {2,9,4,5,3,7,6,8}, {4,3,5,2,9,8,7,6}, {4, 3,2,5,8,7, 6,9}, {2,8,5,4,3,9,7,6}, {2,8,4,5,9,7,6,3}, {4,9,5,2,8,3,7,6}, {5,8,2,4,9,6,3,7}, {2,9, 4,5,8,7,6,3}, {4,8,5,2,9,3,7,6}, {5,9, 2,4,8,6,3,7}, {5,9,4,2,6,3,7,8}, {4,6,2,5,9,8,3,7}, {4,6, 5,2, 8,3,7,9}, {4,6,2,5,3,7,9,8}, {4,6,5,2,7,9,8,3}, {5,7,2,4,6,3,9, 8}, {5,7,4,2,3,9,8,6}, {4,3,2, 5,7,6,9,8}, {2,7,5,4,3,8,6,9}, {5,3,4,2,7,9,8,6}, {4,7,2,5,3,6,9,8}, {2,3,5,4,7,8,6,9}, {2,3, 4, 5,8,6,9,7}, {4,8,5,2,3,7,6,9}, {5,3,2,4,8,9,7,6}, {2,8,4,5, 3,6,9,7}, {2,8,5,4,6,9,7,3}, {5,6,4,2, 8,3,9,7}, {4,8,2,5,6,7, 3,9}, {2,6,5,4,8,9,7,3}, {5,8,4,2,6,3,9,7}, {4,6,2,5,8,7,3,9}, {4,6,5,2, 7,3,9,8}, {5,7,2,4,6,8,3,9}, {5,7,4,2,8,3,9,6}, {4,8, 2,5,7,6,3,9}, {4,8,5,2,6,3,9,7}, {5,6,2,4,8, 7,3,9}, {5,6,4,2, 7,3,9,8}, {4,7,2,5,6,8,3,9}, {4,7,5,2,8,3,9,6}, {5,8,2,4,7,6,3, 9}, {2,7,4,5,8, 9,6,3}, {4,8,5,2,7,3,9,6}, {5,7,2,4,8,6,3,9}, {5,7,4,2,6,3,9,8}, {5,7,2,4,3,9,8,6}, {2,3,4,5,7,6, 9,8}, {4,7, 5,2,3,8,6,9}, {4,7,2,5,8,6,9,3}, {2,8,5,4,7,3,6,9}, {5,7,4,2,8, 9,3,6}, {4,8,2,5,7,6, 9,3}, {2,7,5,4,8,3,6,9}, {2,7,4,5,3,6,9, 8}, {4,3,5,2,7,8,6,9}, {4,3,2,5,8,6,9,7}, {2,8,5,4,3,7,6, 9}, {2,8,4,5,7,6,9,3}, {4,7,5,2,8,3,6,9}, {5,8,2,4,7,9,3,6}, {2,7, 4,5,8,6,9,3}, {4,8,5,2,7,3,6, 9}, {4,8,2,5,3,6,9,7}, {4,8,5,2, 6,9,7,3}, {5,6,2,4,8,3,9,7}, {5,6,4,2,3,9,7,8}, {4,3,2,5,6,8,9, 7}, {4,3,5,2,8,9,7,6}, {4,3,2,5,9,7,6,8}, {4,3,5,2,7,6,8,9}, {5,7,2,4,3,9,6,8}, {5,7,4,2,9,6,8,3}, {4,9,2,5,7,3,6,8}, {4,9, 5,2,3,6,8,7}, {4,9,2,5,6,8,7,3}, {4,9,5,2,8,7,3,6}, {5,8,2,4,9, 6,7,3}, {5,8,4,2,6,7,3,9}, {4,6,2,5,8,9,7,3}, {4,6,5,2,9,7,3, 8}, {4,6,2,5,7,3,8,9}, {2,7,5,4,6,9,3,8}, {5,6,4,2,7,8,9,3}, {5,6,2,4,8,9,3,7}, {5,6,4,2,9,3,7,8}, {4,9,2,5,6,8,3,7}, {2,6, 5,4,9,7,8,3}, {2, 6,4,5,7,8,3,9}, {4,7,5,2,6,9,8,3}, {4,7,2,5, 9,8,3,6}, {2,9,5,4,7,6,8,3}, {2,9,4,5,6,8,3,7}, {4, 6,5,2,9,7, 8,3}, {4,6,2,5,7,8,3,9}, {2,7,5,4,6,9,8,3}, {2,7,4,5,9,8,3,6}, {4,9,5,2,7,6,8,3}, {5,7, 2,4,9,3,6,8}, {5,7,4,2,3,6,8,9}, {5,7, 2,4,6,8,9,3}, {2,6,4,5,7,3,8,9}, {4,7,5,2,6,9,3,8}, {5,6, 2,4, 7,8,9,3}, {5,6,4,2,8,9,3,7}, {4,8,2,5,6,7,9,3}, {4,8,5,2,7,9,3, 6}, {4,8,2,5,9,3,6,7}, {4,8,5, 2,3,6,7,9}, {5,3,2,4,8,9,6,7}, {5,3,4,2,9,6,7,8}, {4,9,2,5,3,8,6,7}, {2,3,5,4,9,7,8,6}, {5,9, 4, 2,3,6,7,8}, {4,3,2,5,9,8,6,7}, {2,9,5,4,3,7,8,6}, {2,9,4,5, 7,8,6,3}, {4,7,5,2,9,3,8,6}, {4,7,2,5, 3,8,6,9}, {2,3,5,4,7,9, 8,6}, {2,3,4,5,9,8,6,7}, {4,9,5,2,3,7,8,6}, {4,9,2,5,7,8,6,3}, {2,7,5,4, 9,3,8,6}, {2,7,4,5,3,8,6,9}, {4,3,5,2,7,9,8,6}, {5,7, 2,4,3,6,9,8}, {2,3,4,5,7,8,6,9}, {4,7,5,2,3, 9,8,6}, {5,3,2,4, 7,6,9,8}, {5,3,4,2,6,9,8,7}, {5,3,2,4,9,8,7,6}, {5,3,4,2,8,7,6, 9}, {4,8,2,5,3, 9,7,6}, {2,3,5,4,8,6,9,7}, {5,8,4,2,3,7,6,9}, {4,3,2,5,8,9,7,6}, {2,8,5,4,3,6,9,7}, {2,8,4,5,6,9, 7,3}, {4,6, 5,2,8,3,9,7}, {5,8,2,4,6,7,3,9}, {2,6,4,5,8,9,7,3}, {2,6,5,4,9, 7,3,8}, {5,9,4,2,6,8, 7,3}, {5,9,2,4,8,7,3,6}, {5,9,4,2,7,3,6, 8}, {5,9,2,4,3,6,8,7}, {2,3,4,5,9,7,6,8}, {2,3,5,4,7,6,8, 9}, {5,7,4,2,3,9,6,8}, {4,3,2,5,7,8,9,6}, {4,3,5,2,8,9,6,7}, {4,3, 2,5,9,6,7,8}, {2,9,5,4,3,8,6, 7}, {5,3,4,2,9,7,8,6}, {4,9,2,5, 3,6,7,8}, {4,9,5,2,6,7,8,3}, {5,6,2,4,9,3,7,8}, {5,6,4,2,3,7,8, 9}, {4,3,2,5,6,9,7,8}, {2,6,5,4,3,8,9,7}, {5,3,4,2,6,7,8,9}, {4,6,2,5,3,9,7,8}, {2,3,5,4,6,8,9,7}, {2,3,4,5,8,9,7,6}, {4,8, 5,2,3,6,9,7}, {4,8,2,5,6,9,7,3}, {2,6,5,4,8,3,9,7}, {2,6,4,5,3, 9,7,8}, {4,3,5,2,6,8,9,7}, {5,6,2,4,3,7,8,9}, {2,3,4,5,6,9,7, 8}, {4,6,5,2,3,8,9,7}, {5,3,2,4,6,7,8,9}, {5,3,4,2,7,8,9,6}, {4,7,2,5,3,6,8,9}, {4,7,5,2,6,8,9,3}, {4,7,2,5,8,9,3,6}, {4,7, 5,2,9,3,6,8}, {5, 9,2,4,7,8,3,6}, {5,9,4,2,7,8,3,6,7}, {4,8,2,5, 9,7,3,6}, {2,9,5,4,8,6,7,3}, {5,8,4,2,9,3,6,7}, {5, 8,2,4,3,6, 7,9}, {5,8,4,2,6,7,9,3}, {4,6,2,5,8,3,7,9}, {2,8,5,4,6,9,3,7}, {2,8,4,5,9,3,7,6}, {4,9, 5,2,8,6,3,7}, {4,9,2,5,6,3,7,8}, {2,6, 5,4,9,8,3,7}, {2,6,4,5,8,3,7,9}, {4,8,5,2,6,9,3,7}, {4,8, 2,5, 9,3,7,6}, {2,9,5,4,8,6,3,7}, {2,9,4,5,6,3,7,8}, {4,6,5,2,9,8,3, 7}, {5,9,2,4,6,7,8,3}, {5,9,4, 2,7,8,3,6}, {4,7,2,5,9,6,8,3}, {4,7,5,2,6,8,3,9}, {5,6,2,4,7,9,8,3}, {5,6,4,2,9,8,3,7}, {4,9, 2, 5,6,7,8,3}, {4,9,5,2,7,8,3,6}, {5,7,2,4,9,6,8,3}, {5,7,4,2, 6,8,3,9}, {4,6,2,5,7,9,8,3}, {2,7,5,4, 6,3,9,8}, {2,7,4,5,3,9, 8,6}, {4,3,5,2,7,6,9,8}, {4,3,2,5,6,9,8,7}, {2,6,5,4,3,7,9,8}, {2,6,4,5, 7,9,8,3}, {4,7,5,2,6,3,9,8}, {4,7,2,5,3,9,8,6}, {2,3, 5,4,7,6,9,8}, {2,3,4,5,6,9,8,7}, {4,6,5,2,3, 7,9,8}, {5,3,2,4, 6,8,7,9}, {5,3,4,2,8,7,9,6}, {5,3,2,4,7,9,6,8}, {2,7,4,5,3,8,9, 6}, {2,7,5,4,8, 9,6,3}, {5,8,4,2,7,3,9,6}, {4,7,2,5,8,6,3,9}, {2,8,5,4,7,9,6,3}, {2,8,4,5,9,6,3,7}, {4,9,5,2,8,7, 6,3}, {4,9, 2,5,7,6,3,8}, {2,7,5,4,9,8,6,3}, {2,7,4,5,8,6,3,9}, {4,8,5,2,7, 9,6,3}, {5,7,2,4,8,3, 9,6}, {2,8,4,5,7,6,3,9}, {2,8,5,4,6,3,9, 7}, {5,6,4,2,8,7,3,9}, {5,6,2,4,7,3,9,8}, {5,6,4,2,3,9,8, 7}, {4,3,2,5,6,7,9,8}, {2,6,5,4,3,8,7,9}, {2,6,4,5,8,7,9,3}, {4,8, 5,2,6,3,7,9}, {2,6,3,7,9}, {2,3,4,5, 6,7,9,8}, {4,6,5,2,3,8,7,9}, {4,6,2,5,8,7,9,3}, {2,8,5,4,6,3,7, 9}, {2,8,4,5,3,7,9,6}, {4,3,5,2,8,6,7,9}, {5,8,2,4,3,9,6,7}, {5,8,4,2,9,6,7,3}, {4,9,2,5,8,3,6,7}, {2,8,5,4,9,7,3,6}, {5,9, 4,2,8,6,7,3}, {5,9,2,4,6,7,3,8}, {5,9,4,2,7,3,8,6}, {4,7,2,5,9, 6,3,8}, {4,7,5,2,6,3,8,9}, {5,6,2,4,7,9,3,8}, {5,6,4,2,9,3,8, 7}, {5,6,2,4,3,8,7,9}, {5,6,4,2,8,7,9,3}, {4,8,2,5,6,3,7,9}, {4,8,5,2,3,7,9,6}, {5,3,2,4,8,6,7,9}, {5,3,4,2,8,6,7,9}, {5,3, 2,4,7,9,8,6}, {5, 3,4,2,9,8,6,7}, {4,9,2,5,3,7,8,6}, {4,9,5,2, 7,8,6,3}, {5,7,2,4,9,3,8,6}, {5,7,4,2,3,8,6,9}, {5, 7,2,4,8,6, 9,3}, {2,8,4,5,7,3,6,9}, {4,7,5,2,8,9,3,6}, {5,8,2,4,7,6,9,3}, {2,7,4,5,8,3,6,9}, {2,7, 5,4,3,6,9,8}, {5,3,4,2,7,8,6,9}, {5,3, 2,4,8,6,9,7}, {2,8,4,5,3,7,6,9}, {2,8,5,4,7,6,9,3}, {5,7, 4,2, 8,3,6,9}, {4,8,2,5,7,9,3,6}, {2,7,5,4,8,6,9,3}, {5,8,4,2,7,3,6, 9}, {5,8,2,4,3,6,9,7}, {5,8,4, 2,6,9,7,3}, {4,6,2,5,8,3,9,7}, {4,6,5,2,3,9,7,8}, {5,3,2,4,6,8,9,7}, {5,3,4,2,8,9,7,6}, {5,3, 2, 4,9,7,6,8}, {2,9,4,5,3,8,7,6}, {4,3,5,2,9,6,8,7}, {5,9,2,4, 3,7,6,8}, {2,3,4,5,9,8,7,6}, {2,3,5,4, 8,7,6,9}, {5,8,4,2,3,9, 7,6}, {5,8,2,4,9,7,6,3}, {2,9,4,5,8,3,7,6}, {2,9,5,4,3,7,6,8}, {5,3,4,2, 9,8,7,6}, {5,3,2,4,8,7,6,9}, {2,8,4,5,3,9,7,6}, {4,3, 5,2,8,6,9,7}, {5,8,2,4,3,7,6,9}, {5,8,4,2,7, 6,9,3}, {5,8,2,4, 6,9,3,7}, {5,8,4,2,9,3,7,6}, {4,9,2,5,8,6,3,7}, {2,8,5,4,9,7,6, 3}, {5,9,4,2,8, 3,7,6}, {4,8,2,5,9,6,3,7}, {2,9,5,4,8,7,6,3}, {2,9,4,5,7,6,3,8}, {4,7,5,2,9,8,6,3}, {5,9,2,4,7,3, 8,6}, {2,7, 4,5,9,6,3,8}, {2,7,5,4,6,3,8,9}, {5,6,4,2,7,9,3,8}, {5,6,2,4,9, 3,8,7}, {2,9,4,5,6,7, 3,8}, {4,6,5,2,9,8,7,3}, {5,9,2,4,6,3,8, 7}, {2,6,4,5,9,7,3,8}, {4,9,5,2,6,8,7,3}, {2,3,5,4,9,7,6, 8}, {4,9,2,5,2,7,3,6,8}, {4,3,2,5,9,6,8, 7}, {4,3,5,2,6,8,7,9}, {5,6,2,4, 3,9,8,7}, {5,6,4,2,9,8,7,3}, {4,9,2,5,6,3,8,7}, {4,9,5,2,3,8,7, 6}, {5,3,2,4,9,6,8,7}, {5,3,4,2,6,8,7,9}, {4,6,2,5,3,9,8,7}, {2,3,5,4,6,7,9,8}, {5,6,4,2,3,7,8,9}, {5,6,2,4,8,7,9,3}, {2,8, 4,5,6,3,7,9}, {2,8,5,4,3,7,9,6}, {2,8,4,5,7,9,6,3}, {2,8,5,4,9, 6,3,7}, {5,9,4,2,8,7,6,3}, {5,9,2,4,7,6,3,8}, {2,7,4,5,9,8,6, 3}, {4,9,5,2,7,3,8,6}, {5,7,2,4,9,6,3,8}, {5,7,4,2,6,3,8,9}, {4,6,2,5,7,9,3,8}, {4,6,5,2,9,3,8,7}, {4,6,2,5,3,8,7,9}, {2,3, 5,4,6,9,8,7}, {5, 6,4,2,3,7,9,8}, {4,3,2,5,6,8,7,9}, {4,3,5,2, 8,7,9,6}, {4,3,2,5,7,9,6,8}, {2,7,5,4,3,8,9,6}, {5, 3,4,2,7,6, 8,9}, {4,7,2,5,3,9,6,8}, {4,7,5,2,9,6,8,3}, {5,9,2,4,7,3,6,8}, {5,9,4,2,3,6,8,7}, {5,9, 2,4,6,8,7,3}, {5,9,4,2,8,7,3,6}, {4,8, 2,5,9,6,7,3}, {4,8,5,2,6,7,3,9}, {5,6,2,4,8,9,7,3}, {2,8, 4,5, 6,3,9,7}, {4,6,5,2,8,7,3,9}, {4,6,2,5,7,3,9,8}, {4,6,5,2,3,9,8, 7}, {5,3,2,4,6,7,9,8}, {2,6,4, 5,3,8,7,9}, {4,3,5,2,6,9,8,7}, {4,3,2,5,9,8,7,6}, {4,3,5,2,8,7,6,9}, {5,8,2,4,3,9,7,6}, {5,8, 4, 2,9,7,6,3}, {4,9,2,5,8,3,7,6}, {4,9,5,2,3,7,6,8}, {4,9,2,5, 7,6,8,3}, {4,9,5,2,6,8,3,7}, {5,6,2,4, 9,7,8,3}, {5,6,4,2,7,8, 3,9}, {4,7,2,5,6,9,8,3}, {4,7,5,2,9,8,3,6}, {4,7,2,5,8,3,6,9}, {4,7,5,2,3,6,9,8}, {5,3, 2,4,7,8,6,9}, {5,3,4,2,8,6,9,7}, {4,8, 2,5,3,6,9,7}, {4,8,5,2,7,6,9,3}, {4,8,2,5,6, 9,3,7}, {2,6,5,4, 8,7,9,3}, {5,8,4,2,6,3,7,9}, {5,8,2,4,3,7,9,6}, {5,8,4,2,7,9,6, 3}, {4,7,2,5,8, 3,9,6}, {2,8,5,4,7,6,3,9}, {5,7,4,2,8,9,6,3}, {4,8,2,5,7,3,9,6}, {2,7,5,4,8,6,3,9}, {2,7,4,5,6, 3, 9,8}, {4,6, 5,2,7,8,3,9}, {5,7,2,4,6,9,8,3}, {5,7,4,2,9,8,3,6}, {5,7,2,4,8, 3,6,9}, {5,7,4,2,3,6, 9,8}, {4,3,2,5,7,8,6,9}, {2,7,5,4,3,9,8, 6}, {3,4,2,7,6,9,8}, {5,3,2,4,6,9,8,7}, {2,6,4,5,3,7,9, 8}, {2,6,5,4,7,9,8,3}, {2,6,4,5,9,8,3,7}, {2,6,5,4,8,3,7,9}, {5,8, 4,2,6,9,3,7}, {5,8,2,4,9,3,7, 6}, {2,9,4,5,8,6,3,7}, {4,8,5,2, 9,7,6,3}, {5,9,2,4,8,3,7,6}, {5,9,4,2,3,7,6,8}, {5,9,2,4,7,6,8, 3}, {5,9,4,2,6,8,3,7}, {4,6,2,5,9,7,8,3}, {2,9,5,4,6,3,7,8}, {2,9,4,5,3,7,8,6}, {2,9,5,4,7,8,6,3}, {5,7, 4,2,9,3,8,6}, {5,7, 2,4,3,8,6,9}, {2,3,4,5,7,9,8,6}, {2,3,5,4,9,8,6,7}, {2,3,4,5,8, 6,7,9}, {4,8,5,2,3,9,6,7}, {5,3,2,4,8,7,9,6}, {5,3,4,2,7,9,6, 8}, {4,7,2,5,3,8,9}, {4,7,5,2,8,9,6,3}, {5,8,2,4,7,3,9,6}, {5,8,4,2,3,9,6,7}, {4,3,2,5,8,7,9,6}, {4,3,5,2,7,9,6,8}, {5,7, 2,4,3,8,9,6}, {2, 3,4,5,7,6,8,9}, {4,7,5,2,3,9,6,8}, {5,3,2,4, 7,8,9,6}, {5,3,4,2,8,9,6,7}, {5,3,2,4,9,6,7,8}, {2, 9,4,5,3,8, 6,7}, {4,3,5,2,9,7,8,6}, {5,9,2,4,3,6,7,8}, {5,9,4,2,6,7,8,3}, {4,6,2,5,9,3,7,8}, {4,6, 5,2,3,7,8,9}, {5,3,2,4,6,9,7,8}, {2,6, 4,5,3,8,9,7}, {4,3,5,2,6,7,8,9}, {5,6,2,4,3,9,7,8}, {2,3, 4,5, 6,8,9,7}, {2,3,5,4,8,9,7,6}, {5,8,4,2,3,6,9,7}, {5,8,2,4,6,9,7, 3}, {2,6,4,5,8,3,9,7}, {2,6,5, 4,3,9,7,8}, {5,3,4,2,6,8,9,7}, {4,6,2,5,3,7,8,9}, {2,3,5,4,6,9,7,8}, {5,6,4,2,3,8,9,7}, {4,3, 2, 5,6,7,8,9}, {4,3,5,2,7,8,9,6}, {5,7,2,4,3,6,8,9}, {5,7,4,2, 6,8,9,3}, {5,7,2,4,8,9,3,6}, {5,7,4,2, 9,3,6,8}, {4,9,2,5,7,8, 3,6}, {4,9,5,2,8,3,6,7}, {5,8,2,4,9,7,3,6}, {2,9,4,5,8,6,7,3}, {4,8,5,2, 9,3,6,7}, {4,8,2,5,3,6,7,9}, {4,8,5,2,6,7,9,3}, {5,6, 2,4,8,3,7,9}, {2,8,4,5,6,9,3,7}, {4,6,5,2,8, 7,9,3}, {5,8,2,4, 6,3,7,9}, {5,8,4,2,3,7,9,6}, {4,3,2,5,8,6,7,9}, {2,8,5,4,3,9,6, 7}, {2,8,4,5,9, 6,7,3}, {2,8,5,4,6,7,3,9}, {2,8,4,5,7,3,9,6}, {4,7,5,2,8,6,3,9}, {5,8,2,4,7,9,6,3}, {5,8,4,2,9,6, 3,7}, {4,9, 2,5,8,7,6,3}, {2,8,5,4,9,3,7,6}, {5,9,4,2,8,6,3,7}, {5,9,2,4,6, 3,7,8}, {5,9,4,2,3,7, 8,6}, {5,9,2,4,7,8,6,3}, {2,7,4,5,9,3,8, 6}, {4,9,5,2,7,6,3,8}, {5,7,2,4,9,8,6, 3}, {5,7,4,2,8,6,3, 9}, {4,8,2,5,7,9,6,3}, {4,8,5,2,9,6,3,7}, {5,9,2,4,8,7,6,3}, {5,9, 4,2,7,6,3,8}, {4,7,2,5,9,8,6, 3}, {2,9,5,4,7,3,8,6}, {5,7,4,2, 9,6,3,8}, {5,7,2,4,6,3,8,9}, {2,6,4,5,7,9,3,8}, {2,6,5,4,9,3,8, 7}, {5,9,4,2,6,7,3,8}, {4,6,2,5,9,8,7,3}, {2,9,5,4,6,3,8,7}, {5,6,4,2,9,7,3,8}, {5,6,2,4,7,3,8,9}, {2,7,4,5,6,9,3,8}, {4,6, 5,2,7,8,9,3}, {4,6,2,5,8,9,3,7}, {4,6,5,2,9,3,7,8}, {5,9,2,4,6, 8,3,7}, {2,6,4,5,9,7,8,3}, {4,9,5,2,6,3,7,8}, {5,6,2,4,9,8,3, 7}, {5,6,4,2,8,3,7,9}, {5,6,2,4,3,7,9,8}, {5,6,4,2,7,9,8,3}, {4,7,2,5,6,3,9,8}, {2,6,5,4,7,8,3,9}, {5,7,4,2,6,9,8,3}, {5,7, 2,4,9,8,3,6}, {2, 9,4,5,7,6,8,3}, {2,9,5,4,6,8,3,7}, {5,6,4,2, 9,7,8,3}, {5,6,2,4,7,8,3,9}, {2,7,4,5,6,9,8,3}, {2, 7,5,4,9,8, 3,6}, {5,6,2,4,7,8,3,9}, {5,9,4,2,7,6,8,3}, {4,7,2,5,9,3,6,8}, {4,7,5,2,3,6,8,9}, {4,7,2,5,6,8,9,3}, {2,6, 5,4,7,3,8,9}, {5,7,4,6,9,3,8}, {4,6, 2,5,7,8,9,3}, {4,6,5,2,8,9,3,7}, {5,8,2,4,6,7,9,3}, {5,8, 4,2, 7,9,3,6}, {5,8,2,4,9,3,6,7}, {5,8,4,2,3,6,7,9}, {4,3,2,5,8,9,6, 7}, {4,3,5,2,9,6,7,8}, {5,9,2, 4,3,8,6,7}, {2,3,4,5,9,7,8,6}, {4,9,5,2,3,6,7,8}, {5,3,2,4,9,8,6,7}, {5,3,4,2,8,6,7,9}, {4,8, 2, 5,3,9,6,7}, {4,8,5,2,9,6,7,3}, {5,9,2,4,8,3,6,7}, {2,8,4,5, 9,7,3,6}, {4,9,5,2,8,6,7,3}, {4,9,2,5, 6,7,3,8}, {2,6,5,4,9,8, 7,3}, {5,9,4,2,6,3,8,7}, {4,6,2,5,9,7,3,8}, {2,9,5,4,6,8,7,3}, {2,9,4,5, 8,7,3,6}, {2,9,5,4,7,3,6,8}, {2,9,4,5,3,6,8,7}, {4,3, 5,2,9,7,6,8}, {5,9,2,4,3,8,7,6}, {2,3,4,5,9, 6,8,7}, {2,3,5,4, 6,8,7,9}, {2,3,4,5,8,7,9,6}, {2,3,5,4,7,9,6,8}, {5,7,4,2,3,8,9, 6}, {4,3,2,5,7, 6,8,9}, {2,7,5,4,3,9,6,8}, {2,7,4,5,9,6,8,3}, {2,7,5,4,6,8,3,9}, {2,7,4,5,8,3,9,6}, {4,8,5,2,7,6, 3,9}, vf}
List4:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {2,8,5,4,3,6,7, 9}, {2,8,4,5,6,7,9,3}, {2,8,5,4,7,9,3,6}, {5,7,4,2,8,6,9,3}, {4,8,2,5,7,3,6,9}, {2,7,5,4,8,9,3,6}, {2,7,5,4,9,3,6,8}, {2,7, 5,4,3,6,8,9}, {2,7,5,4,6,8,9,3}, {4,6,5,2,7,3,8,9}, {5,7,2,4,6, 9,3,8}, {2,6,4,5,7,8,9,3}, {2,6,5,4,8,9,3,7}, {2,6,4,5,9,3,7, 8}, {2,6,5,4,3,7,8,9}, {5,3,4,2,6,9,7,8}, {4,6,2,5,3,8,9,7}, {2,3,5,4,6,7,8,9}, {2, 3,4,5,7,8,9,6}, {2,3,5,4,8,9,6,7}, {2,3, 4,5,9,6,7,8}, {4,9,5,2,3,8,6,7}, {5,3,2,4,9,7,8,6}, {2, 9,4,5, 3,6,7,8}, {2,9,5,4,6,7,8,3}, {2,9,4,5,7,8,3,6}, {2,9,5,4,8,3,6, 7}, {5,8,4,2,9,7,3,6}, {4,9, 2,5,8,6,7,3}, {2,8,5,4,9,3,6,7}, {2,8,4,5,3,6,7,9}, {2,8,5,4,6,7,9,3}, {2,8,4,5,7,9,3,6}, {4,7, 5,2,8,6,9,3}, {5,8,2,4,7,3,6,9}, {2,7,4,5,8,9,3,6}, {2,7,5,4,9, 3,6,8}, {2,7,5, 4,6,8,9,3}, {2,7,5, 4,6,8,9,3}, {5,6,4,2,7,3,8, 9}, {4,7,2,5,6,9,3,8}, {2,6,5,4,7,8,9,3}, {2,6,4,5,8,9,3,7}, {2,6,5, 4,9,3,7,8}, {2,6,4,5,3,7,8,9}, {4,3,5,2,6,9,7,8}, {5,6, 2,4,3,8,9,7}, {4,8,2,5, 6,3,9,7}, {2,6,5,4, 8,7,3,9}, {2,6,4,5,7,3,9,8}, {2,6,5,4,3,9,8,7}, {2,6,4,5,9,8,7, 3}, {4,9,5,2, 6,3,8,7}, {5,6,2,4,9,7,3,8}, {2,9,4,5,6,8,7,3}, {2,9,5,4,8,7,3,6}, {2,3,5,4,9,7,6,8}, {2,3,4,5,9,8,6,7}, {4,7,5,2,3,8,9,6}, {5,3,2,4,7,6,9,8}, {2,7,4,5,3,9,6,8}, {2,7,5,4,9,6,8,3}, {2,7, 4,5,6,8,3,9}, {2,7,5,4,8,3,9,6}, {4,8,2,5,7,6, 3,9}, {4,7, 2,5,8,3,9,6}, {5,7,4,2,3,6,9,8}, {5,7,4,2,9,8,3,6}, {4,3,2,5,7,8,6,9}, {2,7, 5,4,3,9,8,6}, {5,3,4,2,7,6,9,8}, {5, 3,2,4,6,9,8,7}, {5,3,4,2, 9,8,7,6}, {5,3,2,4,8,7,6,9}, {2,8,4,5,3,9,7,6}, {4,3,5,2,8,6,9,7}, {5,8, 2,4,3,7,6,9}, {5,8,4,2,7,6,9,3}, {5,8,2,4,6,9,3,7}, {5,8,4,2,9,3,7}, {4,9,2,5,8,6,3,7}, {2,8, 5,4,9,7,6,3}, {5,9,4, 2,8,3,7,6}, {4,8,2,5,9,6,3,7}, {2,9,5,4,8,7,6,3}, {2,9,4,5,7,6, 3,8}, {4,7,5, 2,9,8,6,3}, {5,9,2,4,7,3,8,6}, {2,7,4,5,9,6,3,8}, {2,7,5,4,6,3,8,9}, {5,6,4,2,7,9,3,8}, {5,6,2, 4,9,3,8,7}, {2,9, 4,5,6,7,3,8}, {4,6,5,2,9,8,7,3}, {5,9,2,4,6,3,8,7}, {2,6,4,5,9, 7,3,8}, {4,9,5,2, 6,8,7,3}, {4,9,2,5,8,7,3,6}, {4,9,5,2,7,3,6, 8}, {4,9,2,5,3,6,8,7}, {2,3,5,4,9,7,6,8}, {5,9,4,2, 3,8,7,6}, {4,3,2,4,3,5,9,6,8,7}, {4,3,5,2,6,8,7,9}, {5,6,2,4,3,9,8,7}, {5,6,4,2,9,8,7,3}, {4,9,2,5,6, 3,8,7}, {4,9,5,2,3,8,7,6}, {5,3, 2,4,9,6,8,7}, {5,3,4,2,6,8,7,9}, {4,6,2,5,3,9,8,7}, {2,3,5,4,6, 7,9,8}, {5,6,4,2,3,8,7,9}, {5,6,2,4,8,7,9,3}, {2,8,4,5,6,3,7, 9}, {2,8,5,4,3,7,9,6}, {5,3,4,2,8,6, 7,9}, {4,8,2,5,3,9,6,7}, {4,8,5,2,9,6,7,3}, {5,9,2,4,8,3,6,7}, {2,8,4,5,9,7,3,6}, {4,9, 5,2,8,6, 7,3}, {4,9,2,5,6,7,3,8}, {2,6,5,4,9,8,7,3}, {5,9,4,2, 6,3,8,7}, {4,6,2,5,9,7,3,8}, {2,9,5,4,4,6,8,7, 3}, {2,9,4,5,8,7, 3,6}, {2,9,5,4,7,3,6,8}, {2,9,4,5,3,6,8,7}, {4,3,5,2,9,7,6,8}, {5,9,2,4,3,8,7, 6}, {2,3,4,5,9,6,8,7}, {2,3,5,4,6,8,7,9}, {2,3, 4,5,8,7,9,6}, {2,3,5,4,7,9,6,8}, {5,7,4,2,3,8,9,6}, {4,3,2,5,7, 6,8,9}, {2,7,5,4,3,9,6,8}, {2,7,4,5,9,6,8,3}, {2,7,5,4,6,8,3, 9}, {2,7,4,5,8,3,9,6}, {4,8,5,2,7,6,3,9}, {5,7,2,4,8,9,6,3}, {5,7,4,2,9,6,3,8}, {5,7,2,4,6,3,8,9}, {2,6,4,5,7,9,3,8}, {2,6, 5,4,9,3,8,7}, {5,9,4,2,6,7,3,8}, {4,6,2,5,9,8,7,3}, {2,9,5,4,6, 3,8,7}, {5,6,4,2,9,7,3,8}, {5,6,2,4,7,3,8,9}, {2,7,4,5,6,3,9, 8}, {4,6,5,2,7,8,9,3}, {4,6,2,5,8,9,3,7}, {4,6,5,2,9,3,7,8}, {5, 9,2,4,6,8,3,7}, {5,6,4,5,9,7,8,3}, {4,9,5,2,6,3,7,8}, {5,6, 2,4,9,8,3,7}, {5,6,4,2,8,3,7,9}, {5, 6,2,4,3,7,9,8}, {5,6,4,2, 7,9,8,3}, {4,7,2,5,6,3,9,8}, {2,6,5,4,7,8,3,9}, {5,7,4,2,6,9,8, 3}, {5,7, 2,4,9,8,3,6}, {5,7,4,2,8,3,6,9}, {4,8,2,5,7,9,3,6}, {2,7,5,4,8,6,9,3}, {5,8,4,2,7,3,6,9}, {5,8, 2,4,3,6,9,7}, {5,8, 4,2,6,9,7,3}, {4,6,2,5,8,3,9,7}, {4,6,5,2,3,9,7,8}, {5,3,2,4,6, 8,9,7}, {5,3,4, 2,8,9,7,6}, {5,3,2,4,9,7,6,8}, {2,9,4,5,3,8,7, 6}, {4,3,5,2,9,6,8,7}, {5,9,2,4,3,7,6,8}, {5,9,4, 2,7,6,8,3}, {4,7,2,5,9,3,6,8}, {4,7,5,2,3,6,8,9}, {4,7,2,5,6,8,9,3}, {2,6, 5,4,7,3,8,9}, {5,7,4,2, 6,9,3,8}, {4,6,2,5,7,8,9,3}, {4,6,5,2, 8,9,3,7}, {5,8,2,4,6,7,9,3}, {5,8,4,2,7,9,3,6}, {5,8,2,4, 9,3, 6,7}, {5,8,4,2,3,6,7,9}, {4,3,2,5,8,9,6,7}, {4,3,5,2,9,6,7,8}, {4,3,2,5,6,7,8,9}, {4,3,5,2,7, 8,9,6}, {5,7,2,4,3,6,8,9}, {5,7, 4,2,6,8,9,3}, {5,7,2,4,8,9,3,6}, {5,7,4,2,9,3,6,8}, {4,9,2,5,7, 8,3,6}, {4,9,5,2,8,3,6,7}, {5,8,2,4,9,7,3,6}, {2,9,4,5,8,6,7, 3}, {4,8,5,2,9,3,6,7}, {4,8,2,5,3,6, 7,9}, {4,8,5,2,6,7,9,3}, {5,6,2,4,8,3,7,9}, {5,6,4,2,3,7,9,8}, {4,3,2,5,6,8,7,9}, {4,3, 5,2,8,7, 9,6}, {4,3,2,5,7,9,6,8}, {2,7,5,4,3,8,9,64}, {5,3,4,2, 7,6,8,9}, {4,3,2,5,9,6,8, 3}, {4,7,5,2,9,6,8, 3}, {5,9,2,4,7,3,6, 8}, {5,9,4,2,3,6,8,7}, {5,9,2,4,6,8,7,3}, {5,9,4,2,8,7,3,6}, {4,8,2,5,9,6,7, 3}, {4,8,5,2,6,7,3,9}, {4,8,2,5,7,3,9,6}, {2,7, 5,4,8,6,3,9}, {5,8,4,2,7,9,6,3}, {4,7,2,5,8,3,9,6}, {2,8,5,4,7, 6,3,9}, {5,7,4,2,8,9,6,3}, {5,7,2,4,9,6,3,8}, {5,7,4,2,6,3,8, 9}, {4,6,2,5,7,9,3,8}, {4,6,5,2,9,3,8,7}, {4,6,2,5,3,8,7,9}, {2,3,5,4,6,9,8,7}, {2,3,4,5,9,8,7,6}, {2,3,5,4,8,7,6,9}, {5,8, 4,2,3,9,7,6}, {5,8,2,4,9,7,6,3}, {2,9,4,5,8,3,7,6}, {2,9,5,4,3, 7,6,8}, {2,9,4,5,7,6,8,3}, {2,9,5,4,6,8,3,7}, {5,6,4,2,9,7,8, 3}, {5,6,2,4,7,8,3,9}, {2,7,4,5,6,9,8,3}, {2,7,5,4,9,8,3,6}, {2, 7,4,5,8,3,6,9}, {2,7,5,4,3,6,9,8}, {5,3,4,2,7,8,6,9}, {5,3, 2,4,8,6,9,7}, {2,8,4,5,3,7,6,9}, {2, 8,5,4,7,6,9,3}, {2,8,4,5, 6,9,3,7}, {4,6,5,2,8,7,9,3}, {5,8,2,4,6,3,7,9}, {5,8,4,2,3,7,9, 6}, {4,3, 2,5,8,6,7,9}, {2,8,5,4,3,9,6,7}, {2,8,4,5,9,6,7,3}, {2,8,5,4,6,7,3, 9}, {2,8,4,5,7,3,9,6}, {4,7, 5,2,8,6,3,9}, {5,8, 2,4,7,9,6,3}, {5,8,4,2,9,6,3,7}, {4,9,2,5,8,7,6,3}, {2,8,5,4,9, 3,7,6}, {5,9, 4, 2,8,6,3,7}, {5,9,2,4,6,7,3,8}, {2,6,4,5,9,8,3, 7}, {2,6,5,4,8,3,7,9}, {2,6,4,5,3,7,9,8}, {2,6,5, 4,7,9,8,3}, {5,7,4,2,6,3,9,8}, {5,7,2,4,3,9,8,6}, {2,3,4,5,7,6,9,8}, {4,7, 5,2,3,8,6,9}, {4,7,2,5, 8,6,9,3}, {2,8,5,4,7,3,6,9}, {5,7,4,2, 8,9,3,6}, {4,8,2,5,7,9,6,3}, {2,7,4,5,8,3,6, 9}, {4,3,5,2,7,6,9, 8}, {4,3,2,5,8,6,9,7}, {2,8,5,4,3,7,6,9}, {2,8,4,5,7,6,9,3}, {4,7,5,2,8, 3,6,9}, {5,8,2,4,7,9,3,6}, {2,7, 4,5,8,6,9,3}, {5,7,4,2,6,8,9,3}, {5,7,2,4,8,9,6,3}, {5,7,4,2,9,6,3,8}, {5,7, 2,4,6,3,8,9}, {4,9,2,5,7,8,3,6}, {4,9,5,2,8,3,6,7}, {4,9,2,5,7,3,6,8}, {4,9, 5,2,3,6,8,7}, {5,6,2,4,9,7,8,3}, {5,6,4,2,7,8,3,9}, {4,7,5,2,6,9,8,3}, {4,7,2,5,9,8,3,6}, {4,7,5,2,8,3,6, 9}, {4,7,5, 2,3,6,9,8}, {5,3,2,4,7,8,6,9}, {5,3,4,2,8,6,9,7}, {4,8,2,5,3,7,6,9}, {4,8,5,2,7,6,9,3}, {4,8,2, 5,6,9,3,7}, {2,6, 5,4,8,7,9,3}, {5,8,4,2,6,3,7,9}, {5,8,2,4,3,7,9,6}, {2,3,4,5,8, 6,7,9}, {5,3,2,4,8,7,9,6}, {5,3,4,2,8,7,9,6}, {4,7,2,5,3,8,9,6}, {4,7,5,2,8,9,6,3}, {4,7,2,5, 9,6,3,8}, {4,7,5,2,6,3,8,9}, {5,6,2,4,7,9,3,8}, {5,6,4,2,9,3,8,7}, {5,6, 2,4,3,8,7,9}, {5,6,4,2,8, 7,9,3}, {4,8,2,5,6,3,7,9}, {4,8,5,2, 3,7,9,6}, {5,3,2,4,8,6,7,9}, {5,3,4,2,6,7,9,8}, {5,3,2,4,7, 9,8, 6}, {5,3,4,2,9,8,6,7}, {4,9,2,5,3,7,8,6}, {4,9,5,2,7,8,6,3}, {5,7,2,4,9,3,8,6}, {5,7,4,2,3,8, 6,9}, {5,7,2,4,8,6,9,3}, {2,8, 4,5,7,3,6,9}, {4,7,5,2,8,9,3,6}, {5,8,2,4,7,6,9,3}, {5,8,4,2,6, 9, 3,7}, {5,8,2,4,9,3,7,6}, {2,9,4,5,8,6,3,7}, {4,8,5,2,9,7,6, 3}, {5,9,2,4,8,3,7,6}, {5,9,4,2,3,7,6, 8}, {5,9,2,4,7,6,8,3}, {5,9,4,2,6,8,3,7}, {4,6,2,5,9,7,8,3}, {2,9,5,4,6,3,7,8}, {5,6, 4,2,9,8,3, 7}, {4,9,2,5,6,7,8,3}, {4,9,5,2,7,8,3,6}, {5,7,2,4, 9,6,8,3}, {5,7,4,2,6,8,3,9}, {4,6,2,5,7,9,8,3}, {2,7,5,4,6,3,9, 8}, {2,7,4,5,3,9,8,6}, {4,3,5,2,7,6,9,8}, {4,3,2,5,6,9,8,7}, {2,6,5,4,3,7,9,8}, {2,6,4,5,7,9,8,3}, {4,7,5,2,6,3,9,8}, {4,7, 2,5,3,9,8,6}, {2,3,5,4,7,6,9,8}, {2,3,4,5,6,9,8,7}, {4,6,5,2,3, 7,9,8}, {5,3,2,4,6,8,7,9}, {5,3,4,2,8,7,9,6}, {5,3,2,4,7,9,6, 8}, {2,7,4,5,3,8,9,6}, {2,7,5,4,8,9,6,3}, {5,8,4,2,7,3,9,6}, {4,7,2,5,8,6,3,9}, {2,8,5,4,7,9,6,3}, {2,8,4,5,9,6,3,7}, {4, 9,5,2,8,7,6,3}, {4,9,2,5,7,6,3,8}, {2,7,5,4,9,8,6,3}, {2,7,4,5, 8,6,3,9}, {4,8,5,2,7,9,6,3}, {5, 7,2,4,8,3,9,6}, {2,8,4,5,7,6, 3,9}, {2,8,5,4,6,3,7,9,8}, {5,6,4,2,8,7,3,9}, {5,6,2,4,3,7,9,8}, {5,6, 4,2,3,9,8,7}, {4,3,2,5,6,7,9,8}, {2,6,5,4,3,8,7,9}, {2,6, 4,5,8,7,9,3}, {4,8,5,2,6,3,7,9}, {4,8, 2,5,3,7,9,6}, {2,3,5,4, 8,6,7,9}, {2,3,4,5,6,7,9,8}, {4,6,5,2,3,8,7,9}, {4,6,2,5,8,7,9, 3}, {2,8,5, 4,6,3,7,9}, {2,8,4,5,3,7,9,6}, {4,3,5,2,8,6,7,9}, {5,8,2,4,3,9,6,7}, {5,8,4,2,9,6,7,3}, {4,9,2, 5,8,3,6,7}, {2,8, 5,4,9,7,3,6}, {5,9,4,2,8,6,7,3}, {5,9,2,4,6,7,3,8}, {5,9,4,2,7, 3,8,6}, {5,9,2,4, 3,8,6,7}, {2,3,4,5,9,7,8,6}, {4,9,5,2,3,6,7, 8}, {5,3,2,4,9,8,6,7}, {2,9,4,5,3,7,8,6}, {2,9,5,4, 7,8,6,3}, {5,7,4,2,9,3,8,6}, {5,7,2,4,3,8,6,9}, {2,3,4,5,7,9,8,6}, {2,3, 5,4,9,8,6,7}, {5,9,4,2,3, 7,8,6}, {5,9,2,4,7,8,6,3}, {2,7,4,5, 9,3,8,6}, {4,9,5,2,7,6,3,8}, {5,7,2,4,9,8,6,3}, {5,7,4,2,8, 6,3, 9}, {4,8,2,5,7,9,6,3}, {4,8,5,2,9,6,3,7}, {5,9,2,4,8,7,6,3}, {5,9,4,2,7,6,3,8}, {4,7,2,5,9,8, 6,3}, vf}

List5:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {2,8,5,4,3,6,7, 9}, {2,8,4,5,6,7,9,3}, {2,8,5,4,7,9,3,6}, {5,7,4,2,8,6,9,3}, {2,7, 5,4,3,6,8,9}, {2,7,4,5,9,3,6,8}, {2,7, 5,4,3,6,8,9}, {2,7,4,5,9,3,6,8}, {2,7, 5,4,3,6,8,9}, {2,7,4,5,6,8,9,3}, {4,6,5,2,7,3,8,9}, {5,7,2,4,6, 9,3,8}, {2,6,4,5,7,8,9,3}, {2,6,5,4,8,9,3,7}, {2,6,4,5,9,3,7,8}, {2,6,5,4,3,7,89}, {5,3,4,2,6,9,7,8}, {4,6,2,5,3,8,9,7}, {2,3,5,4,6,7,8,9}, {2, 3,4,5,7,8,9,6}, {2,3,5,4,8,9,6,7}, {2,3,4,5,9,6,7,8}, {4,9,5,2,3,8,6,7}, {5,3,2,4,9,7,8,6}, {2, 9,4,5,3,6,7,8}, {2,9,5,4,6,7,8,3}, {2,9,4,5,7,8,3,6}, {2,9,5,4,8,3,6,7}, {5,8,4,2,9,7,3,6}, {4,9, 2,5,8,6,7,3}, {2,8,5,4,9,3,6,7}, {2,8,4,5,3,6,7,9}, {2,8,5,4,6,7,9,3}, {2,8,4,5,7,3,6}, {4,7, 5,2,8,6,9,3}, {5,8,2,4,7,3,6,9}, {2,7,4,5,8,9,3,6}, {2,7,5,4,9, 3,6,8}, {2,7,4,5,3,6,8,9}, {2,7,5, 4,6,8,9,3}, {5,6,4,2,7,3,8, 9}, {4,7,2,5,6,9,3,8}, {2,6,5,4,7,8,9,3}, {2,6,4,5,8,9,3,7}, {2,6,5, 4,9,3,7,8}, {2,6,4,5,3,7,8,9}, {4,3,5,2,6,9,7,8}, {5,6, 2,4,3,8,9,7}, {5,6,4,2,8,9,7,3}, {4,8,2,5, 6,3,9,7}, {2,6,5,4, 8,7,3,9}, {2,6,4,5,7,3,9,8}, {2,6,5,4,3,9,8,7}, {2,6,4,5,9,8,7, 3}, {4,9,5,2, 6,3,8,7}, {5,6,2,4,9,7,3,8}, {2,9,4,5,6,8,7,3}, {2,9,5,4,8,7,3,6}, {2,9,4,5,7,3,6,8}, {2,9,5,4,3, 6,8,7}, {5,3, 4,2,9,7,6,8}, {4,9,2,5,3,8,7,6}, {2,3,5,4,9,6,8,7}, {2,3,4,5,6, 8,7,9}, {2,3,5,4,8, 7,9,6}, {2,3,4,5,7,9,6,8}, {4,7,5,2,3,8,9, 6}, {5,3,2,4,7,6,8,9}, {2,7,2,5,3,9,6,8}, {2,7,5,4,9,6, 8,3}, {2,7,4,5,6,8,3,9}, {2,7,5,4,8,3,9,6}, {5,8,4,2,7,6,3,9}, {4,7, 2,5,8,9,6,3}, {2,8,5,4,7,3, 9,6}, {2,8,4,5,3,9,6,7}, {2,8,5,4, 9,6,7,3}, {2,8,4,5,6,7,3,9}, {4,6,5,2,8,9,7,3}, {5,8,2,4,6,3,9, 7}, {2,6,4,5,8,7,3,9}, {2,6,5,4,7,3,9,8}, {2,6,4,5,3,9,8,7}, {4,3,5,2,6,7,9,8}, {4,3,2,5,7,9,8, 6}, {4,3,5,2,9,8,6,7}, {5,9, 2,4,3,7,8,6}, {5,9,4,2,7,8,6,3}, {4,7,2,5,9,3,8,6}, {2,9,5,4,7, 6,3,8}, {5,7,4,2,9,8,6,3}, {4,9,2,5,3,7,8,6}, {2,7,5,4,9,6,3, 8}, {2,6,5,4,7,9,3,8}, {4,6,5,2,7,9,3,8}, {4,6,2,5,9,3,8,7}, {2,9,5,4,6,7,3,8}, {2,9,4,5,7,3,8,6}, {4,7,5,2,9,6,3,8}, {4,7, 2,5,6,3,8,9}, {2,6,5,4,7,9,3,8}, {2,6,4,5,9,3,8,7}, {4,9,5,2,6, 7,3,8}, {5,6,2,4,9,8,7,3}, {2,9,4,5,6,3,8,7}, {2,9,5,4,3,8,7, 6}, {5,3,4,2,9,6,8,7}, {4,9,2,5,3,7,6,8}, {2,3,5,4,9,8,7,6}, {2,3,4,5,8,7,6,9}, {4, 8,5,2,3,9,7,6}, {4,8,2,5,9,7,6,3}, {2,9, 5,4,8,3,7,6}, {2,9,4,5,3,7,6,8}, {4,3,5,2,9,8,7,6}, {4, 3,2,5, 8,7,6,9}, {2,8,5,4,3,9,7,6}, {2,8,4,5,9,7,6,3}, {4,9,5,2,8,3,7, 6}, {5,8,2,4,9,6,3,7}, {2,9, 4,5,8,7,6, 3}, {4,8,5,2,9,3,7,6}, {5,9,2,4,8,6,3,7}, {5,9,4,2,6,3,7,8}, {4,6,2,5,9,8,3,7}, {4,6, 5,2,8,3,7,9}, {4,6,2,5,3,7,9,8}, {4,6,5,2,7,9,8,3}, {5,7,2,4,6, 3,9,8}, {5,7,4,2,3,9,8,6}, {4,3,2, 5,7,6,9,8}, {2,7,5,4,3,8,6, 9}, {5,3,4,2,7,9,8,6}, {4,7,2,5,3,6,9,8}, {2,3,5,4,7,8,6,9}, {2,3,4, 5,8,6,9,7}, {4,8,5,2,3,7,6,9}, {5,3,2,4,8,9,7,6}, {2,8, 4,5,3,6,9,7}, {2,8,5,4,6,9,7,3}, {5,6,4,2, 8,3,9,7}, {4,8,2,5, 6,7,3,9}, {2,6,5,4,8,9,7,3}, {5,8,4,2,6,3,9,7}, {4,6,2,5,8,7,3, 9}, {4,6,5,2, 7,3,9,8}, {5,7,2,4,6,8,3,9}, {5,7,4,2,8,3, 9,6}, {4,8,2,5,7,6,3,9}, {4,8,5,2,6,3,9,7}, {5,6,2,4,8, 7,3,9}, {5,6, 4,2,7,3,9,8}, {4,7,2,5,6,8,3,9}, {4,7,5,2,8,3,9,6}, {5,8,2,4,7, 6,3,9}, {2,7,4,5,8, 9,6,3}, {4,8,5,2,7,3,9,6}, {5,7,2,4,8,6,3, 9}, {5,7,4,2,3,9,8,6}, {2,3,4,5,7,6, 9,8}, {4,7,5,2,3,8,6,9}, {4,7,2,5,8,6,9,3}, {2,8,5,4,7,3,6,9}, {5,7, 4,2,8,9,3,6}, {4,8,2,5,7,6, 9,3}, {2,7,5,4,8,3,6,9}, {2,7,4,5, 3,6,9,8}, {4,3,5,2,7,8,6,9}, {4,3,2,5,8,6,9,7}, {2,8,5,4,3,7,6, 9}, {2,8,4,5,7,6,9,3}, {4,7,5,2,8,3,6,9}, {5,8,2,4,7,9,3,6}, {2,7,4,5,8,6,9,3}, {4,8,5,2,7,3,6, 9}, {4,8,2,5,3,6,9,7}, {4,8, 5,2,6,9,7,3}, {5,6,2,4,8,3,9,7}, {5,6,4,2,3,9,7,8}, {4,3,2,5,6, 8,9,7}, {4,3,5,2,8,9,7,6}, {4,3,2,5,9,7,6,8}, {4,3,5,2,7,6,8, 9}, {5,7,2,4,3,9,6,8}, {5,7,4,2,9,6,8,3}, {4,9,2,5,7,3,6,8}, {4,9,5,2,3,6,8,7}, {4,9,2,5,6,8,7,3}, {4,9,5,2,8,7,3,6}, {5,8, 2,4,9,6,7,3}, {5,8,4,2,6,7,3,9}, {4,6,2,5,8,9,7,3}, {4,6,5,2,9, 7,3,8}, {4,6,2,5,7,3,8,9}, {2,7,5,4,6,9,3,8}, {5,6,4,2,7,8,9, 3}, {5,6,2,4,8,9,3,7}, {5,6,4,2,9,3,7,8}, {4,9,2,5,6,8,3,7}, {2,6,5,4,9,7,8,3}, {2, 6,4,5,7,8,3,9}, {4,7,5,2,6,9,8,3}, {4,7, 2,5,9,8,3,6}, {2,9,5,4,7,6,8,3}, {2,9,4, 5,6,8,3,7}, {4, 6,5,2, 9,7,8,3}, {4,6,2,5,7,8,3,9}, {2,7,5,4,6,9,8,3}, {2,7,4,5,9,8,3, 6}, {4,9,5,2,7,6,8,3}, {5,7, 2,4,9,3,6,8}, {5,7,4,2,3,6,8,9}, {5,7,2,4,6,8,9,3}, {2,6,4,5,7,3,8,9}, {4,7,5,2,6,9,3,8}, {5,6, 2,4,7,8,9,3}, {5,6,4,2,8,9,3,7}, {4,8,2,5,6,7,9,3}, {4,8,5,2,7, 9,3,6}, {4,8,2,5,7,9,3,6}, {4,8,5, 2,3,4,8,9,6,7}, {5,3,2,4,8,9,6,7}, {4,9,2,5,3,8,6,7}, {2,3,5,4,9,7,8,6}, {2,9, 4,5,7,8,6,3}, {4,7,5,2,9,3,8,6}, {5,9,2,4, 7,6,3,8}, {2,7,4,5, 9,8,6,3}, {4,9,5,2,7,3,8,6}, {5,7,2,4,9,6,3,8}, {5,7,4,2,6,3,8, 9}, {4,6,2,5, 7,9,3,8}, {4,6,5,2,9,3,8,7}, {4,6,2,5,3,8,7,9}, {2,3,5,4,6,9,8,7}, {5,6,4,2,3,7,9,8}, {4,3,2,5,6, 8,7,9}, {4,3, 5,2,8,7,9,6}, {4,3,2,5,7,9,6,8}, {2,7,5,4,3,8,9,6}, {5,3,4,2,7, 6,8,9}, {4,7,2,5,3, 9,6,8}, {4,7,5,2,9,6,8,3}, {5,9,2,4,7,3,6, 8}, {5,9,4,2,3,6,8,7}, {5,9,2,4,6,8,7,3}, {5,9,4,2,8,7, 3,6}, {4,8,2,5,9,6,7,3}, {4,8,5,2,6,7,3,9}, {5,6,2,4,8,9,7,3}, {2,8, 4,5,6,3,9,7}, {4,6,5,2,8,7, 3,9}, {4,6,2,5,7,3,9,8}, {4,6,5,2, 3,9,8,7}, {5,3,2,4,6,7,9,8}, {2,6,4,5,3,8,7,9}, {4,3,5,2,6,9,8, 7}, {4,3,2,5,9,8,7,6}, {4,3,5,2,8,7,6,9}, {5,8,2,4,3,9,7,6}, {5,8,4,2,9,7,6,3}, {4,9,2,5,8,3,7, 6}, {4,9,5,2,3,7,6,8}, {4,9, 2,5,7,6,8,3}, {4,9,5,2,6,8,3,7}, {5,6,2,4,9,7,8,3}, {5,6,4,2,7, 8,3,9}, {4,7,2,5,6,9,8,3}, {4,7,5,2,9,8,3,6}, {4,7,2,5,8,3,6, 9}, {4,7,5,2,3,6,9,8}, {5,3,2,4,7,8,6,9}, {5,3,4,2,8,6,9,7}, {4,8,2,5,3,7,6,9}, {4,8,5,2,7,6,9,3}, {4,8,2,5,6,9,3,7}, {2,6, 5,4,8,7,9,3}, {5,8,4,2,6,3,7,9}, {5,8,2,4,3,7,9,6}, {5,8,4,2,7, 9,6,3}, {4,7,2,5,8,3,9,6}, {2,8,5,4,7,6,3,9}, {5,7,4,2,8,9,6, 3}, {4,8,2,5,7,3,9,6}, {2,7,5,4,8,6,3,9}, {2,7,4,5,6,3,9,8}, {2,7,5,4,3,9,8,6}, {5, 3,4,2,7,6,9,8}, {4,7,2,5,3,8,6,9}, {2,3, 5,4,7,9,8,6}, {2,3,4,5,9,8,6,7}, {4,9,5,2,3,7,2,8,6}, {4, 9,2, 5,7,8,6,3}, {2,7,5,4,9,3,8,6}, {5,9,4,2,7,6,3,8}, {4,7,25,9,8, 6,3}, {2,9,5,4,7,3,8,6}, {2,9, 4,5,3,8,6,7}, {4,3,5,2,9,7,8,6}, {5,9,2,4,3,6,7,8}, {5,9,4,2,6,7,8,3}, {4,6,2,5,9,3,7,8}, {4,6, 5,2,3,7,8,9}, {5,3,2,4,6,9,7,8}, {5,3,4,2,9,7,8,6}, {4,9,2,5,3, 6,7,8}, {4,9,5,2,6,7,8,3}, {5,6,2, 4,9,3,7,8}, {5,6,4,2,3,7,8, 9}, {4,3,2,5,6,9,7,8}, {2,6,5,4,3,8,9,7}, {5,3,4,2,6,7,8,9}, {4,6,2, 5,3,9,7,8}, {2,3,5,4,6,8,9,7}, {2,3,4,5,8,9,7,6}, {4,8, 5,2,3,6,9,7}, {4,8,2,5,6,9,7,3}, {2,6,5,4, 8,3,9,7}, {2,6,4,5, 3,9,7,8}, {4,3,5,2,6,8,9,7}, {5,6,2,4,3,7,8,9}, {2,3,4,5,6,9,7, 8}, {4,6,5,2, 3,8,9,7}, {5,3,2,4,6,7,8,9}, {5,3,4,2,7,8,9,6}, {4,7,2,5,3,6,8,9}, {4,7,5,2,6,8,9,3}, {4,7,2,5,8, 9,3,6}, {4,7, 5,2,9,3,6,8}, {5,9,2,4,7,8,3,6}, {5,9,4,2,8,3,6,7}, {48,2,5,9, 7,3,6}, {2,9,5,4,8, 6,7,3}, {5,8,4,2,9,3,6,7}, {5,8,2,4,3,6,7, 9}, {5,8,4,2,6,7,9,3}, {4,6,2,5,8,3,7,9}, {2,8,5,4,6,9, 3,7}, {5,6,4,2,8,7,9,3}, {4,8,2,5,6,3,7,9}, {4,8,5,2,3,7,9,6}, {5,3, 2,4,8,6,7,9}, {5,3,4,2,6,7, 9,8}, {5,3,2,4,7,9,8,6}, {5,3,4,2, 9,8,6,7}, {4,9,2,5,3,7,8,6}, {4,9,5,2,7,8,6,3}, {5,7,2,4,9,3,8, 6}, {2,9,4,5,7,6,3,8}, {4,7,5,2,9,8,6,3}, {5,9,2,4,7,3,8,6}, {2,7,4,5,9,6,3,8}, {2,7,5,4,6,3,8, 9}, {5,6,4,2,7,9,3,8}, {5,6, 2,4,9,3,8,7}, {2,9,4,5,6,7,3,8}, {4,6,5,2,9,8,7,3}, {5,9,2,4,6, 3,8,7}, {2,6,4,5,9,7,3,8}, {4,9,5,2,6,8,7,3}, {4,9,2,5,8,7,3, 6}, {4,9,5,2,7,3,6,8}, {4,9,2,5,3,6,8,7}, {2,3,5,4,9,7,6,8}, {5,9,4,2,3,8,7,6}, {4,3,2,5,9,6,8,7}, {4,3,5,2,6,8,7,9}, {5,6, 2,4,3,8,7,9}, {2,9,4,5,6,5,3,8,7}, {4,9,5,2,3, 8,7,6}, {5,3,2,4,9,6,8,7}, {5,3,4,2,6,8,7,9}, {4,6,2,5,3,9,8, 7}, {2,3,5,4,6,7,9,8}, {5,6,4,2,3,8,7,9}, {4,3,2,5,6,9,8,7}, {2,6,5,4,3,7,9,8}, {2, 6,4,5,7,9,8,3}, {4,7,5,2,6,3,9,8}, {4,7, 2,5,3,9,8,6}, {2,3,5,4,7,6,9,8}, {5,7,4,2,3,8,6,9}, {5, 7,2,4, 8,6,9,3}, {5,7,4,2,6,9,3,8}, {4,6,2,5,7,8,9,3}, {4,6,5,2,8,9,3, 7}, {5,8,2,4,6,7,9,3}, {5,8, 4,2,7,9,3,6}, {5,8,2,4,9,3,6,7}, {5,8,4,2,3,6,7,9}, {4,3,2,5,8,9,6,7}, {4,3,5,2,9,6,7,8}, {5,9, 2,4,3,8,6,7}, {5,9,4,2,8,6,7,3}, {5,9,2,4,6,7,3,8}, {5,9,4,2,7, 3,8,6}, {4,7,2,5,9,6,3,8}, {4,7,5, 2,6,3,8,9}, {5,6,2,4,7,9,3, 8}, {5,6,4,2,9,3,8,7}, {5,6,2,4,3,8,7,9}, {2,3,4,5,6,9,8,7}, {4,6,5, 2,3,7,9,8}, {5,3,2,4,6,8,7,9}, {5,3,4,2,8,7,9,6}, {5,3, 2,4,7,9,6,8}, {2,7,4,5,3,8,9,6}, {2,7,5,4, 8,9,6,3}, {5,8,4,2, 7,3,9,6}, {4,7,2,5,8,6,3,9}, {2,8,5,4,7,9,6,3}, {2,8,4,5,9,6,3, 7}, {4,9,5,2, 8,7,6,3}, {5,8,2,4,9,3,7,6}, {2,9,4,5,8,6,3,7}, {2,9,5,4,6,3,7,8}, {2,9,4,5,3,7,8,6}, {2,9,5,4,7, 8,6,3}, {5,7, 4,2,9,3,8,6}, {4,9,2,5,7,6,3,8}, {2,7,5,4,9,8,6,3}, {2,7,4,5,8, 6,3,9}, {4,8,5,2,7, 9,6,3}, {5,7,2,4,8,3,9,6}, {2,8,4,5,7,6,3, 9}, {2,8,5,4,6,3,9,7}, {5,6,4,2,8,7,3,9}, {5,6,2,4,7,3, 9,8}, {5,6,4,2,3,9,8,7}, {4,3,2,5,6,7,9,8}, {2,6,5,4,3,8,7,9}, {5,3, 4,2,6,9,8,7}, {5,3,2,4,9,8, 7,6}, {5,3,4,2,8,7,6,9}, {4,8,2,5, 3,9,7,6}, {4,8,5,2,9,7,6,3}, {5,9,2,4,8,3,7,6}, {5,9,4,2,3,7,6, 8}, {5,9,2,4,7,6,8,3}, {5,9,4,2,6,8,3,7}, {4,6,2,5,9,7,8,3}, {4,6,5,2,7,8,3,9}, {5,7,2,4,6,9,8, 3}, {5,7,4,2,9,8,3,6}, {5,7,2,4,8,3,6,9}, {5,7,4,2,3,6,9,8}, {4,3,2,5,7,8,6,9}, {4,3,5,2,8,6,9,7}, {5,8,2,4,3,7,6,9}, {5,8,4,2,7,6,9,3}, {5,8,2,4,6,9,3,7}, {2,6,4,5,8,7,9,3}, {4,8,5,2,6,3,7,9}, {4,8,2,5,3,7,9,6}, {2,3,5,4,8,6,7,9}, {2,3,4,5,6,7,9,8}, {4,6,5,2,3,8,7,9}, {5,3,2,4,6,9,8,7}, {2,6,4,5,3,7,9,8}, {2,6,5,4,7,9,8,3}, {2,6,4,5,9,8,3,7}, {2,6,5,4,8,3,7,9}, {5,8,4,2,6,9,3,7}, {4,6,2,5,8,7,9,3}, {2,8,5,4,6,3,7,9}, {2,8,4,5,3,7,9,6}, {4,3,5,2,8,6,7,9}, {5,8,2,4,3,9,6,7}, {5, 8,4,2,9,6,7,3}, {4,9,2,5,8,3,6,7}, {2,8,5,4,9,7,3,6}, {2,8,4,5,7,3,6,9}, {4,7,5,2,8,9,3,6}, {5, 8,2,4,7,6,9,3}, {2,7,4,5,8,3,6,9}, {2,7,5,4,3,6,9,8}, {5,3,4,2,7,8,6,9}, {5,3,2,4,8,6,9,7}, {2,8, 4,5,3,7,6,9}, {2,8,5,4,7,6,9,3}, {5,7,4,2,8,3,6,9}, {4,8,2,5,7,9,3,6}, {2,7,5,4,8,6,9,3}, {2,7,4,5,6,9,3,8}, {4,6,5,2,7,8,9,3}, {4,6,2,5,8,9,3,7}, {4,6,5,2,9,3,7,8}, {5,9,2,4,6,8,3,7}, {2,6,4, 5,9,7,8,3}, {2,6,5,4,7,8,3,9}, {5,7,4,2,6,9,8,3}, {5,7,2,4,9,8,3,6}, {2,9,4,5,7,6,8,3}, {2,9,5, 4,6,8,3,7}, {5,6,4,2,9,7,8,3}, {5,6,2,4,7,8,3,9}, {2,7,4,5,6,9,8,3}, {2,7,5,4,9,8,3,6}, {5,9,4,2, 7,6,8,3}, {4,7,2,5, 9,3,6,8}, {4,7,5,2,3,6,8,9}, {4,7,2,5,6,8,9,3}, {2,6,5,4,7,3,8, 9}, {2,6,4,5, 3,8,9,7}, {4,3,5,2,6,7,8,9}, {5,6,2,4,3,9,7,8}, {2,3,4,5,6,8,9,7}, {2,3,5,4,8,9,7,6}, {5,8,4,2,3, 6,9,7}, {5,8, 2,4,6,9,7,3}, {2,6,4,5,8,3,9,7}, {2,6,5,4,3,9,7,8}, {5,3,4,2,6, 8,9,7}, {4,6,2,5,3, 7,8,9}, {2,3,5,4,6,9,7,8}, {2,3,4,5,9,7,8, 6}, {4,9,5,2,3,6,7,8}, {5,3,2,4,9,8,6,7}, {5,3,4,2,8,6, 7,9}, {4,8,2,5,3,9,6,7}, {4,8,5,2,9,6,7,3}, {5,9,2,4,8,3,6,7}, {2,8, 4,5,9,7,3,6}, {4,9,5,2,8,6, 7,3}, {4,9,2,5,6,7,3,8}, {2,6,5,4, 9,8,7,3}, {5,9,4,2,6,3,8,7}, {4,6,2,5,9,7,3,8}, {2,9,5,4,6,8,7, 3}, {2,9,4,5,8,7,3,6}, {2,9,5,4,7,3,6,8}, {2,9,4,5,3,6,8,7}, {4,3,5,2,9,7,6,8}, {5,9,2,4,3,8,7, 6}, {2,3,4,5,9,6,8,7}, {2,3, 5,4,6,8,7,9}, {2,3,4,5,8,7,9,6}, {2,3,5,4,7,9,6,8}, {5,7,4,2,3, 8,9,6}, {4,3,2,5,7,6,8,9}, {2,7,5,4,3,9,6,8}, {2,7,4,5,9,6,8, 3}, {2,7,5,4,6,8,3,9}, {2,7,4,5,8,3,9,6}, {4,8,5,2,7,6,3,9}, {5,7,2,4,8,9,6,3}, {5,7,4,2,9,6,3,8}, {5,7,2,4,6,3,8,9}, {2,6, 4,5,7,9,3,8}, {2,6,5,4,9,3,8,7}, {5,9,4,2,6,7,3,8}, {4,6,2,5,9, 8,7,3}, {2,9,5,4,6,3,8,7}, {5,6,4,2,9,7,3,8}, {5,6,2,4,7,3,8, 9}, {5,6,4,2,3,8,9,7}, {4,3,2,5,6,7,8,9}, {4,3,5,2,7,8,9,6}, {5,7,2,4,3,6,8,9}, {5, 7,4,2,6,8,9,3}, {5,7,2,4,8,9,3,6}, {5,7, 4,2,9,3,6,8}, {4,9,2,5,7,8,3,6}, {4,9,5,2,8,3,6,7}, {5, 8,2,4, 9,7,3,6}, {5,8,4,2,7,3,6,9}, {5,8,2,4,3,6,9,7}, {5,8,4,2,6,9,7, 3}, {4,6,2,5,8,3,9,7}, {4,6, 5,2,3,9,7,8}, {53,2,4,6,8,9,7}, {5,3,4,2,8,9,7,6}, {5,3,2,4,9,7,6,8}, {2,9,4,5,3,8,7,6}, {4,3, 5,2,9,6,8,7}, {5,9,2,4,3,7,6,8}, {2,3,4,5,9,8,7,6}, {2,3,5,4,8, 7,6,9}, {5,8,4,2,3,9,7,6}, {5,8,2, 4,9,7,6,3}, {2,9,4,5,8,3,7, 6}, {2,9,5,4,3,7,6,8}, {5,3,4,2,9,8,7,6}, {5,3,2,4,8,7,6,9}, {2,8,4, 5,3,9,7,6}, {2,8,5,4,9,7,6,3}, {5,9,4,2,3,8,7,6}, {4,9,2,5, 8,6,3,7}, {4,9,5,2,6,3,7,8}, {5,6,2,4, 9,8,3,7}, {5,6,4,2,8,3,7, 9}, {5,6,2,4, 3,7,9,8}, {5,6,4,2,7,9,8,3}, {4,7,2,5,6,3,9,8}, {4,7, 5,2,3,9,8,6}, {5,3,2,4,7,6,9,8}, {2,7,4,5,3, 8,6,9}, {4,3, 5,2,7,9,8,6}, {5,7,2,4,3,6,9,8}, {2,3,4,5,7,8,6,9}, {2,3,5,4,8, 6,9,7}, {5,8,4,2,3, 7,6,9}, {4,3,2,5,8,9,7,6}, {2,8,5,4,3,6,9, 7}, {2,8,4,5,6,9,7,3}, {4,6,5,2,8,3,9,7}, {5,8,2,4,6,7, 3,9}, {2,6,4,5,8,9,7,3}, {2,6,5,4,9,7,3,8}, {5,9,4,2,6,8,7,3}, {5,9, 2,4,8,7,3,6}, {5,9,4,2,7,3, 6,8}, {5,9,2,4,3,6,8,7}, {2,3,4,5, 9,7,6,8}, {2,3,5,4,7,6,8,9}, {5,7,4,2,3,9,6,8}, {4,3,2,5,7,8,9, 6}, {4,3,5,2,8,9,6,7}, {4,3,2,5,9,6,7,8}, {2,9,5,4,3,8,6,7}, {2,9,4,5,8,6,7,3}, {4,8,5,2,9,3,6, 7}, {4,8,2,5,3,6,7,9}, {4,8, 5,2,6,7,9,3}, {5,6,2,4,8,3,7,9}, {2,8,4,5,6,9,3,7}, {4,6,5,2,8, 7,9,3}, {2,8,5,4,6,7,3,9}, {2,8,4,5,7,3,9,6}, {4,7,5,2,8,6,3,9}, {5,8,2,4,7,9,6,3}, {5, 8,4,2,9,6,3,7}, {4,9,2,5,8,7,6,3}, {2,8,5,4,9,3,7,6}, {5,9,4,2, 8,6,3,7}, {5,9,2,4,6,3,7,8}, {5,9,4,2,3,7,8,6}, {5,9,2,4,7,8,6, 3}, {2,7,4,5,9,3,8,6}, {4,9,5,2,7,6,3,8}, {5,7,2,4,9,8,6,3}, {5,7,4,2,8,6,3,9}, {4,8,2,5,7,9,6,3}, {4,8,5,2,6,3,7, 9}, {5,9, 2,4,8,7,6,3}, {2,8,4,5,9,3,7,6}, {4,9,5,2,8,6,3,7}, {4, 9,2,5, 6,3,7,8}, {2,6,5,4,9,8,3,7}, {2,6,4,5,8,3,7,9}, {4,8,5,2,6,9,3, 7}, {5,6,2,4,8,7,9,3}, {2,8, 4,5,6,3,7,9}, {2,8,5,4,3,7,9,6}, {2,8,4,5,7,9,6,3}, {2,8,5,4,9,6,3,7}, {5,9,4,2,8,7,6,3}, {4,8, 2,5,9,3,7,6}, {2,9,5,4,8,6,3,7}, {2,9,4,5,6,3,7,8}, {4,6,5,2,9, 8,3,7}, {5,9,2,4,6,7,8,3}, {5,9,4, 2,7,8,3,6}, {4,7,2,5,9,6,8, 3}, {4,7,5,2,6,8,3,9}, {5,6,2,4,7,9,8,3}, {5,6,4,2,9,8,3,7}, {4,9,2, 5,6,7,8,3}, {4,9,5,2,7,8,3,6}, {5,7,2,4,9,6,8,3}, {5,7, 4,2,6,8,3,9}, {4,6,2,5,7,9,8,3}, {2,7,5,4, 6,3,9,8}, {2,7,4,5, 3,9,8,6}, {4,3,5,2,7,6,9,8}, {5,7,2,4,3,8,6,9}, {2,3,4,5,7,9,8, 6}, {2,3,5,4, 9,8,6,7}, {2,3,4,5,8,6,7,9}, {4,8,5,2,3,9,6,7}, {5,3,2,4,8,7,9,6}, {5,3,4,2,7,9,6,8}, {4,7,2,5,3, 8,9,6}, {4,7, 5,2,8,9,6,3}, {5,8,2,4,7,3,9,6}, {5,8,4,2,3,9,6,7}, {4,3,2,5,8, 7,9,6}, {4,3,5,2,7, 9,6,8}, {5,7,2,4,3,8,9,6}, {2,3,4,5,7,6,8, 9}, {4,7,5,2,3,9,6,8}, {5,3,2,4,7,8,9,6}, {5,3,4,2,8,9, 6,7}, vf}

List6:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {2,8,5,4,3,6,7, 9}, {2,8,4,5,6,7,9,3}, {2,8,5,4,7,9,3,6}, {5,7,4,2,8,6,9,3}, {4,8,2,5,7,3,6,9}, {2,7,5,4,8,9,3,6}, {2,7,4,5,9,3,6,8}, {2,7, 5,4,3,6,8,9}, {2,7,4,5,6,8,9,3}, {4,6,5,2,7,3,8,9}, {5,7,2,4,6, 9,3,8}, {2,6,4,5,7,8,9,3}, {2,6,5,4,8,9,3,7}, {2,6,4,5,9,3,7, 8}, {2,6,5,4,3,7,8,9}, {5,3,4,2,6,9,7,8}, {4,6,2,5,3,8,9,7}, {2,3,5,4,8,9,7,6}, {2, 3,4,5,7,8,9,6}, {2,3,5,4,9,6,7,8}, {2,3, 4,5,9,6,7,8}, {4,9,5,2,3,8,6,7}, {5,3,2,4,9,7,8,6}, {2, 9,4,5, 3,6,7,8}, {2,9,5,4,6,7,8,3}, {2,9,4,5,7,8,3,6}, {2,9,5,4,8,3,6, 7}, {5,8,4,2,9,7,3,6}, {4,9, 2,5,8,6,7,3}, {2,8,5,4,9,3,6,7}, {2,8,4,5,3,6,7,9}, {2,8,5,4,6,7,9,3}, {2,8,4,5,7,9,3,6}, {4,7, 5,2,8,6,9,3}, {5,8,2,4,7,3,6,9}, {2,7,4,5,8,9,3,6}, {2,7,5,4,9, 3,6,8}, {2,7,4,5,3,6,8,9}, {2,7,5, 4,6,8,9,3}, {4,6,2,5,7,3,8,9}, {5,7,2,4,6,9,3,8}, {2,6,4,5,7,8,9,3}, {2,6,4,5,8,9,3,7}, {2,6,5, 4,9,3,7,8}, {2,6,4,5,3,7,8,9}, {4,3,5,2,6,9,7,8}, {5,6, 2,4,3,8,9,7}, {5,6,4,2,8,9,7,3}, {4,8,2,5, 6,3,9,7}, {2,6,5,4, 8,7,3,9}, {2,6,4,5,7,3,9,8}, {2,6,5,4,3,9,8,7}, {2,6,4,5,9,8, 73}, {4,9,5,2, 6,3,8,7}, {5,6,2,4,9,7,3,8}, {2,9,4,5,6,8,73}, {2,9,5,4,8,7,3,6}, {2,9,4,5,7,3,6,8}, {2,9,5,4,3, 6,8,7}, {5,3, 4,2,9,7,6,8}, {4,9,2,5,3,8,7,6}, {2,3,5,4,9,6,8,7}, {2,3,4,5,6, 8,7,9}, {2,3,5,4,8, 7,9,6}, {2,3,4,5,7,9,6,8}, {4,7,5,2,3,8,9, 6}, {5,3,2,4,7,6,8,9}, {2,7,4,5,3,9,6,8}, {2,7,5,4,9,6, 8,3}, {2,7,4,5,6,8,3,9}, {2,7,5,4,8,3,9,6}, {5,8,4,2,7,6,3,9}, {4,7, 2,5,8,9,6,3}, {2,8,5,4,7,3, 9,6}, {2,8,4,5,3,9,6,7}, {2,8,5,4, 9,6,7,3}, {2,8,4,5,6,7,3,9}, {4,6,5,2,8,9,7,3}, {5,8,2,4,6,3,9, 7}, {2,6,4,5,8,7,3,9}, {2,6,5,4,7,3,9,8}, {2,6,4,5,3,9,8,7}, {4,3,5,2,6,8,7,9}, {4,3,2,5,7,9,8, 6}, {4,3,5,2,9,8,6,7}, {5,9, 2,4,3,7,8,6}, {4,7,2,5,3,8,6,9}, {2,9,5,4,7,6,3,8}, {4,7,5,2,9,6, 3,8}, {2,9,5,4,7,3,8,6}, {4,7,2,5,9,8,6,3}, {4,9,2,5,7,3,8,6}, {2,7,5,4,9,6,3,8}, {2,7,4,5,6,3, 8,9}, {4,6,5,2,7,9,3,8}, {4,6,2,5,9,3,8,7}, {2,9,5,4,6,7,3,8}, {2,9,4,5,7,3,8,6}, {4,7,5,2,9,6, 3,8}, {4,7, 2,5,6,3,8,9}, {2,6,5,4,7,9,3,8}, {2,6,4,5,9,3,8,7}, {4,9,5,2,6, 7,3,8}, {5,6,2,4,9,8,7,3}, {2,9,4, 5,6,3,8,7}, {2,9,5,4,3,8,7, 6}, {5,3,4,2,9,6,8,7}, {4,9,2,5,3,7,6,8}, {2,3,5,4,9,8,7,6}, {2,3,4,5, 8,7,6,9}, {4, 8,5,2,3,9,7,6}, {4,8,2,5,9,7,6,3}, {2,9, 5,4,8,3,7,6}, {2,9,4,5,3,7,6,8}, {4,3,5,2,9,8,7,6}, {4, 3,2,5, 8,7,6,9}, {2,8,5,4,3,9,7,6}, {2,8,4,5,9,7,6,3}, {4,9,5,2,8,3,7, 6}, {5,8,2,4,9,6,3,7}, {2,9, 4,5,8,7,6,3}, {4,8,5,2,9,3,7,6}, {5,9,2,4,8,6,3,7}, {5,9,4,2,6,3,7,8}, {4,6,2,5,9,8,3,7}, {4,6, 5,2,8,3,7,9}, {4,6,2,5,3,7,9,8}, {4,6,5,2,7,9,8,3}, {5,7,2,4,6, 3,9,8}, {5,7,4,2,3,9,8,6}, {4,3,2, 5,7,6,9,8}, {2,7,5,4,3,8,6, 9}, {5,3,4,2,7,9,8,6}, {4,7,2,5,3,6,9,8}, {2,3,5,4,7,8,6,9}, {2,3,4, 5,8,6,9,7}, {4,8,5,2,3,7,9,6}, {5,3,2,4,8,9,7,6}, {2,8, 4,5,3,6,9,7}, {2,8,5,4,6,9,7,3}, {5,6,4,2, 8,3,9,7}, {4,8,2,5, 6,7,3,9}, {2,6,5,4,8,9,7,3}, {5,8,4,2,6,3,9,7}, {4,6,5,2,8,7,3, 9}, {4,6,5,2, 7,3,9,8}, {5,7,2,4,6,8,3,9}, {5,7,4,2,8,3,9,6}, {4,8,2,5,7,6,3,9}, {4,8,5,2,6,3,9,7}, {5,6,2,4,8, 7,3,9}, {5,6, 4,2,7,3,9,8}, {4,7,2,5,6,8,3,9}, {4,7,5,2,8,3,9,6}, {5,8,2,4,7, 6,3,9}, {2,7,4,5,8, 9,6,3}, {4,8,5,2,7,3,9,6}, {5,7,2,4,8,6,3, 9}, {5,7,4,2,6,3,9,8}, {5,7,2,4,3,9,8,6}, {2,3,4,5,7,6,9,8}, {4,7,5,2,3,8,6,9}, {4,7,2,5,8,6,9,3}, {2,8,5,4,7,3,6,9}, {5,7,4,2,8,9,3,6}, {4,8,2,5,7,6,9,3}, {2,7,5,4,8,3,6,9}, {2,7,4,5,3,6,9,8}, {4,3,5,2,7,8,6,9}, {4,3,2,5,8,6,9,7}, {2,8,5,4,3,7,6,9}, {2,8,4,5,7,6,9,3}, {4,7,5,2,8,3,6,9}, {5,8,2,4,7,9,3,6}, {2,7,4,5,8,6,9,3}, {4,8,5,2,7,3,6,9}, {4,8,2,5,3,6,9,7}, {4,8,5,2,6,9,7,3}, {5,6,2,4,8,3,9,7}, {5,6,4,2,3,9,7,8}, {4,3,2,5,6,8,9,7}, {4,3,5,2,8,9,7,6}, {4,3,2,5,9,7,6,8}, {4,3,5,2,7,6,8,9}, {5,7,2,4,3,9,6,8}, {5,7,4,2,9,6,8,3}, {4,9,2,5,7,3,6,8}, {4,9,5,2,3,6,8,7}, {4,9,2,5,6,8,7,3}, {4,9,5,2,8,7,3,6}, {5,8,2,4,9,6,7,3}, {5,8,4,2,6,7,3,9}, {5,8,2,4,7,3,9,6}, {5,8,4,2,3,9,6,7}, {4,3,2,5,8,7,9,6}, {4,3,5,2,7,9,6,8}, {5,7,2,4,3,8,9,6}, {2,3,4,5,7,6,8,9}, {4,7,5,2,3,9,6,8}, {5,3,2,4,7,8,9,6}, {5,3,4,2,8,9,6,7}, {5,3,2,4,9,6,7,8}, {5,3,4,2,6,7,8,9}, {4,6,2,5,3,9,7,8}, {2,3,5,4,6,8,9,7}, {2,3,4,5,8,9,7,6}, {4,8,5,2,3,6,9,7}, {4,8,2,5,6,9,7,3}, {2,6,5,4,8,3,9,7}, {2,6,4,5,3,9,7,8}, {4,3,5,2,6,8,9,7}, {5,6,2,4,3,7,8,9}, {2,3,4,5,6,9,7,8}, {4,6,5,2,3,8,9,7}, {4,6,2,5,8,9,7,3}, {4,6,5,2,9,7,3,8}, {4,6,2,5,7,3,8,9}, {2,7,5,4,6,9,3,8}, {5,6,4,2,7,8,9,3}, {5,6,2,4,8,9,3,7}, {5,6,4,2,9,3,7,8}, {4,9,2,5,6,8,3,7}, {2,6,5,4,9,7,8,3}, {2,6,4,5,7,8,3,9}, {4,7,5,2,6,9,8,3}, {4,7,2,5,9,8,3,6}, {2,9,5,4,7,6,8,3}, {2,9,4,5,6,8,3,7}, {4,6,5,2,9,7,8,3}, {4,6,2,5,7,8,3,9}, {2,7,5,4,6,9,8,3}, {2,7,4,5,9,8,3,6}, {4,9,5,2,7,6,8,3}, {5,7,2,4,9,3,6,8}, {5,7,4,2,3,6,8,9}, {5,7,2,4,6,8,9,3}, {2,6,4,5,7,3,8,9}, {4,7,5,2,6,9,8,3}, {5,6,2,4,7,8,9,3}, {5,6,4,2,8,9,3,7}, {4,8,2,5,6,7,9,3}, {4,8,5,2,7,9,3,6}, {4,8,5,2,3,6,7,9}, {5,3,2,4,8,9,6,7}, {5,3,4,2,9,6,7,8}, {5,3,2,4,6,7,8,9}, {5,3,4,2,7,8,9,6}, {4,7,2,5,3,6,8,9}, {4,7,5,2,6,8,9,3}, {4,7,2,5,8,9,3,6}, {4,7,5,2,9,3,6,8}, {5,9,2,4,7,8,3,6}, {5,9,4,2,8,3,6,7}, {4,8,2,5,9,7,3,6}, {2,9,5,4,8,6,7,3}, {5,8,4,2,9,3,6,7}, {5,8,2,4,3,6,7,9}, {5,8,4,2,6,7,9,3}, {4,6,2,5,8,3,7,9}, {2,8,5,4,6,9,3,7}, {2,8,4,5,9,3,7,6}, {4,9,5,2,8,6,3,7}, {4,9,2,5,6,3,7,8}, {2,6,5,4,9,8,3,7}, {2,6,4,5,8,3,7,9}, {4,8,5,2,6,9,3,7}, {4,8,2,5,9,3,7,6}, {2,9,5,4,8,6,7,3}, {2,9,4,5,6,3,7,8}, {4,6,5,2,9,8,3,7}, {5,9,2,4,6,7,8,3}, {5,9,4,2,7,8,3,6}, {4,7,2,5,9,6,8,3}, {4,7,5,2,6,8,3,9}, {5,6,2,4,7,9,8,3}, {5,6,4,2,9,8,3,7}, {4,9,2,5,6,7,8,3}, {4,9,5,2,7,8,3,6}, {5,7,2,4,9,6,8,3}, {5,7,4,2,6,8,3,9}, {4,6,2,5,7,9,8,3}, {2,7,5,4,6,3,9,8}, {2,7,4,5,3,9,8,6}, {4,3,5,2,7,6,9,8}, {4,3,2,5,6,9,8,7}, {2,6,5,4,3,7,9,8}, {2,6,4,5,7,9,8,3}, {4,7,5,2,6,3,9,8}, {4,7,2,5,3,9,8,6}, {2,3,5,4,7,6,9,8}, {2,3,4,5,6,9,8,7}, {4,6,5,2,3,7,9,8}, {5,3,2,4,6,8,7,9}, {5,3,4,2,8,7,9,6}, {5,3,2,4,7,9,6,8}, {2,7,4,5,3,8,9,6}, {2,7,5,4,8,9,6,3}, {5,8,4,2,7,3,9,6}, {4,7,2,5,8,6,3,9}, {2,8,5,4,7,9,6,3}, {2,8,4,5,9,6,3,7}, {4,9,5,2,8,7,6,3}, {4,9,2,5,7,6,3,8}, {2,7,5,4,9,8,6,3}, {2,7,4,5,8,6,3,9}, {4,8,5,2,7,9,6,3}, {5,7,2,4,8,3,9,6}, {2,8,4,5,7,6,3,9}, {2,8,5,4,6,3,9,7}, {5,6,4,2,8,7,3,9}, {5,6,2,4,3,9,8,7}, {4,3,2,5,6,7,9,8}, {2,6,5,4,3,8,7,9}, {2,6,4,5,8,7,9,3}, {4,8,5,2,6,3,7,9}, {4,8,2,5,3,7,9,6}, {2,3,5,4,8,6,7,9}, {2,3,4,5,6,7,9,8}, {4,6,5,2,3,8,7,9}, {4,6,2,5,8,7,9,3}, {2,8,5,4,6,3,7,9}, {2,8,4,5,3,7,9,6}, {4,3,5,2,8,6,7,9}, {5,8,2,4,3,9,6,7}, {5,8,4,2,9,6,7,3}, {4,9,2,5,8,3,6,7}, {2,8,5,4,9,7,3,6}, {5,9,4,2,8,6,7,3}, {5,9,2,4,6,7,3,8}, {2,3,4,5,9,7,8,6}, {4,9,5,2,3,6,7,8}, {5,3,2,4,9,8,6,7}, {5,3,4,2,8,6,7,9}, {4,8,2,5,3,9,6,7}, {4,8,5,2,9,6,7,3}, {5,9,2,4,8,3,6,7}, {2,8,4,5,9,7,3,6}, {4,9,5,2,8,6,7,3}, {4,9,2,5,6,7,3,8}, {2,6,5,4,9,8,7,3}, {5,9,4,2,6,3,8,7}, {4,6,2,5,9,7,3,8}, {2,9,5,4,6,8,7,3}, {2,9,4,5,8,7,3,6}, {2,9,5,4,7,3,6,8}, {2,9,4,5,3,6,8,7}, {4,3,5,2,9,7,6,8}, {5,9,2,4,3,8,7,6}, {2,3,4,5,9,6,8,7}, {2,3,5,4,6,8,7,9}, {2,3,4,5,8,7,9,6}, {2,3,5,4,7,9,6,8}, {5,7,4,2,3,8,9,6}, {4,3,2,5,7,6,8,9}, {2,7,5,4,3,9,6,8}, {2,7,4,5,9,6,8,3}, {2,7,5,4,6,8,3,9}, {2,7,4,5,8,3,9,6}, {4,8,5,2,7,6,3,9}, {5,7,2,4,8,9,6,3}, {5,7,4,2,9,6,3,8}, {5,7,2,4,6,3,8,9}, {2,6,4,5,7,9,3,8}, {2,6,5,4,9,3,8,7}, {5,9,4,2,6,7,3,8}, {4,6,2,5,9,8,7,3}, {2,9,5,4,6,3,8,7}, {5,6,4,2,9,7,3,8}, {5,6,2,4,7,3,8,9}, 7}, {4,6,5,2,9,3,7,8}, {5,9,2,4,6,8,3,7}, {2,6,4,5,9,7,8,3}, {4,9,5,2,6,3,7,8}, {5,6,2,4,9,8,3,7}, {5,6,4,2,8,3,7,9}, {5,6,2,4,3,7,9,8}, {5,6,4,2,7,9,8,3}, {4,7,2,5,6,3,9,8}, {2,6,5,4,7,8,3,9}, {5,7,4,2,6,9,8,3}, {5,7,2,4,9,8,3,6}, {2,9,4,5,7,6,8,3}, {2,9,5,4,6,8,3,7}, {5,6,2,4,7,8,3,9}, {5,6,4,2,9,7,8,3}, {2,7,4,5,6,9,8,3}, {2,7,5,4,9,8,3,6}, {5,9,4,2,7,6,8,3}, {4,7,2,5,9,3,6,8}, {4,7,5,2,3,6,8,9}, {4,7,2,5,6,8,9,3}, {2,6,5,4,7,3,8,9}, {5,7,4,2,6,9,3,8}, {4,6,2,5,7,8,9,3}, {4,6,5,2,8,9,3,7}, {5,8,2,4,6,7,9,3}, {5,8,4,2,7,9,3,6}, {5,8,2,4,9,3,6,7}, {5,8,4,2,3,6,7,9}, {4,3,2,5,8,9,6,7}, {4,3,5,2,9,6,7,8}, {4,3,2,5,6,7,8,9}, {4,3,5,2,7,8,9,6}, {5,7,2,4,3,6,8,9}, {5,7,4,2,6,8,9,3}, {5,7,2,4,8,9,3,6}, {5,7,4,2,9,3,6,8}, {4,9,2,5,7,8,3,6}, {4,9,5,2,8,3,6,7}, {5,8,2,4,9,7,3,6}, {2,9,4,5,8,6,7,3}, {4,8,5,2,9,3,6,7}, {4,8,2,5,3,6,7,9}, {4,8,5,2,6,7,9,3}, {5,6,2,4,8,3,7,9}, {2,8,4,5,6,9,3,7}, {4,6,5,2,8,7,9,3}, {5,8,2,4,6,3,7,9}, {5,8,4,2,3,7,9,6}, {4,3,2,5,8,6,7,9}, {2,8,5,4,3,9,6,7}, {2,8,4,5,9,6,7,3}, {2,8,5,4,6,7,3,9}, {2,8,4,5,7,3,9,6}, {4,7,5,2,8,6,3,9}, {5,8,2,4,7,9,6,3}, {5,8,4,2,9,6,3,7}, {4,9,2,5,8,7,6,3}, {2,8,5,4,9,3,7,6}, {5,9,4,2,8,6,3,7}, {5,9,2,4,6,3,7,8}, {2,7,4,5,9,3,8,6}, {4,9,5,2,7,6,3,8}, {5,7,2,4,9,8,6,3}, {5,7,4,2,8,6,3,9}, {4,8,2,5,7,9,6,3}, {4,8,5,2,9,6,3,7}, {5,9,2,4,8,7,6,3}, {5,9,4,2,7,6,3,8}, {4,7,2,5,9,8,6,3}, {2,9,5,4,7,3,8,6}, {2,9,4,5,3,8,6,7}, {4,3,5,2,9,8,6,7}, {5,9,2,4,3,6,7,8}, {5,9,4,2,6,7,8,3}, {4,6,2,5,9,7,8,3}, {4,6,5,2,7,8,9,3}, {5,3,2,4,6,9,7,8}, {2,6,4,5,3,8,9,7}, {4,3,5,2,6,7,8,9}, {5,6,2,4,3,9,7,8}, {2,3,4,5,6,8,9,7}, {2,3,5,4,8,9,7,6}, {5,8,4,2,3,6,9,7}, {5,8,2,4,6,9,7,3}, {2,6,4,5,8,3,9,7}, {2,6,5,4,3,9,7,8}, {5,3,4,2,6,8,9,7}, {4,6,2,5,3,7,8,9}, {2,3,5,4,6,9,7,8}, {5,6,4,2,3,8,9,7}, {5,6,2,4,8,9,7,3}, {2,8,4,5,6,3,9,7}, {4,6,5,2,8,7,3,9}, {4,6,2,5,7,3,9,8}, {4,6,5,2,3,9,8,7}, {5,3,2,4,6,7,9,8}, {2,6,4,5,3,8,7,9}, {4,3,5,2,6,9,8,7}, {4,3,2,5,9,8,7,6}, {4,3,5,2,8,7,6,9}, {5,8,2,4,3,9,7,6}, {5,8,4,2,9,7,6,3}, {4,9,2,5,8,3,7,6}, {4,9,5,2,3,7,6,8}, {4,9,2,5,7,6,8,3}, {4,9,5,2,6,8,3,7}, {5,6,2,4,9,7,8,3}, {5,6,4,2,7,8,3,9}, {4,7,2,5,6,9,8,3}, {4,7,5,2,9,8,3,6}, {5,3,2,4,7,8,6,9}, {5,3,4,2,8,6,9,7}, {4,8,2,5,3,7,6,9}, {4,8,5,2,7,6,9,3}, {4,8,2,5,6,9,3,7}, {2,6,5,4,8,7,9,3}, {5,8,4,2,6,3,7,9}, {5,8,2,4,3,7,9,6}, {5,8,4,2,7,9,6,3}, {4,7,2,5,8,3,9,6}, {2,8,5,4,7,6,3,9}, {5,7,4,2,6,9,3,8}, {5,7,2,4,9,6,3,8}, {5,7,4,2,6,3,8,9}, {4,6,2,5,7,9,3,8}, {4,6,5,2,9,3,8,7}, {4,6,2,5,3,8,7,9}, {2,3,5,4,6,9,8,7}, {5,6,4,2,3,7,9,8}, {4,3,2,5,6,8,7,9}, {4,3,5,2,8,7,9,6}, {2,7,5,4,3,8,9,6}, {5,3,4,2,7,6,8,9}, {4,7,2,5,3,9,6,8}, {4,7,5,2,9,6,8,3}, {5,9,2,4,7,3,6,8}, {5,9,4,2,6,7,3,8}, {4,8,2,5,9,7,6,3}, {4,8,5,2,6,7,3,9}, {4,8,2,5,7,3,9,6}, {2,7,5,4,8,6,3,9}, {2,7,4,5,6,3,9,8}, {4,6,5,2,7,8,3,9}, {5,7,2,4,6,9,8,3}, {5,7,4,2,9,8,3,6}, {5,7,2,4,8,3,6,9}, {5,7,4,2,3,6,9,8}, {4,3,2,5,7,8,6,9}, {2,7,5,4,3,9,8,6}, {5,3,4,2,7,6,9,8}, {5,3,2,4,6,9,8,7}, {2,6,4,5,3,7,9,8}, {2,6,5,4,7,9,8,3}, {2,6,4,5,9,8,3,7}, {2,6,5,4,8,3,7,9}, {5,8,4,2,6,9,3,7}, {5,8,2,4,9,3,7,6}, {2,9,4,5,8,6,3,7}, {4,8,5,2,9,7,6,3}, {5,9,2,4,8,3,7,6}, {5,9,4,2,3,7,6,8}, {5,9,2,4,7,6,8,3}, {5,9,4,2,6,8,3,7}, {4,6,2,5,9,7,8,3}, {2,9,5,4,6,3,7,8}, {2,9,4,5,3,7,8,6}, {2,9,5,4,7,8,6,3}, {5,7,4,2,9,3,8,6}, {5,7,2,4,3,8,6,9}, {2,3,4,5,7,9,8,6}, {2,3,5,4,9,8,6,7}, {2,3,4,5,8,6,7,9}, {4,8,5,2,3,9,6,7}, {5,3,2,4,8,7,9,6}, {5,3,4,2,7,9,6,8}, {4,7,2,5,3,8,9,6}, {4,7,5,2,8,9,6,3}, {4,7,2,5,9,6,3,8}, {4,7,5,2,6,3,8,9}, {5,6,2,4,7,9,3,8}, {5,6,4,2,9,3,8,7}, {5,6,2,4,3,8,7,9}, {5,6,4,2,8,7,9,3}, {4,8,2,5,6,3,7,9}, {4,8,5,2,3,7,9,6}, {5,3,2,4,8,6,7,9}, {5,3,4,2,7,9,8,6}, {5,3,4,2,9,8,6,7}, {4,9,2,5,3,7,8,6}, {4,9,5,2,7,8,6,3}, {5,7,2,4,9,3,8,6}, {5,7,4,2,3,8,6,9}, {5,7,2,4,8,6,9,3}, {2,8,4,5,7,3,6,9}, {4,7,5,2,8,9,3,6}, {5,8,2,4,7,6,9,3}, {2,7,4,5,8,3,6,9}, {2,7,5,4,3,6,9,8}, {5,3,4,2,7,8,6,9}, {5,3,2,4,8,6,9,7}, {2,8,4,5,3,7,6,9}, {2,8,5,4,7,6,9,3}, {5,7,4,2,8,3,6,9}, {4,8,2,5,7,9,3,6}, {2,7,5,4,8,6,9,3}, {5,8,4,2,7,3,6,9}, {5,8,2,4,3,6,9,7}, {5,8,4,2,6,9,7, 3}, {4,6,2,5,8,3,9,7}, {4,6,5,2, 3,9,7,8}, {5,3,2,4,6,8,9,7}, {5,3,4,2,8,9,7,6}, {5,3,2,4,9,7,6,8}, {2,9,4,5,3,8,7,6}, {4,3, 5,2, 9,6,8,7}, {5,9,2,4,3,7,6,8}, {2,3,4,5,9,8,7,6}, {2,3,5,4, 8,7,6,9}, {5,8,4,2,3,9,7,6}, {5,8,2,4,9, 7,6,3}, {2,9,4,5,8,3, 7,6}, {2,9,5,4,3,7,6,8}, {5,3,4,2,9,8,7,6}, {5,3,2,4,8,7,6,9}, {2,8,4,5,3, 9,7,6}, {4,3,5,2,8,6,9,7}, {5,8,2,4,3,7,6,9}, {5,8, 4,2,7,6,9,3}, {5,8,2,4,6,9,3,7}, {5,8,4,2,9,3, 7,6}, {4,9,2,5, 8,6,3,7}, {2,8,5,4,9,7,6,3}, {5,9,4,2,8,3,7,16}, {4,8,2,5,9,6, 3,7}, {2,9,5,4,8,7, 6,3}, {2,9,4,5,7,6,3,8}, {4,7,5,2,9,8,6,3}, {5,9,2,4,7,3,8,6}, {2,7,4,5,9,6,3,8}, {2,7,5,4,6,3,8, 9}, {5,6, 4,2,7,9,3,8}, {5,6,2,4,9,3,8,7}, {2,9,4,5,6,7,3,8}, {4,6,5,2,9, 8,7,3}, {5,9,2,4,6,3,8, 7}, {2,6,4,5,9,7,3,8}, {4,9,5,2,6,8,7, 3}, {4,9,2,5,8,7,3,6}, {4,9,5,2,7,3,6,8}, {4,9,2,5,3,6,8,7}, {2,3,5,4,9,7,6,8}, {5,9,4,2,3,8,7,6}, {4,3,2,5,9,6,8,7}, {4,3, 5,2,6,8,7,9}, {5,6,2,4,3,9,8,7}, {5,6,4,2,9,8,7,3}, {4,9,2,5,6, 3,8,7}, {4,9,5,2,3,8,7,6}, {5,3,2,4,9,6,8,7}, {5,3,4,2,6,8,7, 9}, {4,6,2,5,3,9,8,7}, {2,3,5,4,6,7,9,8}, {5,6,4,2,3,7,8,9}, {5,6,2,4,8,7,9,3}, {2,8,4,5,6,3,7,9}, {2,8,5,4,3,7,9,6}, {2,8, 4,5,7,9,6,3}, {2,8,5,4,9,6,3,7}, {5,9,4,2,8,7,6,3}, {5,9,2,4,7, 6,3,8}, {2, 7,4,5,9,8,6,3}, {4,9,5,2,7,3,8,6}, {4,9,2,5,3,8,6, 7}, {2,3,5,4,9,7,8,6}, {5,9,4,2,3,6,7,8}, {4, 3,2,5,9,8,6,7}, {2,9,5,4,3,7,8,6}, {2,9,4,5,7,8,6,3}, {4,7,5,2,9,3,8,6}, {4,7, 2,5,3,8,6,9}, {2,3, 5,4,7,9,8,6}, {2,3,4,5,9,8,6,7}, {4,9,5,2, 3,7,8,6}, {4,9,2,5,7,8,6,3}, {2,7,5,4,9,3,8,6}, {2,7, 4,5,3,8, 6,9}, {4,3,5,2,7,9,8,6}, {5,7,2,4,3,6,9,8}, {2,3,4,5,7,8,6,9}, {4,7,5,2,3,9,8,6}, {5,3,2, 4,7,6,9,8}, {5,3,4,2,6,9,8,7}, {5,3, 2,4,9,8,7,6}, {5,3,4,2,8,7,6,9}, {4,8,2,5,3,9,7,6}, {2,3,5, 4,8, 6,9,7}, {5,8,4,2,3,7,6,9}, {4,3,2,5,8,9,7,6}, {2,8,5,4,3,6,9, 7}, {2,8,4,5,6,9,7,3}, {4,6,5,2, 8,3,9,7}, {5,8,2,4,6,7,3,9}, {2,6,4,5,8,9,7,3}, {2,6,5,4,9,7,3,8}, {5,9,4,2,6,8,7,3}, {5,9, 2,4, 8,7,3,6}, {5,9,4,2,7,3,6,8}, {5,9,2,4,3,6,8,7}, {2,3,4,5, 9,7,6,8}, {2,3,5,4,7,6,8,9}, {5,7,4,2,3, 9,6,8}, {4,3,2,5,7,8, 9,6}, {4,3,5,2,8,9,6,7}, {4,3,2,5,9,6,7,8}, {2,9,5,4,3,8,6,7}, {5,3,4,2,9, 7,8,6}, {4,9,2,5,3,6,7,8}, {4,9,5,2,6,7,8,3}, {5,6, 2,4,9,3,7,8}, {5,6,4,2,3,7,8,9}, {4,3,2,5,6,9, 7,8}, vf}

List7:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {2,8,5,4,3,6,7, 9}, {2,8,4,5,6,7,9,3}, {2,8,5,4,7,9,3,6}, {5,7,4,2,8,6,9,3}, {4,8,2,5,7,3,6,9}, {2,7,5,4,8,9,3,6}, {2,7,4,5,9,3,6,8}, {2,7, 5,4,3,6,8,9}, {2,7,4,5,6,8,9,3}, {4,6,5,2,7,3,8,9}, {5,7,2,4,6, 9,3,8}, {2,6,4,5,7,8,9,3}, {2,6,5,4,8,9,3,7}, {2,6,4,5,9,3,7, 8}, {2,6,5,4,3,7,8,9}, {5,3,4,2,6,9,7,8}, {4,6,2,5,3,8,9,7}, {2,3,5,4,6,7,8,9}, {2, 3,4,5,7,8,9,6}, {2,3,5,4,8,9,6,7}, {2,3, 4,5,9,6,7,8}, {4,9,5,2,3,8,6,7}, {5,3,2,4,9,7,8,6}, {2, 9,4,5, 3,6,7,8}, {2,9,5,4,6,7,8,3}, {2,9,4,5,7,8,3,6}, {2,9,5,4,8,3,6, 7}, {5,8,4,2,9,7,3,6}, {4,9, 2,5,8,6,7,3}, {2,8,5,4,9,3,6,7}, {2,8,4,5,3,6,7,9}, {2,8,5,4,6,7,9,3}, {2,8,4,5,7,9,3,6}, {4,7, 5,2,8,6,9,3}, {5,8,2,4,7,3,6,9}, {27,4,5,8,9,3,6}, {2,7,5,4,9, 3,6,8}, {2,7,4,5,3,6,8,9}, {2,7,5, 4,6,8,9,3}, {5,6,4,2,7,3,8, 9}, {4,7,2,5,6,9,3,8}, {2,6,5,4,7,8,9,3}, {2,6,4,5,8,9,3,7}, {2,6,5, 4,9,3,7,8}, {2,6,4,5,3,7,8,9}, {4,3,5,2,6,9,7,8}, {5,6, 2,4,3,8,9,7}, {5,6,4,2,8,9,7,3}, {4,8,2,5, 6,3,9,7}, {2,6,5,4, 8,7,3,9}, {2,6,4,5,7,3,9,8}, {2,6,5,4,3,9,8,7}, {2,6,4,5,9,8,7, 3}, {4,9,5,2, 6,3,8,7}, {5,6,2,4,9,7,3,8}, {2,9,4,5,6,8,7,3}, {2,9,5,4,8,7,3,6}, {2,9,4,5,7,3,6,8}, {2,9,5,4,3, 6,8,7}, {5,3, 4,2,9,7,6,8}, {4,9,2,5,3,8,7,6}, {2,3,5,4,9,6,8,7}, {2,3,4,5,6, 8,7,9}, {2,3,5,4,8, 7,9,6}, {2,3,4,5,7,9,6,8}, {4,7,5,2,3,8,9, 6}, {5,3,2,4,7,6,8,9}, {2,7,4,5,3,9,6,8}, {2,7,5,4,9,6, 8,3}, {2,7,4,5,6,8,3,9}, {2,7,5,4,8,3,9,6}, {5,8,4,2,7,6,3,9}, {4,7, 2,5,8,9,6,3}, {2,8,5,4,7,3, 9,6}, {2,8,4,5,3,9,6,7}, {2,8,5,4, 9,6,7,3}, {4,6,5,2,8,7,9,3}, {5,8,2,4,6,9,7,3}, {5,8,4,2,6,3,9, 7}, {2,6,5,4,7,3,9,8}, {2,6,4,5,7,3,9,8}, {2,6,4,5,3,7,9,8}, {2,6,4,5,7,3,9,8}, {5,9, 2,4,3,7,8}, {5,9,4,2,7,8,6,3}, {4,7,2,5,9,8,6}, {2,9,5,4,7,6, 3,8}, {5,7,4,2,9,8,6,3}, {4,9,2,5,7,3,8}, {2,7,5,4,9,6,3,8}, {2,7,4,5,6,3,8,9}, {4,6,5,2,7,9,3,8}, {4,6,2,5,9,3,8,7}, {2,9, 5,4,6,7,3,8}, {2,9,4,5,7,3,8,6}, {4,7,5,2,9,6,3,8}, {4,7,2,5,6, 3,8,9}, {2,6,5,4,7,9,3,8}, {2,6,4,5,9,3,8,7}, {4,9,5,2,6,7,3, 8}, {5,6,2,4,9,8,7,3}, {2,9,4,5,6,3,8,7}, {2,9,5,4,3,8,7,6}, {5,3,4,2,9,6,8,7}, {4,9,2,5,3,7,6,8}, {2,3,5,4,9,8,7,6}, {2,3, 4,5,8,7,6,9}, {4, 8,5,2,3,9,7,6}, {4,8,2,5,9,7,6,3}, {2,9,5,4, 8,3,7,6}, {2,9,4,5,3,7,6,8}, {4,3,5,2,9,8,7,6}, {4, 3,2,5,8,7, 6,9}, {2,8,5,4,3,9,7,6}, {2,8,4,5,9,7,6,3}, {4,9,5,2,8,3,7,6}, {5,8,2,4,9,6,3,7}, {2,9, 4,5,8,7,6,3}, {4,8,5,2,9,3,7,6}, {5,9, 2,4,8,6,3,7}, {5,9,4,2,6,3,7,8}, {4,6,2,5,9,8,3,7}, {4,6, 5,2, 8,3,7,9}, {4,6,2,5,3,7,9,8}, {4,6,5,2,7,9,8,3}, {5,7,2,4,6,3,9, 8}, {5,7,4,2,3,9,8,6}, {4,3,2, 5,7,6,9,8}, {2,7,5,4,3,8,6,9}, {5,3,4,2,7,9,8,6}, {4,7,2,5,3,6,9,8}, {2,3,5,4,7,8,6,9}, {2,3, 4, 5,8,6,9,7}, {4,8,5,2,3,7,6,9}, {5,3,2,4,8,9,7,6}, {2,8,4,5, 3,6,9,7}, {2,8,5,4,6,9,7,3}, {5,6,4,2, 8,3,9,7}, {4,8,2,5,6,7, 3,9}, {2,6,5,4,8,9,7,3}, {5,8,4,2,6,3,9,7}, {4,6,2,5,8,7,3,9}, {4,6,5,2, 7,3,9,8}, {5,7,2,4,6,8,3,9}, {5,7,4,2,8,3,9,6}, {4,8, 2,5,7,6,3,9}, {4,8,5,2,6,3,9,7}, {5,6,2,4,8, 7,3,9}, {5,6,4,2, 7,3,9,8}, {4,7,2,5,6,8,3,9}, {4,7,5,2,8,3,9,6}, {5,8,2,4,7,6,3, 9}, {2,7,4,5,8, 9,6,3}, {4,8,5,2,7,3,9,6}, {5,7,2,4,8,6,3,9}, {5,7,4,2,6,3,9,8}, {5,7,2,4,3,9,8,6}, {2,3,4,5,7,6, 9,8}, {4,7, 5,2,3,8,6,9}, {4,7,2,5,8,6,9,3}, {2,8,5,4,7,3,6,9}, {5,7,4,2,8, 9,3,6}, {4,8,2,5,7,6, 9,3}, {2,7,5,4,8,3,6,9}, {2,7,4,5,3,6,9, 8}, {4,3,5,2,5,8,6,9,7}, {4,3,2,5,8,6,9,7}, {2,8,5,4,3,7,6, 9}, {2,8,4,5,7,6,9,3}, {4,7,5,2,8,3,6,9}, {5,8,2,4,7,9,3,6}, {2,7, 4,5,8,6,9,3}, {4,8,5,2,7,3,6, 9}, {4,8,2,5,3,6,9,7}, {4,8,5,2, 6,9,7,3}, {5,6,2,4,8,3,9,7}, {5,6,4,2,3,9,7,8}, {4,3,2,5,6,8,9, 7}, {4,3,5,2,8,9,7,6}, {4,3,2,5,9,7,6,8}, {4,3,5,2,7,6,8,9}, {5,7,2,4,3,9,6,8}, {5,7,4,2,9,6,8,3}, {4,9,2,5,7,3,6,8}, {4,9, 5,2,3,6,8,7}, {4,9,2,5,6,8,7,3}, {4,9,5,2,8,7,3,6}, {5,8,2,4,9, 6,7,3}, {5,8,4,2,6,7,3,9}, {4,6,2,5,8,9,7,3}, {4,6,5,2,9,7,3, 8}, {4,6,2,5,7,3,8,9}, {2,7,5,4,6,9,3,8}, {5,6,4,2,7,8,9,3}, {5,6,2,4,8,9,3,7}, {5,6,4,2,9,3,7,8}, {4,9,2,5,6,8,3,7}, {2,6, 5,4,9,7,8,3}, {2, 6,4,5,7,8,3,9}, {4,7,5,2,6,9,8,3}, {4,7,2,5, 9,8,3,6}, {2,9,5,4,7,6,8,3}, {2,9,4,5,6,8,3,7}, {4, 6,5,2,9,7, 8,3}, {4,6,2,5,7,8,3,9}, {2,7,5,4,6,9,8,3}, {2,7,4,5,9,8,3,6}, {4,9,5,2,7,6,8,3}, {5,7, 2,4,9,3,6,8}, {5,7,4,2,3,6,8,9}, {5,7, 2,4,6,8,9,3}, {2,6,4,5,7,3,8,9}, {4,7,5,2,6,9,3,8}, {5,6, 2,4, 7,8,9,3}, {5,6,4,2,8,9,3,7}, {4,8,2,5,6,7,9,3}, {4,8,5,2,7,9,3, 6}, {4,8,2,5,9,3,6,7}, {4,8,5, 2,3,6,7,9}, {5,3,2,4,8,9,6,7}, {5,3,4,2,9,6,7,8}, {4,9,2,5,3,8,6,7}, {2,3,5,4,9,7,8,6}, {5,9, 4, 2,3,6,7,8}, {4,3,2,5,9,8,6,7}, {2,9,5,4,3,7,8,6}, {2,9,4,5, 7,8,6,3}, {4,7,5,2,9,3,8,6}, {5,9,2,4, 7,6,3,8}, {2,7,4,5,9,8, 6,3}, {4,9,5,2,7,3,8,6}, {5,7,2,4,9,6,3,8}, {5,7,4,2,6,3,8,9}, {4,6,2,5, 7,9,3,8}, {4,6,5,2,9,3,8,7}, {4,6,2,5,3,8,7,9}, {2,3, 5,4,6,9,8,7}, {5,6,4,2,3,7,9,8}, {4,3,2,5,6, 8,7,9}, {4,3,5,2, 8,7,9,6}, {4,3,2,5,7,9,6,8}, {2,7,5,4,3,8,9,6}, {5,3,4,2,7,6,8, 9}, {4,7,2,5,3, 9,6,8}, {4,7,5,2,9,6,8,3}, {5,9,2,4,7,3,6,8}, {5,9,4,2,3,6,8,7}, {5,9,2,4,6,8,7,3}, {5,9,4,2,8,7, 3,6}, {4,8, 2,5,9,6,7,3}, {4,8,5,2,6,7,3,9}, {5,6,2,4,8,9,7,3}, {2,8,4,5,6, 3,9,7}, {4,6,5,2,8,7, 3,9}, {4,6,2,5,7,3,9,8}, {4,6,5,2,3,9,8, 7}, {5,3,2,4,6,7,9,8}, {2,6,4,5,3,8,7,9}, {4,3,5,2,6,9,8, 7}, {4,3,2,5,9,8,7,6}, {4,3,5,2,8,7,6,9}, {5,8,2,4,3,9,7,6}, {5,8, 4,2,9,7,6,3}, {4,9,2,5,8,3,7, 6}, {4,9,5,2,3,7,6,8}, {4,9,2,5, 7,6,8,3}, {4,9,5,2,6,8,3,7}, {5,6,2,4,9,7,8,3}, {5,6,4,2,7,8,3, 9}, {4,7,2,5,6,9,8,3}, {4,7,5,2,9,8,3,6}, {4,7,2,5,8,3,6,9}, {4,7,5,2,3,6,9,8}, {5,3,2,4,7,8,6,9}, {5,3,4,2,8,6,9,7}, {4,8, 2,5,3,7,6,9}, {4,8,5,2,7,6,9,3}, {4,8,2,5,6,9,3,7}, {2,6,5,4,8, 7,9,3}, {5,8,4,2,6,3,7,9}, {5,8,2,4,3,7,9,6}, {5,8,4,2,7,9,6, 3}, {4,7,2,5,8,3,9,6}, {2,8,5,4,7,6,3,9}, {5,7,4,2,8,9,6,3}, {4,8,2,5,7,3,9,6}, {2,7,5,4,8,6,3,92}, {2,7,4,5,6,3,9,8}, {2,7, 5,4,3,9,8,6}, {5, 3,4,2,7,6,9,8}, {4,7,2,5,5,3,8,6,9}, {2,3,5,4, 7,9,8,6}, {2,3,4,5,9,8,6,7}, {4,9,5,2,3,7,8,6}, {4, 9,2,5,7,8, 6,3}, {2,7,5,4,9,3,8,6}, {5,9,4,2,7,6,3,8}, {4,7,2,5,9,8,6}, {2,9,5,4,7,3,8,6}, {2,9, 4, 5,3,8,6,7}, {4,3,5,2,9,7,8,6}, {5,9, 2,4,3,6,7,8}, {5,9,4,2,6,7,8,3}, {4,6,2,5,9,3,8}, {4,6, 5,2,3, 7,8,9}, {5,3,2,4,6,9,7,8}, {5,3,4,2,9,7,8,6}, {4,9,2,5,3,6,7,8}, {4,9,5,2,6,7,8,3}, {5,6,2, 4,9,3,7,8}, {5,6,4,2,3,7,8,9}, {4,3,2,5,6,9,7,8}, {2,6,5,4,3,8,9,7}, {2,6,4,5,8,9,7,3}, {2,6, 5, 4,9,7,3,8}, {5,9,4,2,6,8,7,3}, {5,9,2,4,8,7,3,6}, {9,2,2,4, 3,6,8,7}, {2,3,4,5, 9,7,6,8}, {2,3,5,4,7,6,8,9}, {5,7,4,2,3,9, 6,8}, {4,3,2,5,7,8,9,6}, {4,3,5,2,8,9,6,7}, {4,3,2,5, 9,6,7,8}, {2,9,5,4,3,8,6,7}, {2,9,4,5,8,6,7,3}, {4,8,5,2,9,3,6,7}, {4,8, 2,5,3,6,7,9}, {4,8,5,2,6, 7,9,3}, {5,6,2,4,8,3,7,9}, {2,8,4,5, 6,9,3,7}, {4,6,5,2,8,7,9,3}, {5,8,2,4,6,3,7,9}, {5,8,4,2,3, 7,9, 6}, {4,3,2,5,8,6,7,9}, {2,8,5,4,3,9,6,7}, {2,8,4,5,9,6,7,3}, {2,8,5,4,6,7,3,9}, {2,8,4,5,7,3, 9,6}, {4,7,5,2,8,6,3,9}, {5,8, 2,4,7,9,6,3}, {5,9,4,8,2,9,6,3,7}, {4,9,2,5,8,7,6,3}, {2,8,5,4,9, 3, 7,6}, {5,9,4,2,8,6,3,7}, {5,9,2,4,6,3,7,8}, {5,9,4,2,3,7,8, 6}, {5,9,2,4,7,8,6,3}, {2,7,4,5,9,3,8, 6}, {4,9,5,2,7,6,3,8}, {5,7,2,4,9,8,6,3}, {5,7,4,2,8,6,3,9}, {4,8,2,5,7,9,6,3}, {4,8, 5,2,9,6,3, 7}, {5,9,2,4,8,7,6,3}, {2,8,4,5,9,3,7,6}, {4,9,5,2, 8,6,3,7}, {4,9,2,5,6,3,7,8}, {2,6,5,4,9,8,3,7}, {2,6,4,5,8,3,7, 9}, {4,8,5,2,6,9,3,7}, {5,6,2,4,8,7,9,3}, {2,8,4,5,6,3,7,9}, {2,8,5,4,3,7,9,6}, {2,8,4,5,7,9,6,3}, {2,8,5,4,9,6,3,7}, {5,9, 4,2,8,7,6,3}, {4,8,2,5,9,3,7,6}, {2,9,5,4,8,6,3,7}, {2,9,4,5,6, 3,7,8}, {4,6,5,2,9,8,3,7}, {5,9,2,4,6,7,8,3}, {5,9,4,2,7,8,3, 6}, {4,7,2,5,9,6,8,3}, {4,7,5,2,6,8,3,9}, {5,6,2,4,7,9,8,3}, {5,6,4,2,9,8,3,7}, {4,9,2,5,6,7,8,3}, {4,9,5,2,7,8,3,6}, {5, 7,2,4,9,6,8,3}, {5,7,4,2,6,8,3,9}, {4,6,2,5,7,9,8,3}, {2,7,5,4, 6,3,9,8}, {2,7,4,5,3,9,8,6}, {4, 3,5,2,7,6,9,8}, {5,7,2,4,3,8, 6,9}, {2,3,4,5,7,9,8,6}, {2,3,5,4,9,8,6,7}, {2,3,4,5,8,6,7,9}, {4,8, 5,2,3,9,6,7}, {5,3,2,4,8,7,9,6}, {5,3,4,2,7,9,6,8}, {4,7, 2,5,3,8,9,6}, {4,7,5,2,8,9,6,3}, {5,8, 2,4,7,3,9,6}, {5,8,4,2, 3,9,6,7}, {4,3,2,5,8,7,9,6}, {4,3,5,2,7,9,6,8}, {5,7,2,4,3,8,9, 6}, {2,3,4, 5,7,6,8,9}, {4,7,5,2,3,9,6,8}, {5,3,2,4,7,8,9,6}, {5,3,4, 2,8,9,6,7}, {5,3,2,4,9,6,7,8}, {5,3,4, 2,6,7,8,9}, {4,6, 2,5,3,9,7,8}, {2,3,5,4,6,8,9,7}, {2,3,4,5,8,9,7,6}, {4,8,5,2,3, 6,9,7}, {4,8,2,5, 6,9,7,3}, {2,6,5,4,8,3,9,7}, {2,6,4,5,3,9,7, 8}, {4,3,5,2,6,8,9,7}, {5,6,2,4,3,7,8,9}, {2,3,4,5, 6,9,7,8}, {4,6,5,2,3,8,9,7}, {5,3,2,4,6,7,8,9}, {5,3,4,2,7,8,9,6}, {4,7, 2,5,3,6,8,9}, {4,7,5,2,6, 8,9,3}, {4,7,2,5,8,9,3,6}, {4,7,5,2, 9,3,6,8}, {5,9,2,4,7,8,3,6}, {5,9,4,2,8,3,6,7}, {4,8,2,5,9, 7,3, 6}, {2,9,5,4,8,6,7,3}, {5,8,4,2,9,3,6,7}, {5,8,2,4,3,6,7,9}, {5,8,4,2,6,7,9,3}, {4,6,2,5,8,3, 7,9}, {2,8,5,4,6,9,3,7}, {5,6, 4,2,8,7,9,3}, {4,8,2,5,6,3,7,9}, {4,8,5,2,3,7,9,6}, {5,3,2,4,8, 6, 7,9}, {5,3,4,2,6,7,9,8}, {5,3,2,4,7,9,8,6}, {5,3,4,2,9,8,6, 7}, {4,9,2,5,3,7,8,6}, {4,9,5,2,7,8,6, 3}, {5,7,2,4,9,3,8,6}, {2,9,4,5,7,6,3,8}, {4,7,5,2,9,8,6,3}, {5,9,2,4,7,3,8,6}, {2,7, 4,5,9,6,3, 8}, {2,7,5,4,6,3,8,9}, {5,6,4,2,7,9,3,8}, {5,6,2,4, 9,3,8,7}, {4,6,5,2,9,8,7,3}, {5,9,2,4,6,5,7,3,8}, {2,9,4,5,6,7,9,3,8}, {2,9,4,5,6,7,3,8}, {4,9,5,2,6,8,7,3}, {4,9,2,5,8,6,7,3}, {4,9,5,2,7,3,6,8}, {4,9,2,5,3,6,8,7}, {2,3,5,4,9,7,6,8}, {5,9, 4,2,3,8,7,6}, {4,3,2,5,9,6,8,7}, {4,3,5,2,6,8,7,9}, {5,6,2,4,3, 9,8,7}, {5,6,4,2,9,8,7,3}, {4,9,2,5,6,38,7}, {4,9,5,2,3,8,7,6}, {5,3,2,4,9,6,8,7}, {5,3,4,2,6,8,7,9}, {4,6,2,5,3,9,8,7}, {2,3, 5,4,6,7,9,8}, {5,6,4,2,3,8,7,9}, {4,3,2,5,6,9,8,7}, {2, 6,5,4, 3,7,9,8}, {2,6,4,5,7,9,8,3}, {4,7,5,2,6,3,9,8}, {4,7,2,5,3,9, 8}, {2,3,5,4,7,6,9,8}, {5, 7,4,2,3,8,6,9}, {5,7,2,4,8,6,9,3}, {5,7,4,2,6,9,3,8}, {4,6,2,5,7,8,9,3}, {4,6,5,2,8,9,3,7}, {5,8, 2,4,6,7,9,3}, {5,8,4,2,7,9,3,6}, {5,8,2,4,9,3,6,7}, {5,8,4,2,3, 6,7,9}, {4,3,2,5,8,9,6,7}, {4,3, 5,2,9,6,7,8}, {5,9,2,4,3,8,6, 7}, {5,9,4,2,8,6,7,3}, {5,9,2,4,6,7,3,8}, {5,9,4,2,7,3,8,6}, {4,7,2, 5,9,6,3,8}, {4,7,5,2,6,3,8,9}, {5,6,2,4,7,9,3,8}, {5,6, 4,2,9,3,8,7}, {5,6,2,4,3,8,7,9}, {2,3,4, 5,6,9,8,7}, {4,6,5,2, 3,7,9,8}, {5,3,2,4,6,8,7,9}, {5,3,4,2,8,7,9,6}, {5,3,2,4,7,9,6, 8}, {2,7,4,5, 3,8,9,6}, {2,7,5,4,8,9,6,3}, {5,8,4,2,7,3,9,6}, {4,7,2,5,8,6,3,9}, {2,8,4,5,7,9,6,3}, {4,9, 5,2,8,7,6,3}, {5,8,2,4,9,3,7,6}, {2,9,4,5,8,6,3,7}, {2,9,5,4,6, 3,7,8}, {5,7,4,2,9,3, 86}, {4,9,5,2,7,6,3,8}, {2,7,5,4,9,8,6,3}, {2,7,4,5,8, 6,3,9}, {4,8,5,2,7,9,6,3}, {5,7,2,4,8,3,9,6}, {2,8,4,5,7,6,3,9}, {2,8, 5,4,6,3,9,7}, {5,6,4,2,8,7, 3,9}, {5,6,2,4,7,3,9,8}, {5,6,4,2, 3,9,8,7}, {4,3,2,5,6,7,9,8}, {2,6,5,4,3,8,7,9}, {5,3,4,2,6,9, 8,7}, {5,3,2,4,9,8,7,6}, {5,3,4,2,8,7,6,9}, {4,8,2,5,3,9,7,6}, {4,8,5,2,9,7,6,3}, {5,9,2,4,8,3,7, 6}, {5,9,4,2,3,7,6,8}, {5,9, 2,4,7,6,8,3}, {5,9,4,2,6,8,3,7}, {4,6,2,5,9,7,8,3}, {4,6,5,2,7, 8,3, 9}, {5,7,2,4,6,9,8,3}, {5,7,2,4,8,3,6, 9}, {5,7,4,2,9,8,3,6, 9}, {5,7,4,2,3,6,9,8}, {4,3,2,5,7,8,6,9}, {4,3,5,2,8,6,9,7}, {5,8,2,4,3,7,6,9}, {5,8,4,2,7,6,9,3}, {5,8,2,4,6,9,3,7}, {2,6, 4,5,8,7,9,3}, {4,8,5,2,6,3,7,9}, {4,8,2,5,3,7,9,6}, {2,3,5,4,8, 6,7,9}, {2,3,4,5,6,7,9,8}, {4,6,5,2,3,8,7,9}, {5,3,2,4,6,9,8, 7}, {2,6,4,5,3,7,9,8}, {2,6,5,4,7,9,8,3}, {2,6,4,5,9,8,3,7}, {2,6,5,4,8,3,7,9}, {5,8,4,2,6,9,3,7}, {4,6,2,5,8,7,9,3}, {2,8, 5,4,6,3,7,9}, {2,8,4,5,3,7,9,6}, {4,3,5,2,8,6,7,9}, {5, 8,2,4, 3,9,6,7}, {5,8,4,2,9,6,7,3}, {4,9,2,5,8,3,6,7}, {2,8,5,4,9,7,3, 6}, {2,8,4,5,7,3,6,9}, {4, 7,5,2,8,9,3,6}, {5,8,2,4,7,6,9,3}, {2,7,4,5,8,3,6,9}, {2,7,5,4,3,6,9,8}, {5,3,4,2,7,8,6,9}, {5,3, 2,4,8,6,9,7}, {2,8,4,5,3,7,6,9}, {2,8,5,4,7,6,9,3}, {5,7,4,2,8, 3,6,9}, {4,8,2,5,7,9,3,6}, {2,7, 5,4,8,6,9,3}, {2,7,4,5,6,9,3, 8}, {4,6,5,2,7,8,9,3}, {4,6,2,5,8,9,3,7}, {4,6,5,2,9,3,7,8}, {5,9,2, 4,6,8,3,7}, {2,6,4,5,9,7,8,3}, {2,6,5,4,7,8,3,9}, {5,7, 4,2,6,9,8,3}, {5,7,2,4,9,8,3,6}, {2,9,4, 5,7,6,8,3}, {2,9,5,4, 6,8,3,7}, {5,6,4,2,9,7,8,3}, {5,6,2,4,7,8,3,9}, {2,7,4,5,6,9,8, 3}, {2,7,5,4, 9,8,3,6}, {5,9,4,2,7,6,8,3}, {4,7,2,5,9,3,6,8}, {4,7,5,2,3,6,8,9}, {4,7,2,5,6,8,9,3}, {2,6,5,4, 7,3,8,9}, {2,6, 4,5,3,8,9,7}, {4,3,5,2,6,7,8,9}, {5,6,2,4,3,9,7,8}, {2,3,4,5,6, 8,9,7}, {5,8,4,2,3, 6,9,7}, {5,8,2,4,6,9,7,3}, {5,8,4,2,6,9,7, 3}, {2,6,4,5,8,3,9,7}, {2,6,5,4,3,9,7,8}, {5,3,4,2,6, 8,9,7}, {4,6,2,5,3,7,8,9}, {2,3,5,4,6,9,7,8}, {2,3,4,5,9,7,8,6}, {4,9, 5,2,3,6,7,8}, {5,3,2,4,9,8, 6,7}, {5,3,4,2,8,6,7,9}, {4,8,2,5, 3,9,6,7}, {4,8,5,2,9,6,7,3}, {5,9,2,4,8,3,6,7}, {2,8,4,5,9,7, 3,6}, {4,9,5,2,8,6,7,3}, {4,9,2,5,6,7,3,8}, {2,6,5,4,9,8,7,3}, {5,9,4,2,6,3,8,7}, {4,6,2,5,9,7,3, 8}, {2,9,5,4,6,8,7,3}, {2,9, 4,5,8,7,3,6}, {2,9,5,4,7,3,6,8}, {2,9,4,5,3,6,8,7}, {4,3,5,2,9, 7,6, 8}, {5,9,2,4,3,8,7,6}, {2,3,4,5,9,6,8,7}, {2,3,5,4,6,8,7, 9}, {2,3,4,5,8,7,9,6}, {2,3,5,4,7,9,6, 8}, {5,7,4,2,3,8,9,6}, {4,3,2,5,7,6,8,9}, {2,7,5,4,3,9,6,8}, {2,7,4,5,9,6,8,3}, {2,7, 5,4,6,8,3,9}, {2,7,4,5,8,3,9,6}, {4,8,5,2,7,6,3,9}, {5,7,2,4,8, 9,6,3}, {5,7,4,2,9,6,3,8}, {5,7,2,4,6,3,8,9}, {2,6,4,5,7,9,3, 8}, {2,6,5,4,9,3,8,7}, {5,9,4,2,6,7,38}, {4,6,2,5,9,8,7,3}, {2,9,5,4,6,3,8,7}, {5,6,4,2,9,7,3,8}, {5,6,2,4,7,3,8,9}, {5,6, 4,2,3,8,9,7}, {4,3,2,5,6,7,8,9}, {4,3,5,2,7,8,9,6}, {5, 7,2,4, 3,6,8,9}, {5,7,4,2,6,8,9,3}, {5,7,2,4,8,9,3,6}, {5,7,4,2,9,3,6, 8}, {4,9,2,5,7,8,3,6}, {4, 9,5,2,8,3,6,7}, {5,8,2,4,9,7,3,6}, {5,8,4,2,7,3,6,9}, {5,8,2,4,3,6,9,7}, {5,8,4,2,6,9,7,3}, {4,6, 2,5,8,3,9,7}, {4,6,5,2,3,9,7,8}, {5,3,2,4,6,8,9,7}, {5,3,4,2,8, 9,7,6}, {5,3,2,4,7,9,6,8}, {2,9, 4,5,3,8,7,6}, {2,3,4,5,9,8,7,6}, {2,3,5,4,8,7,6,9}, {5,8,4, 2,3,9,7,6}, {5,8,2,4,9,7,6,3}, {2,9,4,5,8,3,7,6}, {2,9, 5,4,3,7,6,8}, {5,3,4,2,9,8,7,6}, {5,3,2, 4,8,7,6,9}, {2,8,4,5,3, 9,7,6}, {2,8,5,4,9,7,6,3}, {5,9,4,2,8,3,7,6}, {4,8,2,5,9,6,3, 7}, {2,9,5,4, 8,7,6,3}, {5,8,4,2,9,3,7,6}, {4,9,2,5,8,6,3,7}, {4,9,5,2,6,3,7,8}, {5,6,2,4,9,8,3,7}, {5,6,4,2, 8,3,7,9}, {5,6, 2,4,3,7,9,8}, {5,6,4,2,7,9,8,3}, {4,7,2,5,6,3,9,8}, {4,7,5,2,3, 9,8,6}, {5,3,2,4,7, 6,9,8}, {2,7,4,5,3,8,6,9}, {4,3,5,2,7,9,8, 6}, {5,7,2,4,3,6,9,8}, {2,3,4,5,7,8,6,9}, {2,3,5,4,8, 6,9,7}, {5,8,4,2,3,7,6,9}, {4,3,2,5,8,9,7,6}, {2,8,5,4,3,6,9,7}, {2,8, 4,5,6,9,7,3}, {4,6,5,2,8,3, 9,7}, vf}

List8:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {2,8,5,4,3,6,7, 9}, {2,8,4, 5,6,7,9,3}, {2,8,5,4,7,9,3,6}, {5,7,4,2,8,6,9,3}, {4,8,2,5,7,3,6,9}, {2,7,5,4,8,9,3,6}, {2,7,4,5,9,3,6,8}, {2,7, 5,4,3,6,8,9}, {2,7,4,5,6,8,9,3}, {4,6,5,2,7,3,8,9}, {5,7,2,4,6, 9,3,8}, {2,6,4,5,7,8,9,3}, {2,6,5,4,8,9,3,7}, {2,6,4,5,9,3,7, 8}, {2,6,5,4,3,7,8,9}, {5,3,4,2,6,9,7,8}, {4,6,2,5,3,8,9,7}, {2,3,5,4,6,8,9,7}, {2, 3,4,5,7,8,9,6}, {2,3,5,4,8,9,6,7}, {2,3, 4,5,9,6,7,8}, {4,9,5,2,3,8,6,7}, {5,3,2,4,9,7,8,6}, {2, 9,4,5, 3,6,7,8}, {2,9,5,4,6,7,8,3}, {2,9,4,5,7,8,3,6}, {2,9,5,4,8,3,6, 7}, {5,8,4,2,9,7,3,6}, {4,9, 2,5,8,6,7,3}, {2,8,5,4,9,3,6,7}, {2,8,4,5,3,6,7,9}, {2,8,5,4,6,7,9,3}, {2,8,4,5,7,9,3,6}, {4,7, 5,2,8,6,9,3}, {5,8,2,4,7,3,6,9}, {2,7,4,5,8,9,3,6}, {2,7,5,4,9, 3,6,8}, {2,7,4,5,3,6,8,9}, {2,7,5, 4,6,8,9,3}, {5,6,4,2,7,3,8, 9}, {4,7,2,5,6,9,3,8}, {2,6,5,4,7,8,9,3}, {2,6,4,5,8,9,3,7}, {2,6,5, 4,9,3,7,8}, {2,6,4,5,3,7,8,9}, {4,3,5,2,6,9,7,8}, {5,6, 2,4,3,8,9,7}, {5,6,4,2,8,9,7,3}, {4,8,2,5, 6,3,9,7}, {2,6,5,4, 8,7,3,9}, {2,6,4,5,7,3,9,8}, {2,6,5,4,3,9,8,7}, {2,6,4,5,9,8,7, 3}, {4,9,5,2, 6,3,8,7}, {5,6,2,4,9,7,3,8}, {2,9,4,5,6,8,7,3}, {2,9,5,4,8,7,3,6}, {2,9,4,5,7,3,6,8}, {2,9,5,4,3, 6,8,7}, {5,3, 4,2,9,7,6,8}, {4,9,2,5,3,8,7,6}, {2,3,5,4,9,6,8,7}, {2,3,4,5,6, 8,7,9}, {2,3,5,4,8, 7,9,6}, {2,3,4,5,7,9,6,8}, {4,7,5,2,3,8,9, 6}, {5,3,2,4,7,6,8,9}, {2,7,4,5,3,9,6,8}, {2,7,5,4,9,6, 8,3}, {2,7,4,5,6,8,3,9}, {2,7,5,4,8,3,9,6}, {5,8,4,2,7,6,3,9}, {4,7, 2,5,8,9,6,3}, {2,8,5,4,7,3, 9,6}, {2,8,4,5,3,9,6,7}, {2,8,5,4, 9,6,7,3}, {2,8,4,5,6,7,3,9}, {4,6,5,2,8,9,7,3}, {5,8,2,4,6,3,9, 7}, {2,6,4,5,8,7,3,9}, {2,6,5,4,7,3,9,8}, {2,6,4,5,3,9,8,7}, {4,3,5,2,6,7,9,8}, {4,3,2,5,7,9,8, 6}, {4,3,5,2,9,8,6,7}, {5,9, 2,4,3,7,8,6}, {5,9,4,2,7,8,6,3}, {4,7,2,5,9,3,8,6}, {2,9,5,4,7, 6,3,8}, {5,7,4,2,9,8,6,3}, {4,9,2,5,7,3,8,6}, {2,7,5,4,9,6,3, 8}, {2,7,4,5,6,3,8,9}, {4,6,5,2,7,9,3,8}, {4,6,2,5,9,3,8,7}, {2,9,5,4,6,7,3,8}, {2,9,4,5,7,3,8,6}, {4,7,5,2,9,6,3,8}, {4,7, 2,5,6,3,8,9}, {2,6,5,4,7,9,3,8}, {2,6,4,5,9,3,8,7}, {4,9,5,2,6, 7,3,8}, {5,6,2,4,9,8,7,3}, {2,9,4,5,6,3,8,7}, {2,9,5,4,3,8,7, 6}, {5,3,4,2,9,6,8,7}, {4,9,2,5,3,7,6,8}, {2,3,5,4,9,8,7,6}, {2,3,4,5,8,7,6,9}, {4, 8,5,2,3,9,7,6}, {4,8,2,5,9,7,6,3}, {2,9, 5,4,8,3,7,6}, {2,9,4,5,3,7,6,8}, {4,3,5,2,9,8,7,16}, {4, 3,2,5, 8,7,6,9}, {2,8,5,4,3,9,7,6}, {2,8,4,5,9,7,6,3}, {4,9,5,2,8,3,7, 6}, {5,8,2,4,9,6,3,7}, {2,9, 4,5,8,7,6,3}, {4,8,5,2,9,3,7,6}, {5,9,2,4,8,6,3,7}, {5,9,4,2,6,3,7,8}, {4,6,2,5,9,8,3,7}, {4,6, 5,2,8,3,7,9}, {4,6,2,5,3,7,9,8}, {4,6,5,2,7,9,8,3}, {5,7,2,4,6, 3,9,8}, {5,7,4,2,3,9,8,6}, {5,7,2, 4,9,8,6,3}, {5,7,4,2,8,6,3, 9}, {4,8,2,5,7,9,6,3}, {4,8,5,2,9,6,3,7}, {5,9,2,4,8,7,6,3}, {2,8,4, 5,9,3,7,6}, {4,9,5,2,8,6,3,7}, {4,9,2,5,6,3,7,8}, {2,6, 5,4,9,8,3,7}, {2,6,4,5,8,3,7,9}, {4,8,5,2, 6,9,3,7}, {4,8,2,5, 9,3,7,6}, {2,9,5,4,8,6,3,7}, {2,9,4,5,6,3,7,8}, {4,6,5,2,9,8,3, 7}, {4,6,2,5, 8,3,7,9}, {2,8,5,4,6,9,3,7}, {5,6,4,2,8,7,9,3}, {4,8,2,5,6,3,7,9}, {4,8,5,2,3,7,9,6}, {5,3,2,4,8, 6,7,9}, {5,3, 4,2,6,7,9,8}, {5,3,2,4,7,9,8,6}, {5,3,4,2,9,8,6,7}, {4,9,2,5,3, 7,8,6}, {4,9,5,2,7, 8,6,3}, {5,7,2,4,9,3,8,6}, {2,9,4,5,7,6,3, 8}, {4,7,5,2,9,8,6,3}, {5,9,2,4,7,3,8,6}, {2,7,4,5,9,6, 3,8}, {2,7,5,4,6,3,8,9}, {5,6,4,2,7,9,3,8}, {5,6,2,4,9,3,8,7}, {2,9, 4,5,6,7,3,8}, {4,6,5,2,9, 7,3}, {4,6,2,5,8,7,3,9}, {4,6,5,2, 7,3,9,8}, {5,7,4,2,6,8,3,9}, {5,7,4,2,9,8,3,9,6}, {4,8,2,5,7,6,3, 9}, {4,8,5,2,6,3,9,7}, {4,8,2,5,3,9,7,6}, {4,8,5,2,9,7,6,3}, {5,9,2,4,8,3,7,6}, {5,9,4,2,3,7,6, 8}, {5,9,2,4,7,6,8,3}, {5,9, 4,2,6,8,3,7}, {4,6,2,5,9,7,8,3}, {4,6,5,2,7,8,3,9}, {5,7,2,4,6, 9,8,3}, {5,7,4,2,9,8,3,6}, {5,7,2,4,8,3,6,9}, {5,7,4,2,2,3,6,9, 8}, {4,3,2,5,7,8,6,9}, {4,3,5,2,8,6,9,7}, {5,8,2,4,3,7,6,9}, {5,8,4,2,7,6,9,3}, {5,8,2,4,6,9,3,7}, {2,6,4,5,8,7,9,3}, {4,8, 5,2,6,3,7,9}, {4,8,2,5,3,7,9,6}, {2,3,5,4,8,6,7,9}, {2,3,4,5,6, 7,9,8}, {4,6,5,2,3,8,7,9}, {4,6,2,5,8,7,9,3}, {2,8,5,4,6,3,7, 9}, {2,8,4,5,3,7,9,6}, {4,3,5,2,8,6,7,9}, {5,8,2,4,3,9,6,7}, {5,8,4,2,9,6,7,3}, {4, 9,2,5,8,3,6,7}, {2,8,5,4,9,7,3,6}, {2,8, 4,5,7,3,6,9,1}, {4,7,5,2,8,9,3,6}, {5,8,2,4,7,6,9,3}, {2, 7,4, 5,8,3,6,9}, {2,7,5,4,3,6,9,8}, {5,3,4,2,7,8,6,9}, {5,3,2,4,8,6, 9,7}, {2,8,4,5,3,7,6,9}, {2,8, 5,4,7,6,9,3}, {5,7,4,2,8,3,6,9}, {5,7,2,4,3,6,9,8}, {2,3,4,5,7,8,6,9}, {2,3,5,4,8,6,7,9}, {5,8, 4,2,3,7,6,9}, {4,3,2,5,8,9,7,6}, {2,8,5,4,3,6,9,7}, {2,8,4,5,6, 9,7,3}, {4,6,5,2,8,3,9,7}, {5,8,2, 4,6,7,3,9}, {5,8,4,2,7,3,9, 6}, {4,7,2,5,8,6,3,9}, {2,8,5,4,7,9,6,3}, {2,8,4,5,9,6,3,7}, {4,9,5, 2,8,7,6,3}, {4,9,2,5,7,6,3,8}, {2,7,5,4,9,8,6,3}, {2,7, 4,5,8,6,3,9}, {4,8,5,2,7,9,6,3}, {5,7,2,4, 8,3,9,6}, {2,8,4,5, 7,6,3,9}, {2,8,4,5,2,8,3,9,7}, {5,6,4,2,8,3,7,9,3}, {5,6,2,4,7,3,9, 8}, {5,6,4,2, 3,9,8,7}, {4,3,2,5,6,7,9,8}, {2,6,5,4,3,8,7,9}, {5,3,4,2,6,9,8,7}, {5,3,2,4,9,8,7,6}, {5,3,4,2,8, 7,6,9}, {5,3, 2,4,7,6,9,8}, {2,7,4,5,3,8,6,9}, {4,3,5,2,7,9,8,6}, {4,3,2,5,9, 8,6,7}, {2,9,5,4,3, 7,8,6}, {2,9,4,5,7,8,6,3}, {4,7,5,2,9,3,8, 6}, {4,7,2,5,3,8,6,9}, {2,3,5,4,7,9,8,6}, {2,3,4,5,9,8, 6,7}, {4,9,5,2,3,7,8,6}, {4,9,2,5,7,8,6,3}, {2,7,5,4,9,3,8,6}, {5,9, 4,2,7,6,8,3}, {5,9,2,4,6,5,9,7,3,8}, {4,9,5,2, 6,8,7,3}, {4,9,2,5,8,7,3,6}, {4,9,5,2,7,3,6,8}, {4,9,2,5,3,6,8, 7}, {2,3,5,4,9,7,6,8}, {5,9,4,2,3,8,7,6}, {4,3,2,5,9,6,8,7}, {4,3,5,2,6,8,7,9}, {5,6,2,4,3,9,8, 7}, {5,6,4,2,9,8,7,3}, {5,6, 2,4,8,7,3,9}, {5,6,4,2,7,3,9,8}, {4,7,2,5,6,8,3,9}, {4,7,5,2,8, 3,9,6}, {5,8,2,4,7,6,3,9}, {2,7,4,5,8,9,6,3}, {4,8,5,2,7,3,9, 6}, {5,7,2,4,8,6,3,9}, {5,7,4,2,6,3,9,8}, {5,7,2,4,3,9,8,6}, {2,3,4,5,7,6,9,8}, {4,7,5,2,3,8,6,9}, {4,7,2,5,8,6,9,3}, {2,8, 5,4,7,3,6,9}, {5,7,4,2,8,9,3,6}, {4,8,2,5,7,6,9,3}, {2,7,5,4,8, 3,6,9}, {2,7,4,5,3,6,9,8}, {4,3,5,2,7,8,6,9}, {4,3,2,5,8,6,9, 7}, {2,8,5,4,3,7,6,9}, {2,8,4,5,7,6,9,3}, {4,7,5,2,8,3,6,9}, {4,7,2,5,3,6,9,8}, {2,3,5,4,7,8,6,9}, {2,3,4,5,8,6,9,7}, {4,8, 5,2,3,7,6,9}, {5,3,2,4,8,9,7,6}, {2,8,4,5,3,6,9,7}, {2, 8,5,4, 6,9,7,3}, {5,6,4,2,8,3,9,7}, {4,8,2,5,6,7,3,9}, {2,6,5,4,8,9,7, 3}, {5,8,4,2,6,3,9,7}, {5,8, 2,4,3,9,7,6}, {5,8,4,2,9,7,6,3}, {4,9,2,5,8,3,7,6}, {4,9,5,2,3,7,6,8}, {4,9,2,5,7,6,8,3}, {4,9, 5,2,6,8,3,7}, {5,6,2,4,9,7,8,3}, {5,6,4,2,7,8,3,9}, {4,7,2,5,6, 9,8,3}, {4,7,5,2,9,8,3,6}, {4,7,2, 5,8,3,6,9}, {5,3,2,4,7,8,6,9}, {5,3,4,2,8,6,9,7}, {4,8,2,5,3,7,6,9}, {4,8,5, 2,7,6,9,3}, {2,6,5,4,7,9,8,3}, {4,8,5,2,7,9,6,3}, {2,6,5,4,8,9,7,3}, {5,8, 4,2,6,9,3,7}, {5,8,2,4,3,7,9,6}, {5,8,4,2, 7,9,6,3}, {4,7,2,5, 8,3,9,6}, {2,8,5,4,7,6,3,9}, {5,7,4,2,8,9,6,3}, {4,8,2,5,7,3,9, 6}, {2,7,5,4, 8,6,3,9}, {2,7,4,5,6,3,9,8}, {2,7,5,4,3,9,8,6}, {5,3,4,2,7,6,9,8}, {5,3,2,4,6,9,8,7}, {2,6,4,5,3, 7,9,8}, {2,6, 5,4,7,9,8,3}, {2,6,4,5,9,8,3,7}, {2,6,5,4,8,3,7,9}, {5,8,4,2,6, 9,3,7}, {5,8,2,4,9, 3,7,6}, {2,9,4,5,8,6,3,7}, {2,9,5,4,6,3,7, 8}, {2,9,4,5,3,7,8,6}, {2,9,5,4,7,8,6,3}, {5,7,4,2,9,3, 8,6}, {5,7,2,4,3,8,6,9}, {2,3,4,5,7,9,8,6}, {2,3,5,4,9,8,6,7}, {2,3, 4,5,8,6,7,9}, {4,8,5,2,3,9, 6,7}, {5,3,2,4,8,7,9,6}, {5,3,4,2, 7,9,6,8}, {4,7,2,5,3,8,9,6}, {4,7,5,2,8,9,6,3}, {5,8,2,4,7,3,9, 6}, {5,8,4,2,3,9,6,7}, {4,3,2,5,8,7,9,6}, {4,3,5,2,7,9,6,8}, {5,7,2,4,3,8,9,6}, {2,3,4,5,7,6,8, 9}, {4,7,5,2,3,9,6,8}, {5,3, 2,4,7,8,9,6}, {5,3,4,2,8,9,6,7}, {5,3,2,4,9,6,7,8}, {5,3,4,2,6, 7,8,9}, {4,6,2,5,3,9,7,8}, {2,3,5,4,6,8,9,7}, {2,3,4,5,8,9,7, 6}, {4,8,5,2,3,6,9,7}, {4,8,2,5,6,9,7,3}, {2,6,5,4,8,3,9,7}, {2,6,4,5,3,9,7,8}, {4,3,5,2,6,8,9,7}, {5,6,2,4,3,7,8,9}, {2,3, 4,5,6,9,7,8}, {4,6,5,2,3,8,9,7}, {5,3,2,4,6,7,8,9}, {5,3,4,2,7, 8,9,6}, {5,3,4,2,6, 7,8,9}, {4,7,2,5,3,6,8,9}, {4,7,5,2,6,8,9,3}, {4,7,2,5,8,9,3, 6}, {4,7,5,2,9,3,6,8}, {5,9,2,4,7,8,3,6}, {5,9,4,2,8,3,6,7}, {4,8,2,5,9,3,6,7}, {2, 9,5,4,8,6,7,3}, {5,8,4,2,9,3,6,7}, {5,8, 2,4,3,6,7,9}, {5,8,4,2,6,7,9,3}, {5,8,2,4,7,9,3,6}, {2, 7,4,5, 8,6,9,3}, {4,8,5,2,7,3,6,9}, {4,8,2,5,3,6,9,7}, {4,8,5,2,6,9,7, 3}, {5,6,2,4,8,3,9,7}, {5,6, 4,2,3,9,7,8}, {4,3,2,5,6,8,9,7}, {4,3,5,2,8,9,7,6}, {4,3,5,2,7,6,8,9}, {5,7, 2,4,3,9,6,8}, {5,7,4,2,9,6,8,3}, {4,9,2,5,7,3,6,8}, {4,9,5,2,3, 6,8,7}, {4,9,2,5,6,8,7,3}, {4,9,5, 2,8,7,3,6}, {5,8,2,4,9,6,7, 3}, {5,8,4,2,6,7,3,9}, {4,6,2,5,8,9,7,3}, {4,6,5,2,9,7,3,8}, {4,6,2, 5,7,3,8,9}, {2,7,5,4,6,9,3,8}, {5,6,4,2,7,8,9,3}, {5,6, 4,2,9,3,7,8}, {4,9,2,5, 6,8,3,7}, {2,6,5,4,9,7,8,3}, {2,6,4,5, 7,8,3,9}, {4,7,5,2,6,9,8,3}, {4,7,2,5,9,8,3,6}, {2,9,5,4, 7,6, 8,3}, {2,9,4,5,6,8,3,7}, {4,6,5,2,9,7,8,3}, {4,6,2,5,7,8,3,9}, {2,7,5,4,6,9,8,3}, {2,7,4,5,9, 8,3,6}, {4,9,5,2,7,6,8,3}, {5,7, 2,4,9,3,6,8}, {5,7,4,2,3,6,8,9}, {5,7,2,4,6,8,9,3}, {2,6,4,5,7, 3,8,9}, {4,7,5,2,6,9,8,3}, {4,7,2,5,9,8,3,6}, {5,6,2,4,7,8,9,3}, {5,6,4,2,8,9,3,7}, {4,8,2,5,9,3,6,7}, {5,3,2,4,8,9,6,7}, {5,3,4,2,9,6,7,8}, {4,9, 2,5,3,8, 6,7}, {2,3,5,4,9,7,8,6}, {5,9,4,2,3,6,7,8}, {5,9,2,4, 6,7,8,3}, {5,9,4,2,7,8,3,6}, {4,7,2,5,9,6,8, 3}, {4,7,5,2,6,8, 3,9}, {5,6,2,4,7,9,8,3}, {5,6,4,2,9,8,3,7}, {5,6,2,4,8,3,7,9}, {2,8,4,5,6,9,3, 7}, {4,6,5,2,8,7,9,3}, {5,8,2,4,6,3,7,9}, {5,8, 4,2,3,7,9,6}, {4,3,2,5,8,6,7,9}, {2,8,5,4,3,9,6,7}, {2,8,4,5,9, 6,7,3}, {4,7,5,2,8,6,3, 9}, {5,8,2,4,7,9,6,3}, {5,8,4,2,9,6,3,7}, {4,9,2,5,8,7,6,3}, {2,8,5,4,9,3,7,6}, {5,9,4,2,8,6,3,7}, {5,9,2,4,6,3,7,8}, {5,9,4,2,3,7,8,6}, {5,9,2,4,7,8,6,3}, {2,7,4,5,9,3,8,6}, {4,9,5,2,7,6,3,8}, {4,9,2,5,6,3,8,7}, {4,9,5,2,3,8,7,6}, {5,3,2,4,9,6,8,7}, {5,3,4,2,6,8,7,9}, {4,6,2,5,3,9,8,7}, {2,3,5,4,6,7,9,8}, {5,6,4,2,3,8,7,9}, {5,6,2,4,8,7,9,3}, {2,8,4,5,6,3,7,9}, {2,8,5,4,3,7,9,6}, {2,8,4,5,7,9,6,3}, {2,8,5,4,9,6,3,7}, {5,9,4,2,8,7,6,3}, {5,9,2,4,7,6,3,8}, {2,7,4,5,9,8,6,3}, {4,9,5,2,7,3,8,6}, {5,7,2,4,9,6,3,8}, {5,7,4,2,6,3,8,9}, {4,6,2,5,7,9,3,8}, {4,6,5,2,9,3,8,7}, {4,6,2,5,3,8,7,9}, {2,3,5,4,6,9,8,7}, {5,6,4,2,3,7,9,8}, {4,3,2,5,6,8,7,9}, {4,3,5,2,8,7,9,6}, {4,3,2,5,7,9,6,8}, {2,7,5,4,3,8,9,6}, {5,3,4,2,7,6,8,9}, {4,7,2,5,3,9,6,8}, {4,7,5,2,9,6,8,3}, {5,9,2,4,7,3,6,8}, {5,9,4,2,3,6,8,7}, {5,9,2,4,6,8,7,3}, {5,9,4,2,8,7,3,6}, {4,8,2,5,9,6,7,3}, {4,8,5,2,6,7,3,9}, {5,6,2,4,8,9,7,3}, {2,8,4,5,6,3,9,7}, {4,6,5,2,8,7,3,9}, {4,6,2,5,7,3,9,8}, {4,6,5,2,3,9,8,7}, {5,3,2,4,6,7,9,8}, {2,6,4,5,3,8,7,9}, {4,3,5,2,6,9,8,7}, {4,3,2,5,9,8,7,6}, {4,3,5,2,8,7,6,9}, {4,3,2,5,7,6,9,8}, {2,7,5,4,3,8,6,9}, {5,3,4,2,7,9,8,6}, {5,3,2,4,9,8,6,7}, {5,3,4,2,8,6,7,9}, {4,8,2,5,3,9,6,7}, {4,8,5,2,9,6,7,3}, {5,9,2,4,8,3,6,7}, {2,8,4,5,9,7,3,6}, {4,9,5,2,8,6,7,3}, {4,9,2,5,6,7,3,8}, {2,6,5,4,9,8,7,3}, {5,9,4,2,6,3,8,7}, {4,6,2,5,9,7,3,8}, {2,9,5,4,6,8,7,3}, {2,9,4,5,8,7,3,6}, {2,9,5,4,7,3,6,8}, {2,9,4,5,3,6,8,7}, {4,3,5,2,9,7,6,8}, {5,9,2,4,3,8,7,6}, {2,3,4,5,9,6,8,7}, {2,3,5,4,6,8,7,9}, {5,7,4,2,3,8,9,6}, {2,3,4,5,7,9,6,8}, {5,7,4,2,7,9,8,9,6}, {4,3,2,5,7,6,8,9}, {2,7,5,4,3,9,6,8}, {2,7,4,5,9,6,8,3}, {2,7,5,4,6,8,3,9}, {2,7,4,5,8,3,9,6}, {4,8,5,2,7,6,3,9}, {5,7,2,4,8,9,6,3}, {5,7,4,2,9,6,3,8}, {5,7,2,4,6,3,8,9}, {2,6,4,5,7,9,3,8}, {2,6,5,4,9,3,8,7}, {5,9,4,2,6,7,3,8}, {4,6,2,5,9,8,7,3}, {2,9,5,4,6,8,3,7}, {5,6,4,2,9,7,3,8}, {5,6,2,4,7,3,8,9}, {5,6,4,2,3,8,9,7}, {4,3,2,5,6,7,8,9}, {4,3,5,2,7,8,9,6}, {5,7,2,4,3,6,8,9}, {5,7,4,2,6,8,9,3}, {5,7,2,4,8,9,3,6}, {5,7,4,2,9,3,6,8}, {4,9,2,5,7,8,3,6}, {4,9,5,2,8,3,6,7}, {5,8,2,4,9,7,36}, {5,8,4,2,7,3,6,9}, {5,8,2,4,3,6,9,7}, {5,8,4,2,6,9,7,3}, {4,6,2,5,8,3,9,7}, {4,6,5,2,3,9,7,8}, {5,3,2,4,6,8,9,7}, {5,3,4,2,8,9,7}, {5,3,2,4,9,76,8}, {2,9,4,5,3,8,7,6}, {4,3,5,2,9,6,8,7}, {5,9,2,4,3,7,6,8}, {2,3,4,5,9,8,7,6}, {2,3,5,4,8,7,6,9}, {5,8,4,2,3,9,7,6}, {5,8,2,4,9,7,6,3}, {2,9,4,5,8,3,7,6}, {2,9,5,4,3,7,6,8}, {5,3,4,2,9,8,7,6}, {5,3,2,4,8,7,6,9}, {2,8,4,5,3,9,7,6}, {4,8,2,5,9,6,3,7}, {2,9,5,4,8,7,6,3}, {5,8,4,2,9,3,7,6}, {4,9,2, 5,8,6,3,7}, {4,9,5,2,6,3,7,8}, {5,6,2,4,9,8,3,7}, {5,6,4,2,8,3,7,9}, {5,6,2,4,3,7,9,8}, {5,6,4,2, 7,9,8,3}, {4,7,2,5,6,3,9,8}, {4,7,5,2,3,9,8,6}, {4,7,2,5,9,8,6,3}, {2,9,5,4,7,3,8,6}, {2,9,4,5, 3,8,6,7}, {4,3,5,2,4,3,6,7,8}, {5,9,4,2,6,7,8,3}, {4,6, 2,5,9,3,7,8}, {4,6,5,2,3, 7,8,9}, {5,3,2,4,6,9,7,8}, {5,3,4,2, 9,7,8,6}, {4,9,2,5,3,6,7,8}, {4,9,5,2,6,7,8,3}, {5,6,2,4,9, 3,7, 8}, {5,6,4,2,3,7,8,9}, {4,3,2,5,6,9,7,8}, {2,6,5,4,3,8,9,7}, {2,6,4,5,8,9,7,3}, {2,6,5,4,9,7, 3,8}, {5,9,4,2,6,8,7,3}, {5,9, 2,4,8,7,3,6}, {5,9,4,2,7,3,6,8}, {5,9,2,4,3,6,8,7}, {2,3,4,5,9, 7, 6,8}, {2,3,5,4,7,6,8,9}, {5,7,4,2,3,9,6,8}, {4,3,2,5,7,8,9, 6}, {4,3,5,2,8,9,6,7}, {4,3,2,5,9,6,7, 8}, {2,9,5,4,3,8,6,7}, {2,9,4,5,8,6,7,3}, {4,8,2,5,9,3,6,7}, {4,8,2,5,3,6,7,9}, {4,8, 5,2,6,7,9, 3}, {4,8,2,5,7,9,3,6}, {2,7,5,4,8,6,9,3}, {2,7,4,5, 6,9,3,8}, {4,6,5,2,7,8,9,3}, {4,6,2,5,8,9,3,7}, {4,6,5,2,9,3,7, 8}, {5,9,2,4,6,8,3,7}, {2,6,4,5,9,7,8,3}, {2,6,5,4,7,8,3,9}, {5,7,4,2,6,9,8,3}, {5,7,2,4,9,8,3,6}, {2,9,4,5,7,6,8,3}, {2,9, 5,4,6,8,3,7}, {5,6,4,2,9,7,8,3}, {5,6,2,4,7,8,3,9}, {2,7,4,5,6, 9,8,3}, {2,7,5,4,9,8,3,6}, {5,9,4,2,7,6,8,3}, {4,7,2,5,9,3,6, 8}, {4,4,7,5,2,3,6,8,9}, {4,7,2,5,6,8,9,3}, {2,6,5,4,7,3,8,9}, {2,6,4,5,3,8,9,7}, {4,3,5,2,6,7,8,9}, {5,6,2,4,3,9,7,8}, {2, 3,4,5,6,8,9,7}, {2,3,5,4,8,9,7,6}, {5,8,4,2,3,6,9,7}, {5,8,2,4, 6,9,7,3}, {2,6,4,5,8,3,9,7}, {2, 6,5,4,3,9,7,8}, {5,3,4,2,6,8, 9,7}, {4,6,2,5,3,7,8,9}, {2,3,5,4,6,9,7,8}, {2,3,4,5,9,7,8,6}, {4,9, 5,2,3,6,7,8}, {4,9,2,5,7,8,3,6}, {4,9,5,2,7,8,3,6}, {5,7, 2,4,9,6,8,3}, {5,7,4,2,6,8,3,9}, {4,6, 2,5,7,9,8,3}, {2,7,5,4, 6,3,9,8}, {2,7,4,5,3,9,9,8,6}, {4,3,5,2,7,6,9,8}, {4,3,2,5,6,98, 7}, {2,6,5, 4,3,7,9,8}, {2,6,4,5,7,9,8,3}, {4,7,5,2,6,3,9,8}, {4,7,2,5,3,9,8,6}, {2,3,5,4,7,6,9,8}, {5,7,4, 2,3,8,6,9}, {5,7, 2,4,8,6,9,3}, {5,7,4,2,6,9,3,8}, {4,6,2,5,7,8,9,3}, {4,6,5,2,8, 9,3,7}, {5,8,2,4, 6,7,9,3}, {5,8,4,2,7,9,3,6}, {5,8,2,4,9,3,6, 7}, {5,8,4,2,3,6,7,9}, {4,3,2,5,8,9,6,7}, {4,3,5,2, 9,6,7,8}, {5,9,2,4,3,8,6,7}, {5,9,4,2,8,6,7,3}, {5,9,2,4,6,7,3,8}, {5,9, 4,2,7,3,8,6}, {4,7,2,5,9, 6,3,8}, {4,7,5,2,6,3,8,9}, {5,6,2,4, 7,9,3,8}, {5,6,4,2,9,3,8,7}, {5,6,2,4,3,8,7,9}, {2,3,4,5,6, 9,8, 7}, {4,6,5,2,3,7,9,8}, {5,3,2,4,6,8,7,9}, {5,3,4,2,8,7,9,6}, {5,3,2,4,7,9,6,8}, {2,7,4,5,3,8, 9,6}, vf}

List9:
{vi, {2,3,5,4,7,8,9,6}, {2,3,4,5,8,9,6,7}, {2,3,5,4,9,6,7,8}, {5,9,4,2,3,8,6,7}, {4,3,2,5,9,7,8, 6}, {2,9,5,4,3,6,7,8}, {2,9, 4,5,6,7,8,3}, {2,9,5,4,7,8,3,6}, {2,9,4,5,8,3,6,7}, {4,8,5,2,9, 7,3,6}, {5,9,2,4,8,6,7,3}, {2,8,4,5,9,3,6,7}, {2,8,5,4,3,6,7, 9}, {2,8,4,5,6,7,9,3}, {2,8,5,4,7,9,3,6}, {5,7,4,2,8,6,9,3}, {4,8,2,5,7,3,6,9}, {2,7,5,4,8,9,3,6}, {2,7,4,5,9,3,6,8}, {2,7, 5,4,3,6,8,9}, {2,7,4,5,6,8,9,3}, {4,6,5,2,7,3,8,9}, {5,7,2,4,6, 9,3,8}, {2,6,4,5,7,8,9,3}, {2,6,5,4,8,9,3,7}, {2,6,4,5,9,3,7, 8}, {2, 6,5,4,3,7,8,9}, {5,3,4,2,6,9,7,8}, {4,6,2,5,3,8,9,7}, {2,3,5,4,6,7,8,9}, {2, 3,4,5,7,8,9,6}, {2,3,5,4,8,9,6,7}, {2,3, 4,5,9,6,7,8}, {4,9,5,2,3,8,6,7}, {5,3,2,4,9,7,8,6}, {2, 9,4,5, 3,6,7,8}, {2,9,5,4,6,7,8,3}, {2,9,4,5,7,8,3,6}, {2,9,5,4,8,3,6, 7}, {5,8,4,2,9,7,3,6}, {4,9, 2,5,8,6,7,3}, {2,8,5,4,9,3,6,7}, {2,8,4,5,3,6,7,9}, {2,8,5,4,6,7,9,3}, {2,8,4,5,7,9,3,6}, {4,7, 5,2,8,6,9,3}, {5,8,2,4,7,3,6,9}, {2,7,4,5,8,9,3,6}, {2,7,5,4,9, 3,6,8}, {2,7,4,5,3,6,8,9}, {2,7,5, 4,6,8,9,3}, {5,6,4,2,7,3,8, 9}, {4,7,2,5,6,9,3,8}, {2,6,5,4,7,8,9,3}, {2,6,4,5,8,9,3,7}, {2,6,5, 4,9,3,7,8}, {4,3,5,2,6,9,7,8}, {5,6,2,4,3,8,9,7}, {5,6, 2,4,3,8,9,7}, {4,8,2,5, 6,3,9,7}, {2,6,5,4, 8,7,3,9}, {2,6,4,5,7,3,9,8}, {2,6,5,4,3,9,8,7}, {2,6,4,5,9,8,7, 3}, {4,9,5,2, 6,3,8,7}, {5,6,2,4,9,7,3,8}, {2,9,4,5,6,8,7,3}, {2,9,5,4,8,7,3,6}, {2,9,4,5,7,3,6,8}, {2,9,5,4,3, 6,8,7}, {5,3, 4,2,9,7,6,8}, {4,9,2,5,3,8,7,6}, {2,3,5,4,9,6,8,7}, {2,3,4,5,6, 8,7,9}, {2,3,5,4,8, 7,9,6}, {2,3,4,5,7,9,6,8}, {4,7,5,2,3,8,9, 6}, {5,3,2,4,7,6,8,9}, {2,7,4,5,3,9,6,8}, {2,7,5,4,9,6, 8,3}, {2,7,4,5,6,8,3,9}, {2,7,5,4,8,3,9,6}, {5,8,4,2,7,6,3,9}, {4,7, 2,5,8,9,6,3}, {2,8,5,4,7,3, 9,6}, {2,8,4,5,3,9,6,7}, {2,8,5,4, 9,6,7,3}, {2,8,4,5,6,7,3,9}, {4,6,5,2,8,9,7,3}, {5,8,2,4,6,3,9, 7}, {2,6,4,5,8,7,3,9}, {2,6,5,4,7,3,9,8}, {2,6,4,5,3,9,8,7}, {4,3,5,2,6,7,9,8}, {4,3,2,5,7,9,8, 6}, {4,3,5,2,9,8,6,7}, {5,9, 2,4,3,7,8,6}, {5,9,4,2,7,8,6,3}, {4,7,2,5,9,3,8,6}, {2,9,5,4,7, 6,3,8}, {5,7, 4,2,9,8,6,3}, {4,9,2,5,7,3,8,6}, {2,7,5,4,9,6,3,8}, {9}, {4,6,5,2,7,9,3,8}, {4,6,2,5,9,3,8,7}, {2,9,5,4,6,7,3,8}, {2,9,4,5,7,3,8,6}, {4,7,5,2,9,6,3,8}, {4,7,2,5,6,3,8,9}, {2,6, 5,4,7,9,3,8}, {2,6,4,5,9,3,8,7}, {4,9,5,2,6,7,3,8}, {5,6,2,4,9, 8,7,3}, {2,9,4,5,6,3,8,7}, {2,9,5,4,3,8,7,6}, {5,3,4,2,9,6,8, 7}, {4,9,2,5,3,7,6,8}, {2,3,5,4,9,8,7,6}, {2,3,4,5,8,7,6,9}, {4, 8,5,2,3,9,7,6}, {4,8,2,5,9,7,6,3}, {2,9,5,4,8,3,7,6}, {2,9, 4,5,3,7,6,8}, {4,3,5,2,9,8,7,6}, {4, 3,2,5,8,7,6,9}, {2,8,5,4, 3,9,7,6}, {2,8,4,5,9,7,6,3}, {4,9,5,2,8,3,7,6}, {5,8,2,4,9,6,3, 7}, {2,9, 4,5,8,7,6,3}, {4,8,5,2,9,3,7,6}, {5,9,2,4,8,6,3,7}, {5,9,4,2,6,9,7,8}, {4,6,2,5,9,8,3,7}, {4,6, 5,2,8,3,7,9}, {5,8, 2,4,6,9,3,7}, {2,6,4,5,8,7,9,3}, {4,8,5,2,6,3,7,9}, {4,8,2,5,3, 7,9,6}, {2,3,5, 4,8,6,7,9}, {2,3,4,5,6,7,9,8}, {4,6,5,2,3,8,7, 9}, {4,6,2,5,8,7,9,3}, {2,8,5,4,6,3,7,9}, {2,8,4, 5,3,7,9,6}, {4,3,5,2,8,6,7,9}, {5,8,2,4,3,9,6,7}, {5,8,4,2,9,6,7,3}, {4,9, 2,5,8,3,6,7}, {2,8,5,4, 9,7,3,6}, {5,9,4,2,8,6,7,3}, {5,9,2,4, 6,7,3,8}, {5,9,4,2,7,3,8,6}, {4,7,2,5,9,6,3,8}, {4,7,5,2, 6,3, 8,9}, {5,6,2,4,7,9,3,8}, {5,6,4,2,9,3,8,7}, {5,6,2,4,3,8,7,9}, {2,3,4,5,6,9,8,7}, {4,6,5,2,3, 7,9,8}, {5,3,2,4,6,8,7,9}, {5,3, 4,2,8,7,9,6}, {5,3,2,4,7,9,6,8}, {2,7,4,5,3,8,9,6}, {2,7,5,4,8, 9,6,3}, {2,7,4,5,6,3,8,9}, {5,6,4,2,7,9,3,8}, {5,6,2,4,9,3,8,7}, {2,9,4,5,6,7, 3,8}, {4,6,5,2,9,8,7,3}, {5,7,2,4,6,8,3,9}, {5,7, 4,2,8,3, 9,6}, {4,8,2,5,7,6,3,9}, {4,8,5,2,6,3,9,7}, {4,8,2,5, 3,9,7,6}, {4,8,5,2,9,7,6,3}, {5,9,2,4,8,3,7, 6}, {5,9,4,2,3,7, 6,8}, {4,3,2,5,9,8,7,6}, {4,3,5,2,8,7,6,9}, {4,3,2,5,7,6,9,8}, {2,7,5,4,3,8,6, 9}, {5,3,4,2,7,9,8,6}, {4,7,2,5,3,6,9,8}, {2,3,5,4,7,8,6,9}, {2,3,4,5,8,6,9,7}, {4,8,5,2,3,7,6,9}, {5,3,2,4,8,9,7,6}, {2,8,4,5,3,6,9,7}, {2,8,5,4,6,9,7,3}, {5,6,4,2,8,3,9,7}, {4,8,2,5,6,7,3,9}, {2,6,5,4,8,9,7,3}, {5,8,4,2,6,3,9,7}, {5,8,2,4,3,9,7,6}, {5,8,4,2,9,7,6,3}, {4,9,2,5,8,3,7,6}, {4,9,5,2,3,7,6,8}, {5,3,2,4,9,8,7,6}, {5,3,4,2,8,7,6,9}, {5,3,2,4,7,6,9,8}, {2,7,4, 5,3,8,6,9}, {4,3,5,2,7,9,8,6}, {5,7,2,4,3,6,9,8}, {2,3,4,5,7,8,6,9}, {2,3,5,4,8,6,9,7}, {5,8,4,2,3,7,6,9}, {4, 3,2,5,8,9,7,6}, {2,8,5,4,3,6,9,7}, {2,8,4,5,6,9,7,3}, {4,6,5,2,8,3,9,7}, {5,8,2,4,6,7,3,9}, {5, 8,4,2,7,3,9,6}, {4,7,2,5,8,6,3,9}, {2,8,5,4,7,9,6,3}, {2,8,4,5,9,6,3,7}, {4,9,5,2,8,7,6,3}, {4,9, 2,5,7,6,3,8}, {2,7,5,4,9,8,6,3}, {2,7,4,5,8,6,3,9}, {4,8,5,2,7,9,6,3}, {5,7,2,4,8,3,9,6}, {2,8, 4,5,7,6,3,9}, {2,8, 5,4,6,3,9,7}, {5,6,4,2,8,7,3,9}, {5,6,2,4,7,3,9,8}, {5,6,4,2,3, 9,8,7}, {4,3,2, 5,6,7,9,8}, {2,6,5,4,3,8,7,9}, {5,3,4,2,6,9,8,7}, {4,6,2,5,3,7,9,8}, {4,6,5,2,7,9,8,3}, {5,7,2, 4,6,3,9,8}, {5,7,4,2,3,9,8,6}, {5,7,2,4,9,8,6,3}, {5,7,4,2,8,6,3,9}, {4,8, 2,5,7,9,6,3}, {4,8,5,2, 9,6,3,7}, {5,9,2,4,8,7,6,3}, {2,8,4,5, 9,3,7,6}, {4,9,5,2,8,6,3,7}, {4,9,2,5,6,3,7,8}, {2,6,5,4, 9,8, 3,7}, {2,6,4,5,8,3,7,9}, {4,8,5,2,6,9,3,7}, {4,8,2,5,9,3,7,6}, {2,9,5,4,8,6,3,7}, {2,9,4,5,6, 3,7,8}, {4,6,5,2,9,8,3,7}, {5,9, 2,4,6,7,8,3}, {5,9,4,2,7,8,3,6}, {4,7,2,5,9,6,8,3}, {4,7,5,2,6, 8,3,9}, {5,6,4,2,9,8,3,7}, {4,9,2,5,6,7,8, 3}, {4,9,5,2,7,8,3,6}, {5,7,2,4,9,6, 8,3}, {5,7,4,2,9,6,8,3,9}, {4,6,5,2,7,9,8,3}, {2,7,5,4,6,3,9,8}, {2,7,4,5,3,9,8,6}, {4,3, 5,2,7,6, 9,8}, {4,3,2,5,6,9,8,7}, {2,6,5,4,3,7,9,8}, {2,6,4,5, 7,9,8,3}, {4,7,5,2,6,3,9,8}, {4,7,2,5,3,9,8, 6}, {2,3,5,4,7,6, 9,8}, {5,7,4,2,3,8,6,9}, {5,7,2,4,8,6,9,3}, {2,8,4,5,7,3,6,9}, {4,7,5,2,8,9,3, 6}, {5,8,2,4,7,6,9,3}, {2,7,4,5,8,3,6,9}, {2,7, 5,4,3,6,9,8}, {5,3,4,2,7,8,6,9}, {5,3,2,4,8,6,9,7}, {2,8,4,5,3, 7,6,9}, {2,8,5,4,7,6,9,3}, {5,7,4,2,8,3,6,9}, {4,8,2,5,7,9,3, 6}, {2,7,5,4,8,6,9,3}, {5,8,4,2,7,3,6,9}, {4,7,2,5,8,9,3,6}, {4,7,5,2,9,3,6,8}, {5,9,2,4,7,8,3,6}, {5,9,4,2,8,3,6,7}, {5,9, 2,4,3,6,7,8}, {5,9,4,2,6,7,8,3}, {4,6,2,5,9,3,7,8}, {4,6,5,2,3, 7,8,9}, {5,3,2,4,6,9,7,8}, {2,6,4,5,3,8,9,7}, {4,3,5,2,6,7,8, 9}, {5,6,2,4,3,9,7,8}, {2,3,4,5,6,8,9,7}, {2,3,5,4,8,9,7,6}, {5, 8,4,2,3,6,9,7}, {5,8,2,4,6,9,7,3}, {2,6,4,5,8,3,9,7}, {2,6, 5,4,3,9,7,8}, {5,3,4,2,6,8,9,7}, {4, 6,2,5,3,7,8,9}, {2,3,5,4, 6,9,7,8}, {5,6,4,2,3,8,9,7}, {4,3,2,5,6,7,8,9}, {4,3,5,2,7,8,9, 6}, {5,7, 2,4,3,6,8,9}, {5,7,4,2,6,8,9,3}, {4,6,2,5,7,3,8,9}, {2,7,5,4,6,9,3,8}, {5,6,4,2,7,8,9,3}, {5,6, 2,4,8,9,3,7}, {5,6, 4,2,9,3,7,8}, {4,9,2,5,6,8,3,7}, {2,6,5,4,9,7,8,3}, {2,6,4,5,7, 8,3,9}, {4,7,5, 2,6,9,8,3}, {4,7,2,5,9,8,3,6}, {2,9,5,4,7,6,8, 3}, {2,9,4,5,6,8,3,7}, {4,6,5,2,9,7,8,3}, {4,6,2, 5,7,8,3,9}, {2,7,5,4,6,9,8,3}, {2,7,4,5,9,8,3,6}, {4,9,5,2,7,6,8,3}, {5,7, 2,4,9,3,6,8}, {5,7,4,2, 3,6,8,9}, {5,7,2,4,6,8,9,3}, {2,6,4,5, 7,3,8,9}, {4,7,5,2,6,9,3,8}, {5,6,2,4,7,8,9,3}, {5,6,4,2, 8,9, 3,7}, {4,8,2,5,6,7,9,3}, {4,8,5,2,7,9,3,6}, {4,8,2,5,9,3,6,7}, {4,8,5,2,3,6,7,9}, {5,3,2,4,8, 9,6,7}, {5,3,4,2,9,6,7,8}, {4,9, 2,5,3,8,6,7}, {2,3,5,4,9,7,8,6}, {5,9,4,2,3,6,7,8}, {4,3,2,5,9, 8,6,7}, {2,9,5,4,3,7,8,6}, {2,9,4,5,7,8,6,3}, {4,7,5,2,9,3,8, 6}, {4,7,2,5,3,8,6,9}, {2,3,5,4,7,9, 8,6}, {2,3,4,5,9,8,6,7}, {4,9,5,2,3,7,8,6}, {4,9,2,5,7,8,6,3}, {2,7,5,4,9,3,8,6}, {5,9, 4,2,7,6, 3,8}, {5,9,2,4,6,3,8,7}, {2,6,4,5, 9,7,3,8}, {4,9,5,2, 6,8,7,3}, {4,9,2,5,8,7,3,6}, {4,9,5,2,7,3,6, 8}, {4,9,2,5,3,6, 8,7}, {2,3,5,4,9,7,6,8}, {5,9,4,2,3,7,8,6}, {4,3,2,5,9,6,8,7}, {4,3,5,2,6,8,7, 9}, {5,6,2,4,3,9,8,7}, {5,6,4,2,9,8,7,3}, {5,6, 2,4,8,7,3,9}, {5,6,4,2,7,3,9,8}, {4,7,2,5,6,8,3,9}, {4,7,5,2,8, 3,9,6}, {5,8,2,4,7,3,9,6}, {4,7,5,2,8,3,9,6}, {5,8,2,4,7,3,9,6}, {2,7,4,5,8,9,6,3}, {4,8,5,2,7,3,9}, {5,7,2,4,8,6,3,9}, {5,7,4,2,6,3,9,8}, {5,7,2,4,3,9,8,6}, {2,3, 4,5,7,6,9,8}, {4,7,5,2,3,8,6,9}, {4,7,2,5,8,6,9,3}, {2,8,5,4,7, 3,6,9}, {5,7,4,2,8,9,3,6}, {4,8,2,5,7,6,9,3}, {2,7,5,4,8,3,6, 9}, {2,7,4,5,3,6,9,8}, {4,3,5,2,7,8,6,9}, {4,3,2,5,8,6,9,7}, {2,8,5,4,3,7,6,9}, {2,8,4,5,7,6,9,3}, {4,7,5,2,8,3,6,9}, {4,3,2,5,8,6,9,7}, {2,8,5,4,3,7,6,9}, {2,8,4,5,7,6,9,3}, {4,7,5, 2,8,3,6,9}, {5,8,4,2,7,9,3,6}, {4, 9,2,5,7,8,3,6}, {4,9,5,2,8,3, 6,7}, {4,9,2,5,3,6,7,8}, {4,9,5,2,6,7,8,3}, {5,6,2,4,9,3,7,8}, {5,6, 4,2,3,7,8,9}, {4,3,2,5,6,9,7,8}, {2,6,5,4,3,8,9,7}, {2,6, 4,5,8,9,7,3}, {2,6,5,4,9,7,3,8}, {5,9, 4,2,6,8,7,3}, {5,9,2,4, 8,7,3,6}, {5,9,4,2,7,3,6,8}, {5,9,2,4,3,6,8,7}, {2,3,4,5,9,7,6, 8}, {2,3,5, 4,7,6,8,9}, {5,7,4,2,3,9,6,8}, {4,3,2,5,7,8,9,6}, {4,3,5,2,8,9,6,7}, {4,3,2,5,9,6,7,8}, {2,9,5, 4,3,8,6,7}, {5,3, 4,2,9,7,8,6}, {5,3,2,4,7,8,6,9}, {5,3,4,2,8,6,9,7}, {4,8,2,5,3, 7,6,9}, {4,8,5,2, 7,6,9,3}, {5,7,2,4,8,3,6,9}, {5,7,4,2,3,6,9, 8}, {5,7,2,4,6,9,8,3}, {5,7,4,2,9,8,3,6}, {4,9,2,5, 7,6,8,3}, {4,9,5,2,6,8,3,7}, {5,6,2,4,9,7,8,3}, {5,6,4,2,7,8,3,9}, {5,6, 2,4,8,3,9,7}, {5,6,4,2,3, 9,7,8}, {4,3,2,5,6,8,9,7}, {4,3,5,2, 8,9,7,6}, {5,8,2,4,3,6,9,7}, {5,8,4,2,6,9,7,3}, {5,8,2,4,9,7,3, 6}, {2,9,4,5,8,6,7,3}, {4,8,5,2,9,3,6,7}, {4,8,2,5,3,6,7,9}, {4,8,5,2,6,7,9,3}, {5,6,2,4,8,3,7,9}, {2,8,4,5,6,9,3,7}, {4,6, 5,2,8,7,9,3}, {5,8,2,4,6,3,7,9}, {5,8,4,2,3,7,9,6}, {4,3,2,5,8, 6,7,9}, {2,8, 5,4,3,9,6,7}, {2,8,4,5,9,6,7,3}, {4,7,5,2,8,6,3, 9}, {5,8,2,4,7,9,6,3}, {5,8,4,2,9,6,3,7}, {4,9,2,5,8,7,6,3}, {2,8,5, 4,9,3,7,6}, {5,9,4,2,8,6,3, 7}, {5,9,2,4,6,3,7,8}, {5,9,4,2,3,7,8,6}, {5,9,2,4,7,8,6,3}, {2,7,4,5,9,3,8,6}, {4,9,5,2,7,6,3,8}, {4,9,2,5,6,3,8, 7}, {4,9,5,2,3,8,7,6}, {5,3,2,4,9,6,8,7}, {5,3,4,2,6,8,7,9}, {4,6,2,5,3,9,8,7}, {2,3,5,4,6,7,9,8}, {5,6,4,2,3,8,7,9}, {4,3,2,5, 6,8,7,9}, {4,3,5,8,7,9,6}, {4, 3,2,5,7,9,6,8}, {2,7,5,4,3,8,9, 6}, {5,3,4,2,7,6,8,9}, {4,7,2,5,3,9,6,8}, {4,7,5,2,9,6,8,3}, {5,9, 2,4,7,3,6,8}, {5,9,4,2,3,6,8,7}, {4,3,2,5,9,7,6,8}, {4,3, 5,2,7,6,8,9}, {5,7,2,4,3,9,6,8}, {5,7, 4,2,9,6,8,3}, {4,9,2,5, 7,3,6,8}, {4,9,5,2,3,6,8,7}, {5,3,2,4,9,7,6,8}, {2,9,4,5,3,8,7, 6}, {4,3,5, 2,9,6,8,7}, {5,9,2,4,3,7,6,8}, {2,3,4,5,9,8,7,6}, {2,3,5,4,8,7,6,9}, {5,8,4,2,3,9,7,6}, {5,8,2, 4,9,7,6,3}, {2,9, 4,5,8,3,7,6}, {2,9,5,4,3,7,6,8}, {5,3,4,2,9,8,7,6}, {5,3,2,4,8, 7,6,9}, {2,8,4,5, 3,9,7,6}, {2,8,5,4,9,7,6,3}, {5,9,4,2,8,3,7, 6}, {4,8,2,5,9,6,3,7}, {2,9,5,4,8,7,6,3}, {5,8,4,2, 9,3,7,6}, {4,9,2,5,8,6,3,7}, {4,9,5,2,6,3,8,7}, {5,6,2,4,9,8,3,7}, {5,6, 4,2,8,3,7,9}, {4,8,2,5,6, 9,3,7}, {2,6,5,4,8,7,9,3}, {5,8,4,2, 6,3,7,9}, {5,8,2,4,3,7,9,6}, {5,8,4,2,7,9,6,3}, {4,7,2,5,8, 3,9, 6}, {2,8,5,4,7,6,3,9}, {5,7,4,2,8,9,6,3}, {4,8,2,5,7,3,9,6}, {2,7,5,4,8,6,3,9}, {2,7,5, 4,3,9,8,6}, {5,3,4,2,7,6,9,8}, {5,3, 2,4,6,9,8,7}, {2,6,4,5,3,7,9,8}, {2,6,5,4,7,9,8,3}, {5,8,4,2, 6,9,3, 7}, {5,8,2,4,9,3,7,6}, {2,9,4,5,7,6,8,3}, {2,9,5,4,7,6,8,3}, {5,7,4,2,9,3,8,6}, {5,7, 2,4,3,8,6, 9}, {2,3,4,5,7,9,8,6}, {2,3,5,4,9,8,6,7}, {2,3,4,5, 8,6,7,9}, {4,8,5,2,3,9,6,7}, {5,3,2,4,8,7,9,6}, {5,3,4,2,7,9,6, 8}, {4,7,2,5,3,8,9,6}, {4,7,5,2,8,9,6,3}, {5,8,2,4,7,3,9,6}, {5,8,4,2,3,9,6,7}, {4,3,2,5,8,7,9,6}, {4,3,5,2,7,9,6,8}, {5,7, 2,4,3,8,9,6}, {2,3,4,5,7,6,8,9}, {4,7,5,2,3,9,6,8}, {5,3,2,4,7, 8,9,6}, {5,3,4,2,8,9,6,7}, {5,3,2,4,9,6,7,8}, {5,3,4,2,6,7,8, 9}, {4,6,2,5,3,9,7,8}, {2,3,5,4,6,8,9,7}, {2,3,4,5,8,9,7,6}, {4,8,5,2,3,6,9,7}, {4,8,2,5,6,9,7,3}, {2,6,5,4,8,3,9,7}, {2, 6,4,5,3,9,7,8}, {4,3,5,2,6,8,9,7}, {5,6,2,4,3,7,8,9}, {2,3,4,5, 6,9,7,8}, {4,6,5,2,3,8,9,7}, {5, 3,2,4,6,7,8,9}, {5,3,4,2,7,8, 9,6}, {4,7,2,5,3,6,8,9}, {4,7,5,2,6,8,9,3}, {5,6,2,4,7,3,8,9}, {2,7, 4,5,6,9,3,8}, {4,6,5,2,7,8,9,3}, {4,6,2,5,8,9,3,7}, {4,6, 5,2,9,3,7,8}, {5,9,2,4,6,8,7,3}, {2,6,5,4,7,8,3,9}, {5,7,4,2,6,9,8,3}, {5,7,2,4,9,8,3,6}, {2,9,4,5,7,6,3,8}, {2,9,5, 4,6,3,8,7}, {5,6,4,2,9,7,8,3}, {5,6, 2,4,7,8,3,9}, {2,7,4,5,6,9,8,3}, {2,7,5,4,9,8,3,6}, {5,9,4,2,7,6,8,3}, {4,7, 2,5,9,3,6,8}, {4,7,5,2,3,6,8,9}, {4,7,2,5,6,8,9,3}, {2,6,5,4,7, 3,8,9}, {5,7,4,2,6,9,3,8}, {4,6,2,5,7,8,9,3}, {4,6,5,2,8,9,3, 7}, {4,6,2,5,9,3,7,8}, {2,6,4,5,9,7,8,3}, {5,7,4,2,6,9,8,3}, {5,7, 2,4,9,8,3,6}, {2,9,4,5,7,6,8,3}, {2,9,5, 4,6,8,3,7}, {5,6,4,2,9,7,8,3}, {5,6,2,4,7,8,3,9}, {2,7,4,5,6,9,8,3}, {2,7,5,4,9,8,3,6}, {5,9,4, 2,7,6,8,3}, {4,7, 2,5,9,3,6,8}, {4,7,5,2,3,6,8,9}, {4,7,2,5,6,8,9,3}, {2,6,5,4,7,3,8,9}, {5,7, 4,2,6,9,3,8}, {4,6,2,5,7,8,9,3}, {4,6,5, 2,8,9,3,7}, {5,8,2,4,6,7,9,3}, {5,8,4,2,7,9,3,6}, {5,8,2,4, 9,3,6,7}, {5,8,4,2,3,6,7,9}, {4,3,2,5,8,9,6,7}, {4,3,5,2,9,6,7,8}, {5,9, 2,4,3,8,6,7}, {5,3,2,4, 9,8,6,7}, {5,3,4,2,8,6,7,9}, {4,8,2,5,3,9,6,7}, {4,8,5,2,9, 6,7, 3}, {5,9,2,4,8,3,6,7}, {2,8,4,5,9,7,3,6}, {4,9,5,2,8,6,7,3}, {4,9,2,5,6,7,3,8}, {2,6,5,4,9,8, 7,3}, {5,9,4,2,6,3,8,7}, {4,6, 2,5,9,7,3,8}, {2,9,5,4,6,8,7,3}, {2,9,4,5,8,7,3,6}, {2,9,5,4,7, 3, 6,8}, {2,9,4,5,3,6,8,7}, {4,3,5,2,9,7,6,8}, {5,9,2,4,3,8,7, 6}, {2,3,4,5,9,6,8,7}, {2,3,5,4,6,8,7, 9}, {2,3,4,5,8,7,9,6}, {2,3,5,4,7,9,6,8}, {5,7,4,2,3,8,9,6}, {4,3,2,5,7,6,8,9}, {2,7, 5,4,3,9,6, 8}, {2,7,4,5,9,6,8,3}, {2,7,5,4,6,8,3,9}, {2,7,4,5, 8,3,9,6}, {4,8,5,2,7,6,3,9}, {5,7,2,4,8,9,6,3}, {5,7,4,2,9,6,3, 8}, {5,7,2,4,6,3,8,9}, {2,6,4,5,7,9,3,8}, {2,6,5,4,9,3,8,7}, {5,9,4,2,6,7,3,8}, {4,6,2,5,9,8,7,3}, {2,9,5,4,6,3,8,7}, {5,6, 4,2,9,7,3,8}, {4,9,2,5,6,8,7,3}, {4,9,5,2,8,7,3,6}, {5,8,2,4,9, 6,7,3}, {5,8,4,2,6,7,3,9}, {4,6,2,5,8,9,7,3}, {4,6,5,2,9,7,3, 8}, {5,9,2,4,6,8,7,3}, {5,9,4,2,8,7,3,6}, {4,8,2,5,9,6,7,3}, {4,8,5,2,6,7,3,9}, {5,6,2,4,8,9,7,3}, {2,8,4,5,6,3,9,7}, {4, 6,5,2,8,7,3,9}, {4,6,2,5,7,3,9,8}, {4,6,5,2,3,9,8,7}, {5,3,2,4, 6,7,9,8}, {2,6,4,5,3,8,7,9}, {4, 3,5,2,6,9,8,7}, {5,6,2,4,3,7, 9,8}, {5,6,4,2,7,9,8,3}, {4,7,2,5,6,3,9,8}, {4,7,5,2,3,9,8,6}, {4,7, 2,5,9,8,6,3}, {2,9,5,4,7,3,8,6}, {2,9,4,5,3,8,6,7}, {4,3, 5,2,9,7,8,6}, {4,3,2,5,7,8,6,9}, {4,3, 5,2,8,6,9,7}, {5,8,2,4, 3,7,6,9}, {5,8,4,2,7,6,9,3}, {4,7,2,5,8,3,6,9}, {4,7,5,2,3,6,9, 8}, {4,7,2, 5,6,9,8,3}, {4,7,5,2,9,8,3,6}, {5,9,2,4,7,6,8,3}, {5,9,4,2,6,8,3,7}, {4,6,2,5,9,7,8,3}, {4,6,5, 2,7,8,3,9}, {4,6, 2,5,8,3,9,7}, {4,6,5,2,3,9,7,8}, {5,3,2,4,6,8,9,7}, {5,3,4,2,8, 9,7,6}, {4,8,2,5, 3,6,9,7}, {4,8,5,2,6,9,7,3}, {4,8,2,5,9,7,3, 6}, {2,9,5,4,8,6,7,3}, {5,8,4,2,9,3,6,7}, {5,8,2,4, 3,6,7,9}, {5,8,4,2,6,7,9,3}, {4,6,2,5,8,3,7,9}, {2,8,5,4,6,9,3,7}, {5,6, 4,2,8,7,9,3}, {4,8,2,5,6, 3,7,9}, {4,8,5,2,3,7,9,6}, {5,3,2,4, 8,6,7,9}, {5,3,4,2,6,7,9,8}, {5,3,2,4,7,9,8,6}, {5,3,4,2,9, 8,6, 7}, {4,9,2,5,3,7,8,6}, {4,9,5,2,7,8,6,3}, {5,7,2,4,9,3,8,6}, {2,9,4,5,7,6,3,8}, {4,7,5,2,9,8, 6,3}, vf}

The decision and searching method for regular abelians can be greatly simplified, since the fact that labels are the natural numbers plus zero and the generators can be represented by arithmetic operations makes procedures much easier. We explain it for circulants though it must be clear that it works identically (changing the labels) for direct products. It must be noted that for the hamiltonian cycle for 2-circulants there is already a procedure described in the paper from Qi Fan Yan et all (1997). We explain first the searching procedure and then we explain a simplest procedure when only decision is needed.

The input is |V| the number of vertices and the IAS starting from the identity. We select the possible SEVs endings and calculate the EVN. We select the SEV vertices and we make a table with EVN rows and |V|/EVN columns which can be seen as a matrix with |V| positions. By convenience rows and columns of the matrix start with one.

We make a list of all the possible sequences of the two generators of length |V|/EVN-3, considering as equivalent two sequences with the same number of generators. For example if the length is 4 we have: aaaa, aaab, aabb, abbb, bbbb. Then we have as many different sequences as the length of the sequence. This can be done linearly in the number of generators.

In position (1,2) we write the label of the initial vertex. In position (1,1) we write the label of the ending vertex. In columns 1 and 2 we write EVN consequences of this choice (arc-forcing step). Now starting from the initial vertex we apply first sequence and make all arc-choices according to the sequence. We write the result of the choices on the first row, then on the second row and we follow up to the nth row. At this stage the matrix has been filled with the labels of the vertices. It is easy to see that not two labels can be repeated. Then we must apply to the last row an arc-choice step matching each label of the last row with the corresponding label of the first row. If one of the generators finds the match then we have found the HT. If none of the generators does the match then we must conclude that this sequence does not generate a hamiltonian traversal. We repeat then with the next sequence. If none of the sequences find the match then we must conclude that there is not a HT within this initial and ending vertices. The commutative property guarantees that we must not try all permutations of a given sequence (i.e. a+a+a+b=a+a+b+a=a+b+a+a=b+a+a+a). A detailed illustration of how this method works is shown in FIG. 4. The time and space complexity is O(n) same as Qi Fan Yang et all. (op.cit 1997). As for non-commutative case we can use this method to get an upper bound for the number of hamiltonian traversals (not only cycles).

Example of the Method for Commutative Circulant:
C 16(3,7). Labels start with 1.
Identity IAS: (1,14,5,2,9,6,13,10,1)
Possible Ending vertices: (14, 2, 6, 10)
EVN:4
List of Sequences of generators: AA, AB, BA, BB
Initial vertex: 1 (by convenience)
Ending vertex: 14 (by choice)

In table bellow we see the EVN rows×|V|/EVN columns with initial vertex, ending vertex and the propagation of this ending vertex choice marked.

| 14 (ending vertex) | 1 (initial vertex) |
|---|---|
| 2 | 5 |
| 6 | 9 |
| 10 | 13 |

In table bellow we took first sequence of generators "AA" and we fill the table according to this choice. It should be noted that we started with one and the arithmetic is modular (mod 16 so 16+3=3).

|  |  | A | A |
|---|---|---|---|
| 14 (ending vertex) | 1 (initial vertex) | 4 | 7 |
| 2 | 5 | 8 | 11 |
| 6 | 9 | 12 | 15 |
| 10 | 13 | 16 | 3 |

If we apply to the last row the generator "A" we get a match and therefore the following hamiltonian cycle: (1,4, 7,10,13,16,3,6,9,12,15,2,5,8,11,14).
Now we try for try for another ending vertex choice:

|  |  | A | A |
|---|---|---|---|
| 2 (ending vertex) | 1 (initial vertex) | 4 | 7 |
| 14 | 5 | 8 | 11 |
| 6 | 9 | 12 | 15 |
| 10 | 13 | 16 | 3 |

In this case (table above) if we apply to the last row the generator "A" we do not get a hamiltonian traversal: 7 matches to 10, 3 matches to 6 and 15 matches to 2: this is a non hamiltonian path. We try the other generator "B" and we neither get a hamiltonian traversal.

We try with second generators sequence: AB

|  |  | A | B |
|---|---|---|---|
| 2 (ending vertex) | 1 (initial vertex) | 4 | 11 |
| 14 | 5 | 8 | 15 |
| 6 | 9 | 12 | 3 |
| 10 | 13 | 16 | 7 |

With this sequence we do not get a HT with none of the generators. We must try the last sequence bb . . .

|  | B | B |  |
|---|---|---|---|
| 2 (ending vertex) | 1 (initial vertex) | 8 | 15 |
| 14 | 5 | 12 | 3 |
| 6 | 9 | 16 | 7 |
| 10 | 13 | 4 | 11 |

. . . with which by applying the generator "B" to the last row we get the following Hamiltonian path: (1,8,15,6,9,16,7,14, 5,12,3,10,13,4,11,2)

If we need only to decide without finding an HT we can save time and space as follows:

We add each generator sequence to get a sequence sum, as follows:

$A+A=2A=6$ $A+B=10$ $B+B=14$

We make a table just with 3 rows: the two first rows must be filled as in searching procedure and the last row is equivalent to the last row of searching procedure but must be filled just adding each sequence sum

|  | +6 | Last row |
|---|---|---|
| 2 (ending vertex) | 1 (initial vertex) | 7 |
| 14 | 5 | 11 |
| 6 | 9 | 15 |
| 10 | 13 | 3 |

Here ends the example of the searching method for commutative circulant.

As described above in detail, the present invention provides through the embodiment of several new structural tests and searching procedures a method for solving the decision, searching, optimization and counting versions of the hamiltonian traversal (cycle and/or path) problem in a class of discrete objects which can be represented as Cayley networks or digraphs, which substantially improves the present methods.

As any skilled in the art would realize the method of the present invention or any of its aspects can be, individually or jointly, directly used by practitioners, can be implemented in software for its use in a computer system (as have been done by the inventor) or can be directly implemented as a specific circuit in the hardware circuitry of a computer system;

It will also be recognized by those skilled in the art that, while the invention has been described above in terms of one or more preferred embodiments, it is not limited thereto. Various aspects of the above described invention may be used individually or jointly. Further, although the invention has been described in the context of its implementation in a particular environment (representation, data structure, labelings . . . ), those skilled in the art will recognize that its usefulness is not limited thereto and that the present invention can be beneficially utilized in any number of environments. Accordingly, the claims set forth below should be construed in view of the full breadth and spirit of the invention as disclosed herein.

The invention claimed is:

1. A method, implemented on one or more processors, of designing a network modeled by a Cayley Digraph, the method avoiding the generation of the whole network and comprising:
   decomposing the network modeled by the Cayley Digraph, which is an input, into sub inputs as pairs of permutation generators;
   for each pair of permutation generators, constructing the IAS;
   given the IAS of a pair of permutation generators, constructing a list of nodes on the IAS for which the total number of in degrees and out degrees is greater than two;
   checking whether the list of nodes for which the total number of in degrees and out degrees is greater than two is empty or contains one or more nodes;
   performing classification by (i) if the list is empty, classifying the pair of permutation generators in the class of IAS regular networks, and (ii) if the list contains one or more nodes, classifying the pair of permutation generators in the class of IAS irregular networks;
   assigning hamiltonian properties to the network, the assigned hamiltonian properties depending on the result of the classification; and
   using the hamiltonian properties to solve the decision, construction, or optimization of a hamiltonian traversal problem in the network, or to obtain an upper bound of the number of hamiltonian traversals in the network.

2. The method of claim 1 further comprising:
   determining a number of possible ending vertices in a hamiltonian cycle or path of the sub inputs and determining which are possible ending vertices in the hamiltonian cycle or path of the sub inputs;
   constructing a sub network of each sub input and determining whether the sub network is smooth; and
   assigning hamiltonian properties to the network based on the described procedures and tests and using these properties to solve the decision, construction, and optimization of a hamiltonian traversal problem in the network, and to obtain an upper bound of the number of hamiltonian traversals in the network.

3. The method of claim 2, wherein
   the input and its elements are represented as lists and sub lists;
   the input and its elements are represented as sets and subsets;
   the input and its elements are represented as graphs and sub graphs; or
   the input and its elements are represented as digraphs and sub digraphs.

4. The method of claim 2, wherein
   elements of the input are permutations of a finite set of numbers as elements and permutation transformations as generators;
   elements of the input are permutations of a finite set of symbols of any kind and permutation transformations as generators;
   elements of the input are matrices over finite fields and matrices transformations as generators;
   elements of the input are integer numbers and arithmetic operations as generators;
   elements of the input are finite-dimensional vectors and lineal transformations as generators;
   elements of the input are words or strings over finite alphabets and symbolic transformations as generators; or elements and generators are relabeled with any kind of input, symbol or physical feature independently of data structures that represent inputs of the method.

5. The method of claim 2, for any finite number of generators starting from 2, when a number of elements of the input is infinite or its construction will take unlimited time.

6. Computer executable software code stored on a non-transitory computer readable medium, the code comprising code to execute the method of claim 2.

7. A programmed computer system comprising at least one memory having at least one region storing computer executable program code and at least one processor for executing the program code stored in said memory, wherein the program code includes code to execute the method of claim 2.

8. The method of claim 1 further comprising:
determining a number of possible ending vertices in a hamiltonian cycle or path of the sub inputs and determining which are possible ending vertices in the hamiltonian cycle or path of the sub inputs;
determining whether entanglement exists between two vertices sets of the sub inputs; and
assigning hamiltonian properties to the network based on the described procedures and tests and using these properties to solve the decision, construction, and optimization of a hamiltonian traversal problem in the network, and to obtain an upper bound of the number of hamiltonian traversals in the network.

9. The method of claim 8, wherein
the input and its elements are represented as lists and sub lists;
the input and its elements are represented as sets and subsets;
the input and its elements are represented as graphs and sub graphs; or
the input and its elements are represented as digraphs and sub digraphs.

10. The method of claim 8, wherein
elements of the input are permutations of a finite set of numbers as elements and permutation transformations as generators;
elements of the input are permutations of a finite set of symbols of any kind and permutation transformations as generators;
elements of the input are matrices over finite fields and matrices transformations as generators;
elements of the input are integer numbers and arithmetic operations as generators;
elements of the input are finite-dimensional vectors and lineal transformations as generators;
elements of the input are words or strings over finite alphabets and symbolic transformations as generators; or
elements and generators are relabeled with any kind of input, symbol or physical feature independently of data structures that represent inputs of the method.

11. The method of claim 8, for any finite number of generators starting from 2, when a number of elements of the input is infinite or its construction will take unlimited time.

12. Computer executable software code stored on a non-transitory computer readable medium, the code comprising code to execute the method of claim 8.

13. A programmed computer system comprising at least one memory having at least one region storing computer executable program code and at least one processor for executing the program code stored in said memory, wherein the program code includes code to execute the method of claim 8.

14. The method of claim 1 further comprising:
determining a number of possible ending vertices in a hamiltonian cycle or path of the sub inputs and determining which are possible ending vertices in the hamiltonian cycle or path of the sub inputs;
determining whether several vertices sets of the sub inputs are cycle-entangled; and
assigning hamiltonian properties to the network based on the described procedures and tests and using these properties to solve the decision, construction, and optimization of a hamiltonian traversal problem in the network, and to obtain an upper bound of the number of hamiltonian traversals in the network.

15. The method of claim 14, further comprising:
obtaining a cycle-entangled sub digraph of the sub inputs;
reducing, by a reduction transformation, the sub inputs into a network of a same kind but of a reduced size; and
proceeding toward a solution to a hamiltonian traversal problem the network based on the reduction transformation and a computation of two parameters of the reduced network.

16. The method of claim 15, wherein
the input and its elements are represented as lists and sub lists;
the input and its elements are represented as sets and subsets;
the input and its elements are represented as graphs and sub graphs; or
the input and its elements are represented as digraphs and sub digraphs.

17. The method of claim 15, wherein
elements of the input are permutations of a finite set of numbers as elements and permutation transformations as generators;
elements of the input are permutations of a finite set of symbols of any kind and permutation transformations as generators;
elements of the input are matrices over finite fields and matrices transformations as generators;
elements of the input are integer numbers and arithmetic operations as generators;
elements of the input are finite-dimensional vectors and lineal transformations as generators;
elements of the input are words or strings over finite alphabets and symbolic transformations as generators; or
elements and generators are relabeled with any kind of input, symbol or physical feature independently of data structures that represent inputs of the method.

18. The method of claim 15, for any finite number of generators starting from 2, when a number of elements of the input is infinite or its construction will take unlimited time.

19. Computer executable software code stored on a non-transitory computer readable medium, the code comprising code to execute the method of claim 15.

20. A programmed computer system comprising at least one memory having at least one region storing computer executable program code and at least one processor for executing the program code stored in said memory, wherein the program code includes code to execute the method of claim 15.

21. The method of claim 14, wherein
the input and its elements are represented as lists and sub lists;

the input and its elements are represented as sets and subsets;

the input and its elements are represented as graphs and sub graphs; or the input and its elements are represented as digraphs and sub digraphs.

22. The method of claim 14, wherein elements of the input are permutations of a finite set of numbers as elements and permutation transformations as generators;

elements of the input are permutations of a finite set of symbols of any kind and permutation transformations as generators;

elements of the input are matrices over finite fields and matrices transformations as generators;

elements of the input are integer numbers and arithmetic operations as generators;

elements of the input are finite-dimensional vectors and lineal transformations as generators;

elements of the input are words or strings over finite alphabets and symbolic transformations as generators; or elements and generators are relabeled with any kind of input, symbol or physical feature independently of data structures that represent inputs of the method.

23. The method of claim 14, for any finite number of generators starting from 2, when a number of elements of the input is infinite or its construction will take unlimited time.

24. Computer executable software code stored on a non-transitory computer readable medium, the code comprising code to execute the method of claim 14.

25. A programmed computer system comprising at least one memory having at least one region storing computer executable program code and at least one processor for executing the program code stored in said memory, wherein the program code includes code to execute the method of claim 14.

26. The method of claim 1, wherein the input and its elements are represented as lists and sub lists;

the input and its elements are represented as sets and subsets;

the input and its elements are represented as graphs and sub graphs; or the input and its elements are represented as digraphs and sub digraphs.

27. The method of claim 1, wherein elements of the input are permutations of a finite set of numbers as elements and permutation transformations as generators;

elements of the input are permutations of a finite set of symbols of any kind and permutation transformations as generators;

elements of the input are matrices over finite fields and matrices transformations as generators;

elements of the input are integer numbers and arithmetic operations as generators;

elements of the input are finite-dimensional vectors and lineal transformations as generators;

elements of the input are words or strings over finite alphabets and symbolic transformations as generators; or elements and generators are relabeled with any kind of input, symbol or physical feature independently of data structures that represent inputs of the method.

28. The method of claim 1, for any finite number of generators starting from 2, when a number of elements of the input is infinite or its construction will take unlimited time.

29. Computer executable software code stored on a non-transitory computer readable medium, the code comprising code to execute the method of claim 1.

30. A programmed computer system f comprising at least one memory having at least one region storing computer executable program code and at least one processor for executing the program code stored in said memory, wherein the program code includes code to execute the method of claim 1.

31. A method, implemented on one or more processors, of designing a network modeled by a Cayley Digraph, the method avoiding the generation of the whole network and comprising:

decomposing the network modeled by the Cayley Digraph, which is an input, into sub inputs as pairs of permutation generators;

for each pair of permutation generators, obtaining an ending vertices number that expresses the order of the permutation generators, by comparing the two permutation generators;

using the ending vertices number as a parameter that expresses the minimum number of nodes that can be an ending node in a hamiltonian traversal in the network, reducing a previous value of this parameter, that is the number of all the nodes of the network generated by the pair of permutation generators;

constructing the TAS for the pair of permutation generators;

if the constructed IAS for the pair of permutation generators is regular, constructing a list of nodes that belong to the IAS and can be possible ending vertices of a hamiltonian traversal in the network, and reducing the set of possible ending vertices, from all the nodes of the network generated by the pair of permutation generators to only those that belong to the constructed list; and using the hamiltonian properties to solve the decision, construction, or optimization of a hamiltonian traversal problem in the network, or to obtain an upper bound of the number of hamiltonian traversals in the network.

32. The method of claim 31, wherein the input and its elements are represented as lists and sub lists;

the input and its elements are represented as sets and subsets;

the input and its elements are represented as graphs and sub graphs; or the input and its elements are represented as digraphs and sub digraphs.

33. The method of claim 31, wherein elements of the input are permutations of a finite set of numbers as elements and permutation transformations as generators;

elements of the input are permutations of a finite set of symbols of any kind and permutation transformations as generators;

elements of the input are matrices over finite fields and matrices transformations as generators;

elements of the input are integer numbers and arithmetic operations as generators;

elements of the input are finite-dimensional vectors and lineal transformations as generators;

elements of the input are words or strings over finite alphabets and symbolic transformations as generators; or elements and generators are relabeled with any kind of input, symbol or physical feature independently of data structures that represent inputs of the method.

34. The method of claim 31, for any finite number of generators starting from 2, when a number of elements of the input is infinite or its construction will take unlimited time.

35. Computer executable software code stored on a non-transitory computer readable medium, the code comprising code to execute the method of claim 31.

36. A programmed computer system comprising at least one memory having at least one region storing computer executable program code and at least one processor for executing the program code stored in said memory, wherein the program code includes code to execute the method of claim 31.

37. A method, implemented on one or more processors, of designing a network modeled by a Cayley Digraph, the method avoiding the generation of the whole network and comprising:

decomposing the network modeled by the Cayley Digraph, which is an input, into sub inputs as pairs of permutation generators;

for each pair of permutation generators, constructing an identity neighborhood;

executing a smoothness test using the identity neighborhood, the smoothness test indicating whether the pair of permutations is smooth or twisted;

assigning hamiltonian properties to the network, the hamiltonian properties depending on the result of smoothness test; and using the hamiltonian properties to solve the decision, construction, or optimization of a hamiltonian traversal problem in the network, or to obtain an upper bound of the number of hamiltonian traversals in the network.

38. The method of claim 37, wherein the input and its elements are represented as lists and sub lists;

the input and its elements are represented as sets and subsets;

the input and its elements are represented as graphs and sub graphs; or the input and its elements are represented as digraphs and sub digraphs.

39. The method of claim 37, wherein elements of the input are permutations of a finite set of numbers as elements and permutation transformations as generators;

elements of the input are permutations of a finite set of symbols of any kind and permutation transformations as generators;

elements of the input are matrices over finite fields and matrices transformations as generators;

elements of the input are integer numbers and arithmetic operations as generators;

elements of the input are finite-dimensional vectors and lineal transformations as generators;

elements of the input are words or strings over finite alphabets and symbolic transformations as generators; or elements and generators are relabeled with any kind of input, symbol or physical feature independently of data structures that represent inputs of the method.

40. The method of claim 37, for any finite number of generators starting from 2, when a number of elements of the input is infinite or its construction will take unlimited time.

41. Computer executable software code stored on a non-transitory computer readable medium, the code comprising code to execute the method of claim 37.

42. A programmed computer system comprising at least one memory having at least one region storing computer executable program code and at least one processor for executing the program code stored in said memory, wherein the program code includes code to execute the method of claim 37.

43. A method, implemented on one or more processors, of designing a network modeled by a Cayley Digraph, the method avoiding the generation of the whole network and comprising:

decomposing the network modeled by the Cayley Digraph, which is an input, into sub inputs as pairs of permutation generators;

for each pair of permutation generators, constructing the IAS and the DAS;

constructing a list of nodes that belong to both the IAS and the DAS;

performing classification by (i) if only the identity permutation belongs to the list, classifying the pair of permutation generators into the class of unentangled networks, and (ii) if other nodes besides the identity belong to the list, classifying the pair of permutation generators into the class of entangled networks;

assigning hamiltonian properties to the network, the assigned hamiltonian properties depending on the result of the classification; and using the hamiltonian properties to solve the decision, construction, or optimization of a hamiltonian traversal problem in the network, or to obtain an upper bound of the number of hamiltonian traversals in the network.

44. The method of claim 43, wherein the input and its elements are represented as lists and sub lists;

the input and its elements are represented as sets and subsets;

the input and its elements are represented as graphs and sub graphs; or the input and its elements are represented as digraphs and sub digraphs.

45. The method of claim 43, wherein elements of the input are permutations of a finite set of numbers as elements and permutations on transformations as generators;

elements of the input are permutations of a finite set of symbols of any kind and permutation transformations as generators;

elements of the input are matrices over finite fields and matrices transformations as generators;

elements of the input are integer numbers and arithmetic operations as generators;

elements of the input are finite-dimensional vectors and lineal transformations as generators;

elements of the input are words or strings over finite alphabets and symbolic transformations as generators; or elements and generators are relabeled with any kind of input, symbol or physical feature independently of data structures that represent inputs of the method.

46. The method of claim 43, for any finite number of generators starting from 2, when a number of elements of the input is infinite or its construction will take unlimited time.

47. Computer executable software code stored on a non-transitory computer readable medium, the code comprising code to execute the method of claim 43.

48. A programmed computer system comprising at least one memory having at least one region storing computer executable program code and at least one processor for executing the program code stored in said memory, wherein the program code includes code to execute the method of claim 43.

49. A method, implemented on one or more processors, of designing a network modeled by a Cayley Digraph, the method avoiding the generation of the whole network and comprising:
  decomposing the network modeled by the Cayley Digraph, which is an input, into sub inputs as pairs of permutation generators;
  for each pair of permutation generators, constructing the IAS;
  constructing a cycle of the first permutation generator;
  constructing a cycle of the second permutation generator, performing classification by:
    checking whether the number of arcs of the network that belong to both the IAS and the cycle of the first permutation generator is (i) only one, in which case the pair of permutation generators is classified into the class of not-cycle-entangled networks, or (ii) greater than one, in which case the pair of permutation generators is classified into the class of networks that are cycle entangled by the first generator; and
    checking whether the number of arcs of the network that belong to both the IAS and the cycle of the second permutation generator is (i) only one, in which case the pair of permutation generators remains classified into the class of not-cycle-entangled networks if the same result was obtained regarding the cycle of the first permutation generator, or (ii) more than one, in which case the pair of permutation generators is classified into the class of networks that are cycle entangled by the second generator;
  assigning hamiltonian properties to the network, the assigned hamiltonian properties depending on the result of the classification; and
  using the hamiltonian properties to solve the decision, construction, or optimization of a hamiltonian traversal problem in the network, or to obtain an upper bound of the number of hamiltonian traversals in the network.

50. The method of claim 49, wherein
  the input and its elements are represented as lists and sub lists;
  the input and its elements are represented as sets and subsets;
  the input and its elements are represented as graphs and sub graphs; or
  the input and its elements are represented as digraphs and sub digraphs.

51. The method of claim 49, wherein
  elements of the input are permutations of a finite set of numbers as elements and permutation transformations as generators;
  elements of the input are permutations of a finite set of symbols of any kind and permutation transformations as generators;
  elements of the input are matrices over finite fields and matrices transformations as generators;
  elements of the input are integer numbers and arithmetic operations as generators;
  elements of the input are finite-dimensional vectors and lineal transformations as generators;
  elements of the input are words or strings over finite alphabets and symbolic transformations as generators; or
  elements and generators are relabeled with any kind of input, symbol or physical feature independently of data structures that represent inputs of the method.

52. The method of claim 49, for any finite number of generators starting from 2, when a number of elements of the input is infinite or its construction will take unlimited time.

53. Computer executable software code stored on a non-transitory computer readable medium, the code comprising code to execute the method of claim 49.

54. A programmed computer system comprising at least one memory having at least one region storing computer executable program code and at least one processor for executing the program code stored in said memory, wherein the program code includes code to execute the method of claim 49.

55. A method, implemented on one or more processors, of designing a network modeled by a Cayley Digraph, the method avoiding the generation of the whole network and comprising:
  decomposing the network modeled by the Cayley Digraph, which is an input, into sub inputs as pairs of permutation generators;
  for each pair of permutation generators, checking whether the pair of permutation generators belongs to the class of cycle-entangled networks by either of the two permutation generators of the pair,
  if the pair belongs to the class of cycle-entangled networks, effecting a reduction transformation of a subdigraph that contains the IAS and the cycle, or cycles if both permutation generators are cycle-entangled, and reduces the subdigraph to a subdigraph of reduced size,
  using the subdigraph of reduced size together with two additional parameters for the solution of a hamiltonian cycle problem.

56. The method of claim 55, wherein
  the input and its elements are represented as lists and sub lists;
  the input and its elements are represented as sets and subsets;
  the input and its elements are represented as graphs and sub graphs; or
  the input and its elements are represented as digraphs and sub digraphs.

57. The method of claim 55, wherein
  elements of the input are permutations of a finite set of numbers as elements and permutation transformations as generators;
  elements of the input are permutations of a finite set of symbols of any kind and permutation transformations as generators;
  elements of the input are matrices over finite fields and matrices transformations as generators;
  elements of the input are integer numbers and arithmetic operations as generators;
  elements of the input are finite-dimensional vectors and lineal transformations as generators;
  elements of the input are words or strings over finite alphabets and symbolic transformations as generators; or
  elements and generators are relabeled with any kind of input, symbol or physical feature independently of data structures that represent inputs of the method.

58. The method of claim 55, for any finite number of generators starting from 2, when a number of elements of the input isinfinite or its construction will take unlimited time.

59. Computer executable software code stored on a non-transitory computer readable medium, the code comprising code to execute the method of claim 55.

60. A programmed computer system comprising at least one memory having at least one region storing computer executable program code and at least one processor for executing the program code stored in said memory, wherein the program code includes code to execute the method of claim 55.

\* \* \* \* \*